United States Patent
Hwang et al.

(10) Patent No.: US 12,082,209 B2
(45) Date of Patent: Sep. 3, 2024

(54) METHOD FOR TRANSMITTING AND RECEIVING SIGNALS IN WIRELESS COMMUNICATION SYSTEM AND APPARATUS THEREFOR

(71) Applicant: LG ELECTRONICS INC., Seoul (KR)

(72) Inventors: Seunggye Hwang, Seoul (KR); Seonwook Kim, Seoul (KR); Changhwan Park, Seoul (KR); Seokmin Shin, Seoul (KR); Joonkui Ahn, Seoul (KR); Suckchel Yang, Seoul (KR); Jaehyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 503 days.

(21) Appl. No.: 17/417,359

(22) PCT Filed: Jan. 8, 2020

(86) PCT No.: PCT/KR2020/000333
§ 371 (c)(1),
(2) Date: Jun. 22, 2021

(87) PCT Pub. No.: WO2020/145658
PCT Pub. Date: Jul. 16, 2020

(65) Prior Publication Data
US 2022/0078835 A1    Mar. 10, 2022

(30) Foreign Application Priority Data

Jan. 10, 2019  (KR) .................. 10-2019-0003581
Feb. 14, 2019  (KR) .................. 10-2019-0017145
(Continued)

(51) Int. Cl.
*H04W 72/23*    (2023.01)
*H04L 1/00*    (2006.01)
(Continued)

(52) U.S. Cl.
CPC ........... *H04W 72/23* (2023.01); *H04L 1/1812* (2013.01)

(58) Field of Classification Search
CPC .... H04W 72/23; H04L 1/1812; H04L 1/0026; H04L 1/1822; H04L 1/00; H04L 1/08; H04L 5/00; H04L 27/26
(Continued)

(56) References Cited

U.S. PATENT DOCUMENTS

| | | | |
|---|---|---|---|
| 9,407,412 B2 | 8/2016 | Guan et al. | |
| 2014/0328260 A1* | 11/2014 | Papasakellariou | H04W 72/23 370/329 |
| 2015/0222395 A1* | 8/2015 | Suzuki | H04L 5/0055 370/329 |

FOREIGN PATENT DOCUMENTS

| | | | |
|---|---|---|---|
| KR | 1020110088393 | 8/2011 | |
| KR | 20140069337 A * | 6/2014 | .......... H04L 1/0028 |

(Continued)

OTHER PUBLICATIONS

PCT International Application No. PCT/KR2020/000333, International Search Report dated Apr. 28, 2020, 18 pages.

*Primary Examiner* — Inder P Mehra
(74) *Attorney, Agent, or Firm* — LEE, HONG, DEGERMAN, KANG & WAIMEY

(57) ABSTRACT

The present invention relates to a method and apparatus for scheduling multiple transport blocks in a wireless communication system, and more particularly, the present invention relates to a method and an apparatus therefor, the method comprising: receiving downlink control information (DCI) for scheduling multiple transport blocks; and receiving or
(Continued)

transmitting one or more transport blocks on the basis of the received DCI, wherein the DCI includes bit information in which first information and second information are joint coded, the first information is determined on the basis of an index of a bit in which a specific bit pattern first appears in the bit information, and the second information is determined on the basis of bits after the specific bit pattern in the bit information.

12 Claims, 45 Drawing Sheets

(30) Foreign Application Priority Data

| | | |
|---|---|---|
| May 3, 2019 | (KR) | 10-2019-0052088 |
| Oct. 4, 2019 | (KR) | 10-2019-0122982 |
| Nov. 8, 2019 | (KR) | 10-2019-0142563 |

(51) Int. Cl.
| | |
|---|---|
| *H04L 1/08* | (2006.01) |
| *H04L 1/1812* | (2023.01) |
| *H04L 1/1822* | (2023.01) |
| *H04L 5/00* | (2006.01) |
| *H04L 27/06* | (2006.01) |

(58) Field of Classification Search
USPC .......................................................... 370/329
See application file for complete search history.

(56) References Cited

FOREIGN PATENT DOCUMENTS

| | | | | |
|---|---|---|---|---|
| KR | 1020140069337 | 6/2014 | | |
| KR | 1020180112862 | 10/2018 | | |
| KR | 20180128519 A | * 12/2018 | ........... | H04L 1/0079 |
| KR | 1020180128519 | 12/2018 | | |

* cited by examiner

FIG. 7
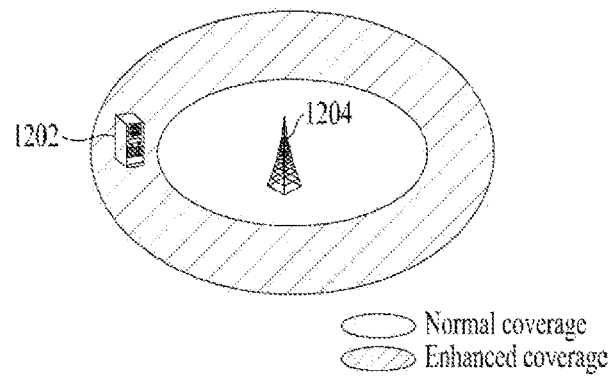
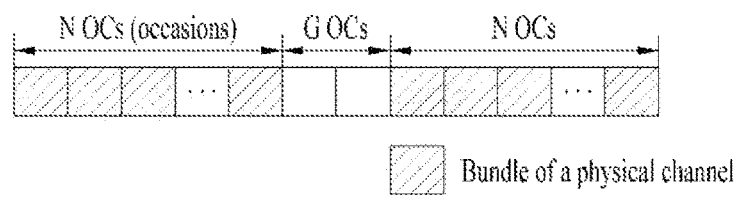
FIG. 8
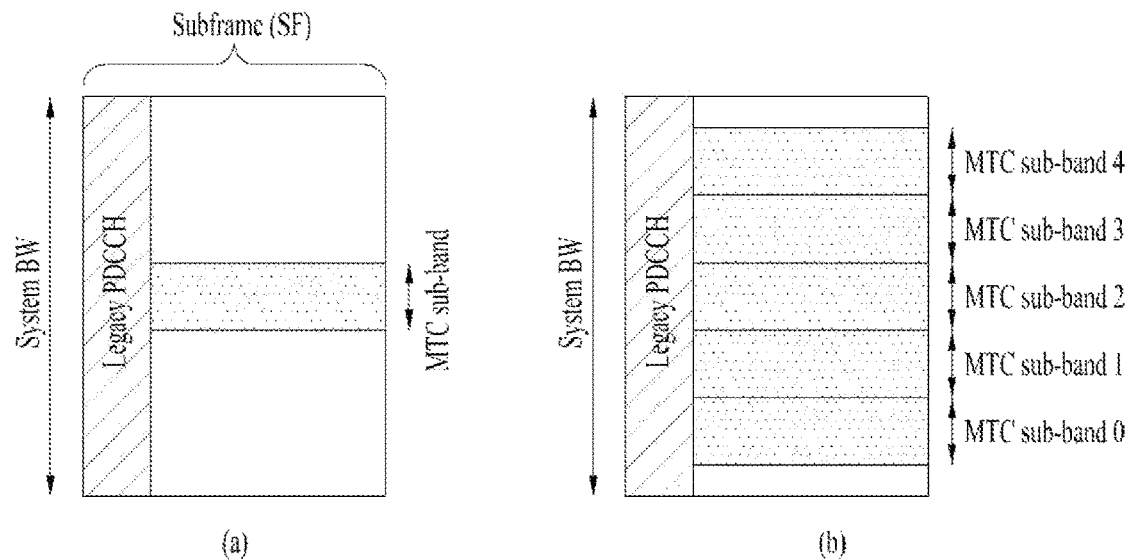

FIG. 12
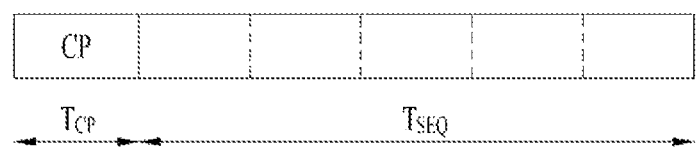
(a) Preamble symbol group
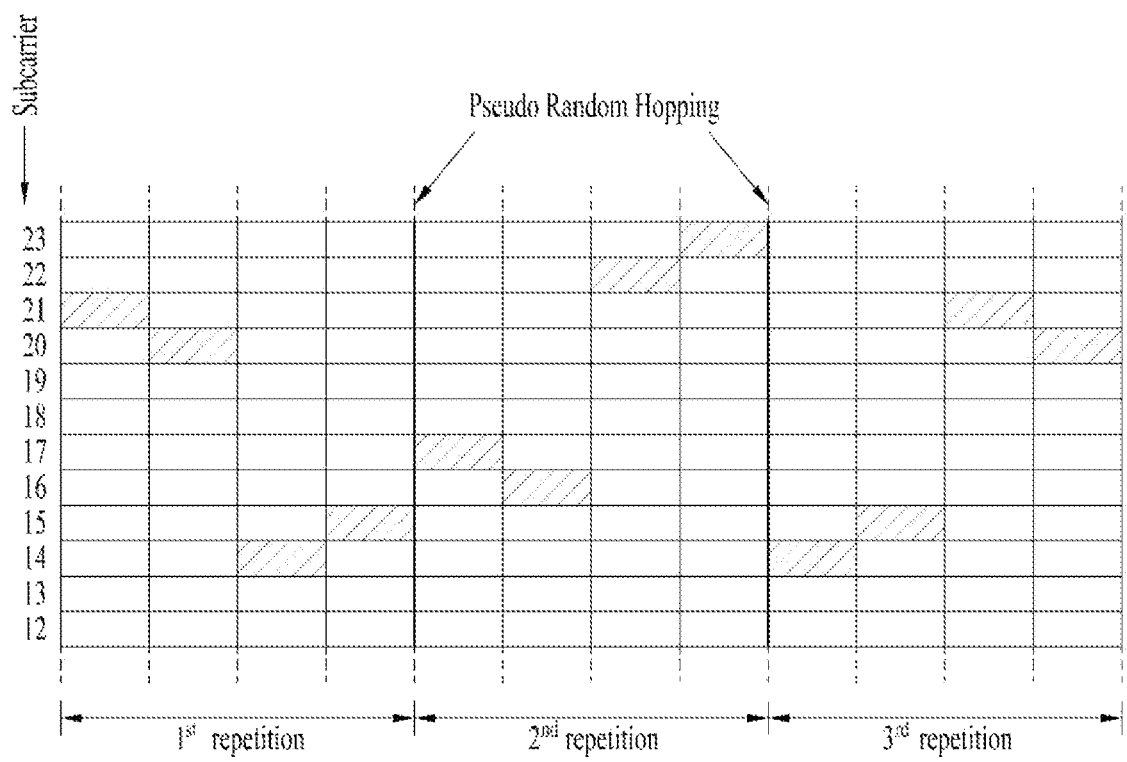
(b) Preamble transmission FIG. 16
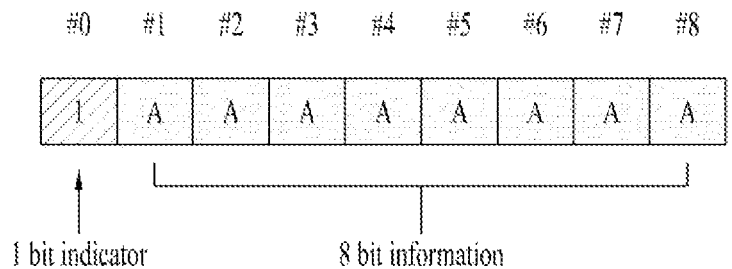
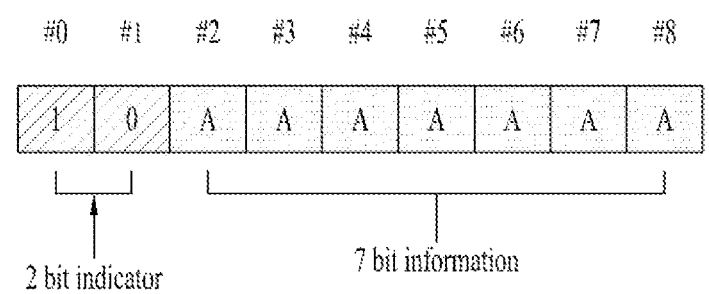
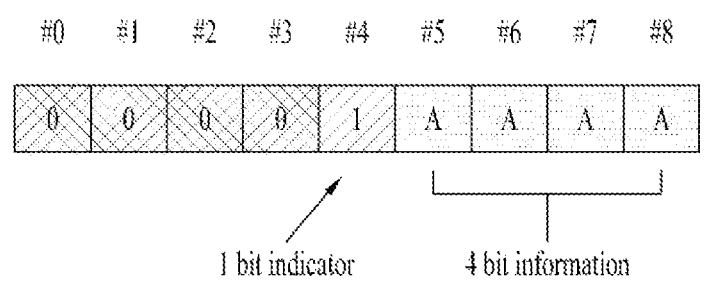
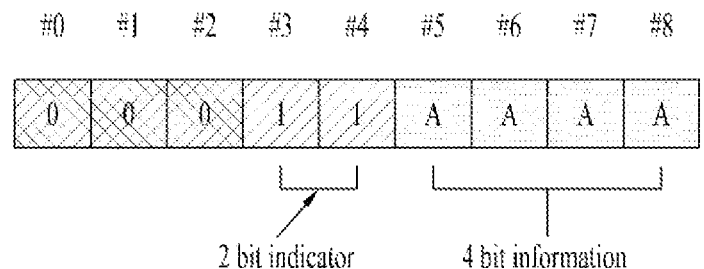

FIG. 22
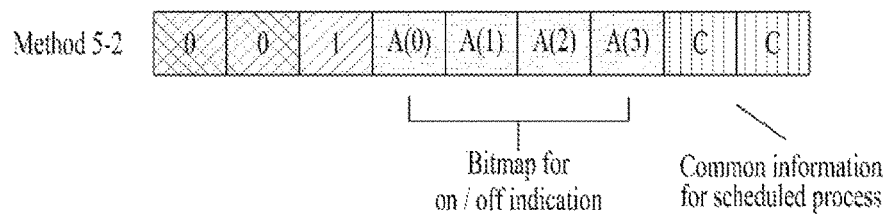
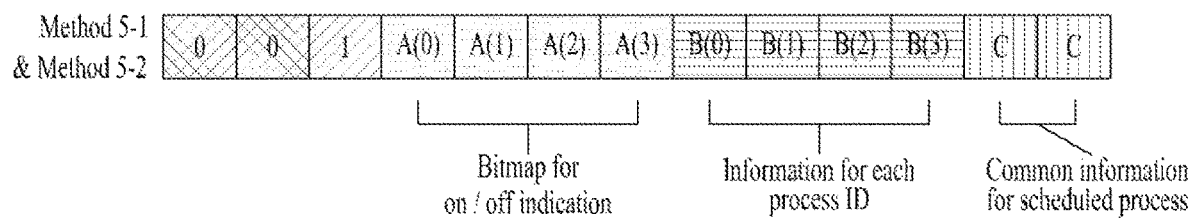
FIG. 23
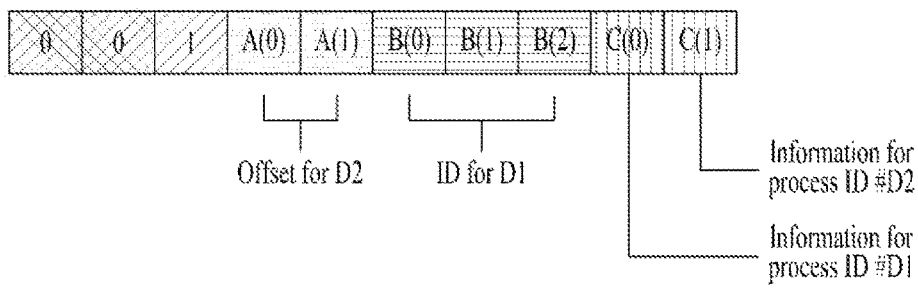

FIG. 24

| Number of HARQ process \ DCI bit index | #0 | #1 | #2 | #3 | #4 | #5 | #6 | #7 | #8 | #9 | #10 | #11 |
|---|---|---|---|---|---|---|---|---|---|---|---|---|
| 1 HARQ process | N(0) | X(0) | X(2) | | | | | | | | | |
| 2 HARQ process | N(0) | X(0) | X(2) | 0 | | | | | | | | |
| 3 HARQ process | N(0) | X(0) | X(2) | 0 | 0 | | | | | | | |
| 4 HARQ process | N(0) | X(0) | X(2) | 0 | 0 | 0 | | | | | | |
| 5 HARQ process | N(0) | X(0) | X(2) | 0 | 0 | 0 | 0 | | | | | |
| 6 HARQ process | N(0) | X(0) | X(2) | 0 | 0 | 0 | 0 | 0 | | | | |
| 7 HARQ process | N(0) | X(0) | X(2) | 0 | 0 | 0 | 0 | 0 | 0 | | | |
| 8 HARQ process | N(0) | X(0) | X(2) | 1 | N(0) | N(1) | N(2) | N(3) | N(4) | N(5) | N(6) | N(7) |

FIG. 25

| DCI bit index<br>Number of<br>HARQ process | #0 | #1 | #2 | #3 | #4 | #5 | #6 | #7 | #8 |
|---|---|---|---|---|---|---|---|---|---|
| 1 HARQ process: | X(0) | X(1) | X(2) | X(3) | 0 | 0 | 0 | / | N(0) |
| 2 HARQ process: | X(0) | X(1) | X(2) | X(3) | 0 | 0 | / | N(0) | N(1) |
| 3 HARQ process: | X(0) | X(1) | X(2) | X(3) | 0 | / | N(0) | N(1) | N(2) |
| 4 HARQ process: | X(0) | X(1) | X(2) | X(3) | / | N(0) | N(1) | N(2) | N(3) |

FIG. 26

| Number of HARQ process \ DCI bit index | #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|---|
| 1 HARQ process | N(0) | X(1) | X(2) | 0 | 0 | 0 | 0 | 0 | 0 | 0 | 0 | 0 | 0 | 0 | 0 | 0 | 0 | 1 | N(0) | R(0) |
| 2 HARQ process | N(0) | X(1) | X(2) | 0 | 0 | 0 | 0 | 0 | 0 | 0 | 0 | 0 | 0 | 0 | 0 | 1 | N(0) | R(0) | N(1) | R(1) |
| 3 HARQ process | N(0) | X(1) | X(2) | 0 | 0 | 0 | 0 | 0 | 0 | 0 | 0 | 0 | 0 | 1 | N(0) | R(0) | N(1) | R(1) | N(2) | R(2) |
| 4 HARQ process | N(0) | X(1) | X(2) | 0 | 0 | 0 | 0 | 0 | 0 | 1 | N(0) | R(0) | N(1) | R(1) | N(2) | R(2) | N(3) | R(3) | N(3) | R(3) |
| 5 HARQ process | N(0) | X(1) | X(2) | 0 | 0 | 0 | 0 | 1 | N(0) | R(0) | N(1) | R(1) | N(2) | R(2) | N(3) | R(3) | N(4) | R(4) | N(4) | R(4) |
| 6 HARQ process | N(0) | X(1) | X(2) | 0 | N(0) | R(0) | N(0) | R(0) | N(1) | R(1) | N(2) | R(2) | N(3) | R(3) | N(4) | R(4) | N(5) | R(5) | N(5) | R(5) |
| 7 HARQ process | N(0) | X(1) | X(2) | 0 | N(0) | R(0) | N(1) | R(1) | N(2) | R(2) | N(3) | R(3) | N(4) | R(4) | N(5) | R(5) | N(6) | R(6) | N(6) | R(6) |
| 8 HARQ process | N(0) | X(1) | X(2) | 1 | N(0) | R(0) | N(1) | R(1) | N(2) | R(2) | N(3) | R(3) | N(4) | R(4) | N(5) | R(5) | N(6) | R(6) | N(7) | R(7) |

FIG. 27

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 1 HARQ process | X(0) | X(1) | X(2) | 0 | 0 | 0 | 0 | 0 | 0 | 0 | / | N(0) |
| 2 HARQ process | X(0) | X(1) | X(2) | 0 | 0 | 0 | 0 | 0 | 0 | / | N(0) | N(1) |
| 3 HARQ process | X(0) | X(1) | X(2) | 0 | 0 | 0 | 0 | 0 | / | N(0) | N(1) | N(2) |
| 4 HARQ process | X(0) | X(1) | X(2) | 0 | 0 | 0 | 0 | / | N(0) | N(1) | N(2) | N(3) |
| 5 HARQ process | X(0) | X(1) | X(2) | 0 | 0 | 0 | / | N(0) | N(1) | N(2) | N(3) | N(4) |
| 6 HARQ process | X(0) | X(1) | X(2) | 0 | 0 | / | N(0) | N(1) | N(2) | N(3) | N(4) | N(5) |
| 7 HARQ process | X(0) | X(1) | X(2) | 0 | / | N(0) | N(1) | N(2) | N(3) | N(4) | N(5) | N(6) |
| 8 HARQ process | 0 | 0 | 0 | / | N(0) | N(1) | N(2) | N(3) | N(4) | N(5) | N(6) | N(7) |
| 2 HARQ process : (Any Combination) | 0 | 0 | 1 | 1 | N(0) | X(0)(1) | X(0)(1) | X(0)(2) | N(1) | X(1)(0) | X(1)(1) | X(1)(2) |
| HARQ processes with NDI=0 | 0 | 1 | 0 | 1 | O/X(0) | O/X(1) | O/X(2) | O/X(3) | O/X(4) | O/X(5) | O/X(6) | O/X(7) |
| HARQ processes with NDI=1 | 0 | 1 | 1 | 1 | O/X(0) | O/X(1) | O/X(2) | O/X(3) | O/X(4) | O/X(5) | O/X(6) | O/X(7) |

FIG. 28

| DCI bit index / Number of HARQ process | #0 | #1 | #2 | #3 | #4 | #5 | #6 | #7 | #8 |
|---|---|---|---|---|---|---|---|---|---|
| 1 HARQ process: | 0 | 0 | 0 | 0 | 1 | X(0) | X(1) | X(2) | N(0) |
| 2 HARQ process: | 0 | 0 | 0 | 1 | X(0) | X(1) | X(2) | N(0) | N(1) |
| 3 HARQ process: | 0 | 0 | 1 | X(0) | X(1) | X(2) | N(0) | N(1) | N(2) |
| 4 HARQ process: | 0 | 1 | X(0) | X(1) | X(2) | N(0) | N(1) | N(2) | N(3) |
| 8 HARQ process: | 1 | N(0) | N(1) | N(2) | N(3) | N(4) | N(5) | N(6) | N(7) |

FIG. 29

| DCI bit index / Number of HARQ process | #0 | #1 | #2 | #3 | #4 | #5 | #6 | #7 | #8 | #9 |
|---|---|---|---|---|---|---|---|---|---|---|
| 1 HARQ process: | 0 | 0 | 0 | 0 | 0 | 1 | X(0) | X(1) | X(2) | N(0) |
| 2 HARQ process: | 0 | 0 | 0 | 0 | 1 | X(0) | X(1) | X(2) | N(0) | N(1) |
| 3 HARQ process: | 0 | 0 | 0 | 1 | X(0) | X(1) | X(2) | N(0) | N(1) | N(2) |
| 4 HARQ process: | 0 | 0 | 1 | X(0) | X(1) | X(2) | N(0) | N(1) | N(2) | N(3) |
| 6 HARQ process: | 1 | X(0) | X(1) | X(2) | N(0) | N(1) | N(2) | N(3) | N(4) | N(5) |
| 8 HARQ process: | 0 | 1 | N(0) | N(1) | N(2) | N(3) | N(4) | N(5) | N(6) | N(7) |

FIG. 30

| Number of HARQ process \ DCI bit index | #0 | #1 | #2 | #3 | #4 | #5 | #6 | #7 | #8 | #9 | #10 |
|---|---|---|---|---|---|---|---|---|---|---|---|
| 1 HARQ process: | 0 | 0 | 0 | 0 | 0 | 0 | 1 | X(0) | X(1) | X(2) | N(0) |
| 2 HARQ process: | 0 | 0 | 0 | 0 | 0 | 1 | X(0) | X(1) | X(2) | N(0) | N(1) |
| 3 HARQ process: | 0 | 0 | 0 | 0 | 1 | X(0) | X(1) | X(2) | N(0) | N(1) | N(2) |
| 4 HARQ process: | 0 | 0 | 0 | 1 | X(0) | X(1) | X(2) | N(0) | N(1) | N(2) | N(3) |
| 5 HARQ process: | 0 | 0 | 1 | X(0) | X(1) | X(2) | N(0) | N(1) | N(2) | N(3) | N(4) |
| 6 HARQ process: | 0 | 1 | X(0) | X(1) | X(2) | N(0) | N(1) | N(2) | N(3) | N(4) | N(5) |
| 7 HARQ process: | 1 | 0 | 0 | X(0) | N(0) | N(1) | N(2) | N(3) | N(4) | N(5) | N(6) |
| 8 HARQ process: | 1 | 0 | 1 | N(0) | N(1) | N(2) | N(3) | N(4) | N(5) | N(6) | N(7) |
| Reserved-1 | 1 | 1 | 0 | Reserved | | | | | | | |
| Reserved-2 | 1 | 1 | 1 | Reserved | | | | | | | |

FIG. 31

| Number of HARQ process \ DCI bit index | #0 | #1 | #2 | #3 | #4 | #5 | #6 | #7 | #8 | #9 |
|---|---|---|---|---|---|---|---|---|---|---|
| 1 HARQ process: | 0 | 0 | 0 | 0 | 0 | 1 | X(0) | X(1) | X(2) | N(0) |
| 2 HARQ process: | 0 | 0 | 0 | 0 | 1 | X(0) | X(1) | X(2) | N(0) | N(1) |
| 3 HARQ process: | 0 | 0 | 0 | 1 | X(0) | X(1) | X(2) | N(0) | N(1) | N(2) |
| 4 HARQ process: | 0 | 0 | 1 | X(0) | X(1) | X(2) | N(0) | N(1) | N(2) | N(3) |
| 5 HARQ process: | 0 | 1 | 0 | X(0) | X(1) | N(0) | N(1) | N(2) | N(3) | N(4) |
| 6 HARQ process: | 0 | 1 | 1 | X(0) | N(0) | N(1) | N(2) | N(3) | N(4) | N(5) |
| 7 HARQ process: | 1 | 0 | X(0) | N(0) | N(1) | N(2) | N(3) | N(4) | N(5) | N(6) |
| 8 HARQ process: | 1 | 1 | N(0) | N(1) | N(2) | N(3) | N(4) | N(5) | N(6) | N(7) |

FIG. 32

| DCI bit index \ Number of HARQ process | #0 | #1 | #2 | #3 | #4 | #5 | #6 | #7 | #8 | #9 | #10 | #11 | #12 | #13 | #14 | #15 | #16 | #17 |
|---|---|---|---|---|---|---|---|---|---|---|---|---|---|---|---|---|---|---|
| 1 HARQ process | 0 | 0 | 0 | 0 | 0 | 0 | 0 | 0 | 0 | 0 | 0 | 0 | / | X(0) | X(0) | X(2) | N(0) | R(0) |
| 2 HARQ process | 0 | 0 | 0 | 0 | 0 | 0 | 0 | 0 | 0 | 0 | 0 | X(0) | X(0) | X(2) | N(0) | R(0) | N(1) | R(1) |
| 3 HARQ process | 0 | 0 | 0 | 0 | 0 | 0 | 0 | 0 | 1 | X(0) | X(0) | X(2) | N(0) | R(0) | N(1) | R(1) | N(2) | R(2) |
| 4 HARQ process | 0 | 0 | 0 | 0 | 0 | 0 | 0 | X(0) | X(0) | X(2) | N(0) | R(0) | N(1) | R(1) | N(2) | R(2) | N(3) | R(3) |
| 5 HARQ process | 0 | 0 | 0 | 0 | / | X(0) | X(0) | X(2) | N(0) | R(0) | N(1) | R(1) | N(2) | R(2) | N(3) | R(3) | N(4) | R(4) |
| 6 HARQ process | 1 | X(0) | X(0) | X(2) | N(0) | R(0) | N(0) | R(0) | N(1) | R(1) | N(2) | R(2) | N(3) | R(3) | N(4) | R(4) | N(5) | R(5) |
| 7 HARQ process | 0 | / | X(0) | X(2) | N(0) | R(0) | N(1) | R(1) | N(2) | R(2) | N(3) | R(3) | N(4) | R(4) | N(5) | R(5) | N(6) | R(6) |
| 8 HARQ process | 0 | X(0) | N(0) | R(0) | N(1) | R(1) | N(2) | R(2) | N(3) | R(3) | N(4) | R(4) | N(5) | R(5) | N(6) | R(6) | N(7) | R(7) |

FIG. 33

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 1~4 HARQ process | 1 | X(0) | X(1) | X(2) | O/X(0) | O/X(1) | O/X(2) | O/X(3) | N(0) | N(1) | N(2) | N(3) |
| 5 HARQ process | 0 | 0 | 0 | / | X(0) | X(1) | X(2) | N(0) | N(1) | N(2) | N(3) | N(4) |
| 6 HARQ process | 0 | 0 | 0 | X(0) | X(1) | X(2) | N(0) | N(1) | N(2) | N(3) | N(4) | N(5) |
| 7 HARQ process | 0 | / | X(0) | X(1) | X(2) | N(0) | N(1) | N(2) | N(3) | N(4) | N(5) | N(6) |
| 8 HARQ process | 0 | 0 | 0 | 0 | N(0) | N(1) | N(2) | N(3) | N(4) | N(5) | N(6) | N(7) |

FIG. 34

| DCI bit index / Number of HARQ process | #0 | #1 | #2 |
|---|---|---|---|
| 1 HARQ process: | 0 | X | N(0) |
| 2 HARQ process: | 1 | N(0) | N(1) |

FIG. 35

| DCI bit index / Number of HARQ process |
|---|
| 1 HARQ process: |
| 2 HARQ process: |

· · ·

| #L-3 | #L-2 | #L-1 |
|---|---|---|
| 0 | N(0) | TBS |
| 1 | N(0) | N(1) |

FIG. 36

| Number of HARQ process \ DCI bit index | #0 | #1 | #2 | #3 | #4 | #5 | #6 | #7 | #8 | #9 | #10 | #11 |
|---|---|---|---|---|---|---|---|---|---|---|---|---|
| 8 HARQ process | 0 | 0 | 0 | 1 | N(0) | N(1) | N(2) | N(3) | N(4) | N(5) | N(6) | N(7) |
| 6 HARQ process | 1 | L(0) | L(1) | L(2) | L(3) | L(4) | N(0) | N(1) | N(2) | N(3) | N(4) | N(5) |
| 4 HARQ process | 0 | 1 | L(0) | L(1) | L(2) | L(3) | L(4) | L(5) | N(0) | N(1) | N(2) | N(3) |
| 4 HARQ process | 0 | 0 | 1 | L(0) | L(1) | L(2) | L(3) | L(4) | N(0) | N(1) | N(2) | N(3) |
| 2 HARQ process | 0 | 0 | 0 | 0 | 0 | L(0) | L(1) | L(2) | L(3) | L(4) | N(0) | N(1) |
| 1 HARQ process | 0 | 0 | 0 | 0 | 0 | 0 | 0 | 1 | L(0) | L(1) | L(2) | N(0) |

FIG. 37

| Number of HARQ process \ DCI bit index | #0 | #1 | #2 | #3 | #4 | #5 | #6 | #7 | #8 | #9 | #10 | #11 |
|---|---|---|---|---|---|---|---|---|---|---|---|---|
| 8 HARQ process | 0 | 0 | 0 | / | N(0) | N(1) | N(2) | N(3) | N(4) | N(5) | N(6) | N(7) |
| 6 HARQ process | 1 | X(0) | X(1) | S(0) | S(0) | S(2) | N(0) | N(1) | N(2) | N(3) | N(4) | N(5) |
| 4 HARQ process | 0 | / | X(0) | Y(0) | Z(0) | S(0) | S(0) | S(2) | N(0) | N(1) | N(2) | N(3) |
| 4 HARQ process | 0 | 0 | / | X(0) | Y(0) | S(0) | S(0) | S(2) | N(0) | N(1) | N(2) | N(3) |
| 2 HARQ process | 0 | 0 | 0 | 0 | 1 | X(0) | X(1) | S(0) | S(0) | S(2) | N(0) | N(1) |
| 1 HARQ process | 0 | 0 | 0 | 0 | 0 | 0 | 0 | / | S(0) | S(1) | S(2) | N(0) |

FIG. 38

| DCI bit index / Number of HARQ process | #0 | #1 | #2 | #3 | #4 | #5 |
|---|---|---|---|---|---|---|
| 4 HARQ process: | 0 | 1 | N(0) | N(1) | N(2) | N(3) |
| 2 HARQ process: | 1 | L(0) | L(1) | L(2) | N(0) | N(1) |
| 1 HARQ process: | 0 | 0 | 1 | L(0) | L(1) | N(0) |

(a)

| DCI bit index / Number of HARQ process | #0 | #1 | #2 | #3 | #4 | #5 |
|---|---|---|---|---|---|---|
| 4 HARQ process: | 0 | 1 | N(0) | N(1) | N(2) | N(3) |
| 2 HARQ process: | 1 | X(0) | S(0) | S(1) | N(0) | N(1) |
| 1 HARQ process: | 0 | 0 | 1 | S(0) | S(1) | N(0) |

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 8 HARQ process | 1 | 1 | 1 | 1 | N(0) | N(1) | N(2) | N(3) | N(4) | N(5) | N(6) | N(7) |
| 6 HARQ process | 1 | L(0) | L(1) | L(2) | L(3) | L(4) | N(0) | N(1) | N(2) | N(3) | N(4) | N(5) |

FIG. 40

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 8 HARQ process | 1 | 1 | 1 | 1 | N(0) | N(1) | N(2) | N(3) | N(4) | N(5) | N(6) | N(7) |
| 6 HARQ process | 1 | X(0) | Y(0) | S(0) | S(1) | S(2) | N(0) | N(1) | N(2) | N(3) | N(4) | N(5) |

FIG. 41

| DCI bit index<br>Number of<br>HARQ process | #0 | #1 | #2 | #3 | #4 | #5 | #6 | #7 | #8 | #9 | #10 | #11 |
|---|---|---|---|---|---|---|---|---|---|---|---|---|
| 2 HARQ process | 0 | 0 | 0 | 0 | X | L(0) | L(1) | L(2) | L(3) | L(4) | N(0) | N(1) |
| 1 HARQ process | 0 | 0 | 0 | 0 | X | X | X | X | L(0) | L(1) | L(2) | N(0) |

FIG. 42

| DCI bit index<br>Number of HARQ process | #0 | #1 | #2 | #3 | #4 | #5 | #6 | #7 | #8 | #9 | #10 | #11 |
|---|---|---|---|---|---|---|---|---|---|---|---|---|
| 2 HARQ process: | 0 | 0 | 0 | 0 | 1 | X(0) | Y(0) | S(0) | S(1) | S(2) | N(0) | N(1) |
| 1 HARQ process: | 0 | 0 | 0 | 0 | 1 | 1 | 1 | 1 | S(0) | S(1) | S(2) | N(0) |

FIG. 43

| Number of HARQ process \ DCI bit index | #0 | #1 | #2 | #3 | #4 | #5 |
|---|---|---|---|---|---|---|
| 4 HARQ process: | 0 | 1 | N(0) | N(1) | N(2) | N(3) |
| 2 HARQ process: | / | L(0) | L(1) | L(2) | N(0) | N(1) |
| 1 HARQ process: | / | / | / | L(0) | L(1) | N(0) |

(a)

| Number of HARQ process \ DCI bit index | #0 | #1 | #2 | #3 | #4 | #5 |
|---|---|---|---|---|---|---|
| 4 HARQ process: | 0 | 1 | N(0) | N(1) | N(2) | N(3) |
| 2 HARQ process: | / | X(0) | S(0) | S(1) | N(0) | N(1) |
| 1 HARQ process: | / | / | / | S(0) | S(1) | N(0) |

| Number of HARQ process \ DCI bit index | #0 | #1 | #2 | #3 | #4 | #5 |
|---|---|---|---|---|---|---|
| 3 HARQ process: | 0 | 0 | S(0) | N(1) | N(2) | N(3) |

FIG. 45

| Number of HARQ process \ DCI bit index | #0 | #1 | #2 | #3 | #4 | #5 | #6 | #7 | #8 | #9 | #10 | #11 |
|---|---|---|---|---|---|---|---|---|---|---|---|---|
| 4 HARQ process | 0 | 1 | L(0) | L(1) | L(2) | L(3) | L(4) | L(5) | N(0) | N(1) | N(2) | N(3) |
|  | 0 | 0 | 0 | 0 | 1 | L(0) | L(1) | L(3) | N(0) | N(1) | N(2) | N(3) |

FIG. 46

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 2 HARQ process | 0 | 0 | 1 | L(0) | L(0) | L(2) | L(3) | L(4) | N(0) | N(1) | Add | Add |
| 1 HARQ process | 0 | 0 | 1 | 1 | 1 | 1 | L(0) | L(1) | L(2) | N(0) | Add | Add |

FIG. 47

| DCI bit index / Number of HARQ process | #0 | #1 | #2 | #3 | #4 | #5 | #6 | #7 | #8 | #9 | #10 | #11 |
|---|---|---|---|---|---|---|---|---|---|---|---|---|
| 2 HARQ process | 0 | 0 | 1 | X(0) | Y(0) | S(0) | S(1) | S(2) | N(0) | N(1) | Add | Add |
| 1 HARQ process | 0 | 0 | 1 | 1 | 1 |  | S(0) | S(1) | S(2) | N(0) | Add | Add |

FIG. 48

|  | #a | #b | #c | #d | #e | #f | #g | #h | #i |
|---|---|---|---|---|---|---|---|---|---|
| #1 | N(0) | 1 | 0 | 0 | 0 | 0 | 0 | 0 | 0 |
| #2 | N(0) | N(1) | 1 | 0 | 0 | 0 | 0 | 0 | 0 |
| #3 | N(0) | N(1) | N(2) | 1 | 0 | 0 | 0 | 0 | 0 |
| #4 | N(0) | N(1) | N(2) | N(3) | 1 | 0 | 0 | 0 | 0 |
| #5 | N(0) | N(1) | N(2) | N(3) | N(4) | 1 | 0 | 0 | 0 |
| #6 | N(0) | N(1) | N(2) | N(3) | N(4) | N(5) | 1 | 0 | 0 |
| #7 | N(0) | N(1) | N(2) | N(3) | N(4) | N(5) | N(6) | 1 | 0 |
| #8 | N(0) | N(1) | N(2) | N(3) | N(4) | N(5) | N(6) | N(7) | 1 |

(a) Base Table
($P^t = P_{max} = 8$)

|  | #a | #b | #c | #d | #e | #f | #g | #h | #i |
|---|---|---|---|---|---|---|---|---|---|
| #1 | N(0) | 1 | 0 | 0 | 0 | 0 | 0 | 0 | 0 |
| #2 | N(0) | N(1) | 1 | 0 | 0 | 0 | 0 | 0 | 0 |
| #3 | N(0) | N(1) | N(2) | 1 | 0 | 0 | 0 | 0 | 0 |
| #4 | N(0) | N(1) | N(2) | N(3) | 1 | 0 | 0 | 0 | 0 |
| #5 | N(0) | N(1) | N(2) | N(3) | N(4) | 1 | 0 | 0 | 0 |
| #6 | N(0) | N(1) | N(2) | N(3) | N(4) | N(5) | 1 | 0 | 0 |
| #7 | N(0) | N(1) | N(2) | N(3) | N(4) | N(5) | N(6) | 1 | 0 |
| #8 | N(0) | N(1) | N(2) | N(3) | N(4) | N(5) | N(6) | N(7) | 1 |

Disable (b) Subtracted Table
($P^t = 4$)

METHOD FOR TRANSMITTING AND RECEIVING SIGNALS IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2020/000333, filed on Jan. 8, 2020, which claims the benefit of earlier filing date and right of priority to Korean Patent Application Nos. 10-2019-0003581, filed on Jan. 10, 2019, 10-2019-0017145, filed on Feb. 14, 2019, 10-2019-0052088, filed on May 3, 2019, 10-2019-0122982, filed on Oct. 4, 2019, and 10-2019-0142563, filed on Nov. 8, 2019, the contents of which are all incorporated by reference herein in their entirety.

TECHNICAL FIELD

The present disclosure relates to a wireless communication system and, more particularly, to a method of transmitting and receiving signals in a wireless communication system supporting multi-transport block scheduling and apparatus therefor.

BACKGROUND ART

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

DISCLOSURE

Technical Problem

An object of the present disclosure is to provide a method of joint encoding two or more pieces of information included in downlink control information to effectively reduce the number of bits required to represent the corresponding information and apparatus therefor.

Another object of the present disclosure is to provide a method of efficiently configuring downlink control information for multi-transport block scheduling to effectively reduce downlink control information overhead and effectively improve scheduling flexibility and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method performed by a user equipment (UE) in a wireless communication system is provided. The method may include: receiving downlink control information (DCI) for multi-transport block scheduling; and receiving or transmitting one or more transport blocks based on the received DCI. The DCI may include bit information in which first information and second information are joint coded. The first information may be determined based on an index of a bit in which a specific bit pattern first appears in the bit information, and the second information may be determined based on bits after the specific bit pattern in the bit information.

In another aspect of the present disclosure, a UE configured to operate in a wireless communication system is provided. The UE may include: a radio frequency (RF) transceiver; and a processor operatively connected to the RF transceiver. The processor may be configured to control the RF transceiver to: receive DCI for multi-transport block scheduling; and receive or transmit one or more transport blocks based on the received DCI. The DCI may include bit information in which first information and second information are joint coded. The first information may be determined based on an index of a bit in which a specific bit pattern first appears in the bit information, and the second information may be determined based on bits after the specific bit pattern in the bit information.

Preferably, the information in which the first information and the second information are joint coded may be represented by (Pmax+1) bits, where Pmax denotes a maximum number of hybrid automatic repeat request (HARQ) processes capable of being scheduled by the DCI.

Preferably, the second information may be represented by P bits among the (Pmax+1) bits. The specific bit pattern may be represented by one bit before the P bits and have a first value. Among the (Pmax+1) bits, (Pmax−P) bits before the specific bit pattern may have a second value.

Preferably, the first value may be 1, and the second value may be 0. Alternatively, the first value may be 0, and the second value may be 1.

Preferably, the first information may be information about a number of consecutive HARQ processes scheduled by the DCI, P, and the second information may include information about new data indicators (NDIs) for the consecutive HARQ processes scheduled by the DCI.

Preferably, the DCI may further include information about a starting HARQ process identifier (ID) of the consecutive HARQ processes scheduled by the DCI.

Preferably, the consecutive HARQ processes scheduled by the DCI may include P HARQ processes in ascending order from the starting HARQ process ID. Alternatively, the consecutive HARQ processes scheduled by the DCI may include P HARQ processes in descending order from the starting HARQ process ID.

Preferably, information about the starting HARQ process ID of the consecutive HARQ processes scheduled by the DCI may be represented by $\lceil \log_2(Qmax) \rceil$ bits, where Qmax denotes a maximum number of HARQ processes allowed in the wireless communication system and $\lceil \ \rceil$ denotes a ceiling function.

Preferably, among bits for the second information, an a-th bit may represent an NDI for HARQ process ID mod(a+X, Qmax), where X denotes the starting HARQ process ID of the consecutive HARQ processes scheduled by the DCI and mod( ) denotes a modulo function.

Preferably, the wireless communication system may support machine type communication (MTC). In this case, Pmax may be set to 8, and Qmax may be set to 8. Alternatively, the wireless communication system may support an unlicensed band. In this case, Pmax may be set to 4, and Qmax may be set to 16.

Advantageous Effects

According to the present disclosure, two or more pieces of information included in downlink control information (DCI) may be joint encoded, thereby effectively reducing the number of bits required to represent the corresponding information.

Additionally/alternatively, DCI for multi-transport block scheduling may be efficiently configured, thereby effectively reducing DCI overhead and effectively improving scheduling flexibility.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure, illustrate embodiments of the invention and together with the description serve to explain the principle of the present disclosure.

FIG. 7 illustrates cell coverage enhancement in machine type communication (MTC).

FIG. 8 illustrates a signal band for MTC.

FIG. 12 illustrates preamble transmission on an NB-IoT random access channel (RACH).

FIGS. 16 to 23 illustrate examples to which the methods proposed in the present disclosure are applied.

FIGS. 24 to 48 illustrate embodiments based on the methods proposed in the present disclosure.

BEST MODE

Figure 1:
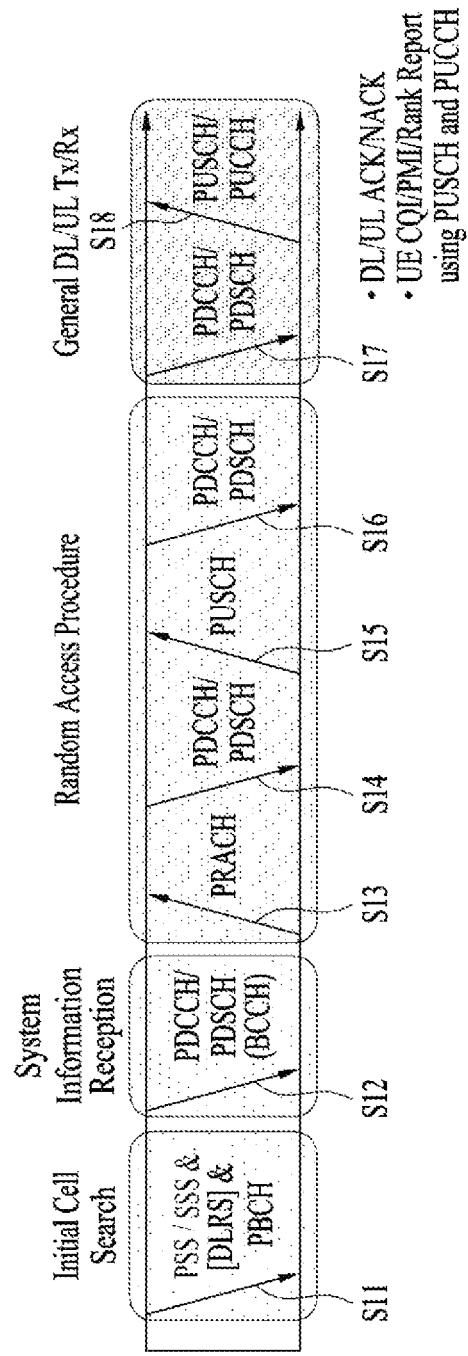
FIG. 1 illustrates physical channels and general signal transmission used in a 3rd generation partnership project (3GPP) system.

In the following description, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) or 5G is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP 5G means the technology beyond TS 36.xxx Release 15 and 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
   36.211: Physical channels and modulation
   36.212: Multiplexing and channel coding
   36.213: Physical layer procedures
   36.300: Overall description
   36.304: User Equipment (UE) procedures in idle mode
   36.331: Radio Resource Control (RRC)

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description 38.304: User Equipment (UE) procedures in Idle mode and RRC Inactive state 36.331: Radio Resource Control (RRC) protocol specification Evolved UMTS terrestrial radio access network (E-UTRAN), LTE, LTE-A, LTE-A pro, and $5^{th}$ generation (5G) systems may be generically called an LTE system. A next generation radio access network (NG-RAN) may be referred to as an NR system. A UE may be fixed or mobile. The term UE is interchangeably used with other terms such as terminal, mobile station (MS), user terminal (UT), subscriber station (SS), mobile terminal (MT), and wireless device. A BS is generally a fixed station communicating with a UE. The term BS is interchangeably used with other terms such as evolved Node B (eNB), general Node B (gNB), base transceiver system (BTS), and access point (AP).

A. Physical Channels and Frame Structures

Physical Channels and General Signal Transmission

FIG. 1 is a diagram illustrating physical channels and a general signal transmission procedure in a 3GPP system. In a wireless communication system, a UE receives information from a BS on DL and transmits information to the BS on UL. The information transmitted and received between the UE and the BS includes data and various types of control information. There are many physical channels according to the types/uses of information transmitted and received between BS and the UE.

When a UE is powered on or enters a new cell, the UE performs initial cell search including acquisition of synchronization with a BS (S11). For the initial cell search, the UE synchronizes its timing with the BS and acquires information such as a cell identifier (ID) by receiving a primary synchronization signal (PSS) and a secondary synchronization signal (SSS) from the BS. The UE may further acquire information broadcast in the cell by receiving a physical broadcast channel (PBCH) from the BS. During the initial cell search, the UE may further monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) corresponding to the PDCCH (S12).

Subsequently, to complete the connection to the BS, the UE may perform a random access procedure (see FIG. 2 and a related description) with the BS (S13 to S16). Specifically, the UE may transmit a random access preamble on a physical random access channel (PRACH) (S13) and may receive a PDCCH and a random access response (RAR) to the preamble on a PDSCH corresponding to the PDCCH (S14). The UE may then transmit a physical uplink shared channel (PUSCH) by using scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a physical uplink control channel (PUCCH) to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), a rank indication (RI), and so on. In general, UCI is transmitted on the PUCCH. However, if control information and data should be transmitted simultaneously, the control information may be transmitted on the PUSCH. In addition, the UE may transmit the UCI aperiodically on the PUSCH, upon receipt of a request/command from a network.

Figure 2:
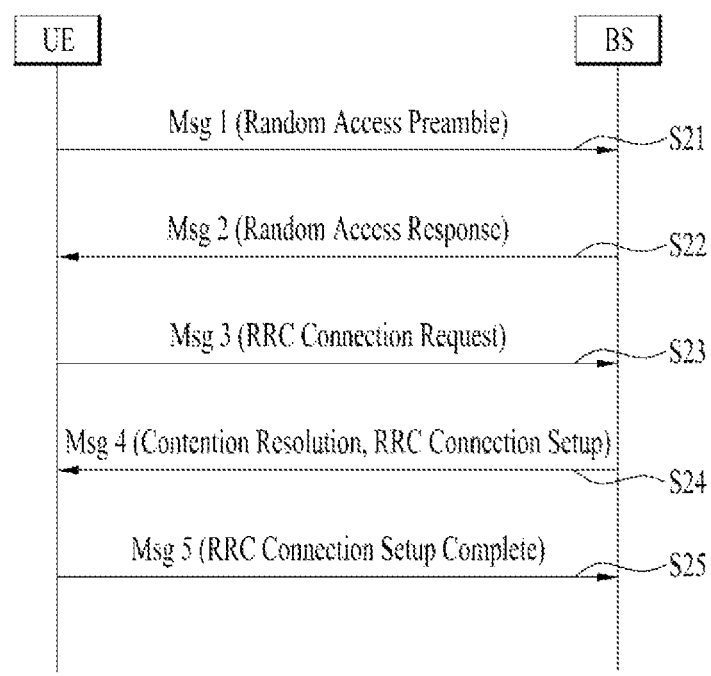
FIG. 2 illustrates a random access procedure.

FIG. 2 is a diagram illustrating a random access procedure.

The random access procedure is performed during initial access in RRC idle mode (or RRC_IDLE state), during initial access after radio link failure (RLF), during handover requiring the random access procedure, or upon generation of UL/DL data requiring the random access procedure in RRC connected mode (or RRC_CONNECTED state). The random access procedure may also be referred to as a random access channel (RACH) procedure. Some RRC messages such as an RRC Connection Request message, a Cell Update message, and a URA Update message are also transmitted in the random access procedure. Logical channels, common control channel (CCCH), dedicated control channel (DCCH), and dedicated traffic channel (DTCH) may be mapped to a transport channel RACH. The transport channel RACH is mapped to a physical channel PRACH. When the medium access control (MAC) layer of a UE indicates PRACH transmission to the physical layer of the UE, the physical layer of the UE selects one access slot and one signature and transmits a PRACH preamble on UL. The random access procedure is contention-based or contention-free.

Referring to FIG. 2, a UE receives random access information in system information from a BS and stores the random access information. Subsequently, when random access is required, the UE transmits a random access preamble (message 1 or Msg1) to the BS (S21). The random access preamble may also be referred to as an RACH preamble or a PRACH preamble. Upon receipt of the random access preamble from the UE, the BS transmits an RAR (message 2 or Msg2) to the UE (S22). Specifically, DL scheduling information for the RAR may be cyclic redundancy check (CRC)-masked with a random access RNTI (RA-RNTI) and transmitted on an L1/L2 control channel (PDCCH). Upon receipt of the DL scheduling signal masked with the RA-RNTI, the UE may receive the RAR on a PDSCH and decode the RAR. The UE then checks whether the RAR includes RAR information directed to the UE. The UE may determine whether the RAR includes the random access preamble ID (RAID) of the transmitted preamble to check whether the RAR includes RAR information directed to the UE. The RAR includes a timing advance (TA) which is timing offset information for synchronization, radio resource allocation information for UL, and a temporary ID (e.g., temporary cell RNTI (C-RNTI)) for UE identification. Upon receipt of the RAR, the UE performs a UL transmission (message 3 or Msg3) including an RRC Connection Request message on a UL shared channel according to the radio resource allocation information included in the RAR (S23). After receiving the UL transmission from the UE, the BS transmits a message for contention resolution (message 4 or Msg4) to the UE (S24). The message for contention resolution may be referred to as a contention resolution message and include an RRC Connection Setup message. After receiving the contention resolution message from the BS, the UE completes the connection setup and then transmits a Connection Setup Complete message (message 5 or Msg5) to the BS (S25).

In a contention-free random access (CFRA) procedure, before the UE transmits the random access preamble (S21), the BS may allocate a contention-free random access preamble to the UE. The contention-free random access preamble may be allocated by a handover command or dedicated signaling such as a PDCCH. When the contention-free random access preamble is allocated to the UE, the UE may transmit the allocated contention-free random access preamble to the BS in a similar manner to in step S21. Upon receipt of the contention-free random access preamble from the UE, the BS may transmit an RAR to the UE in a similar manner to in step S22.

Radio Frame Structures

Figure 3:
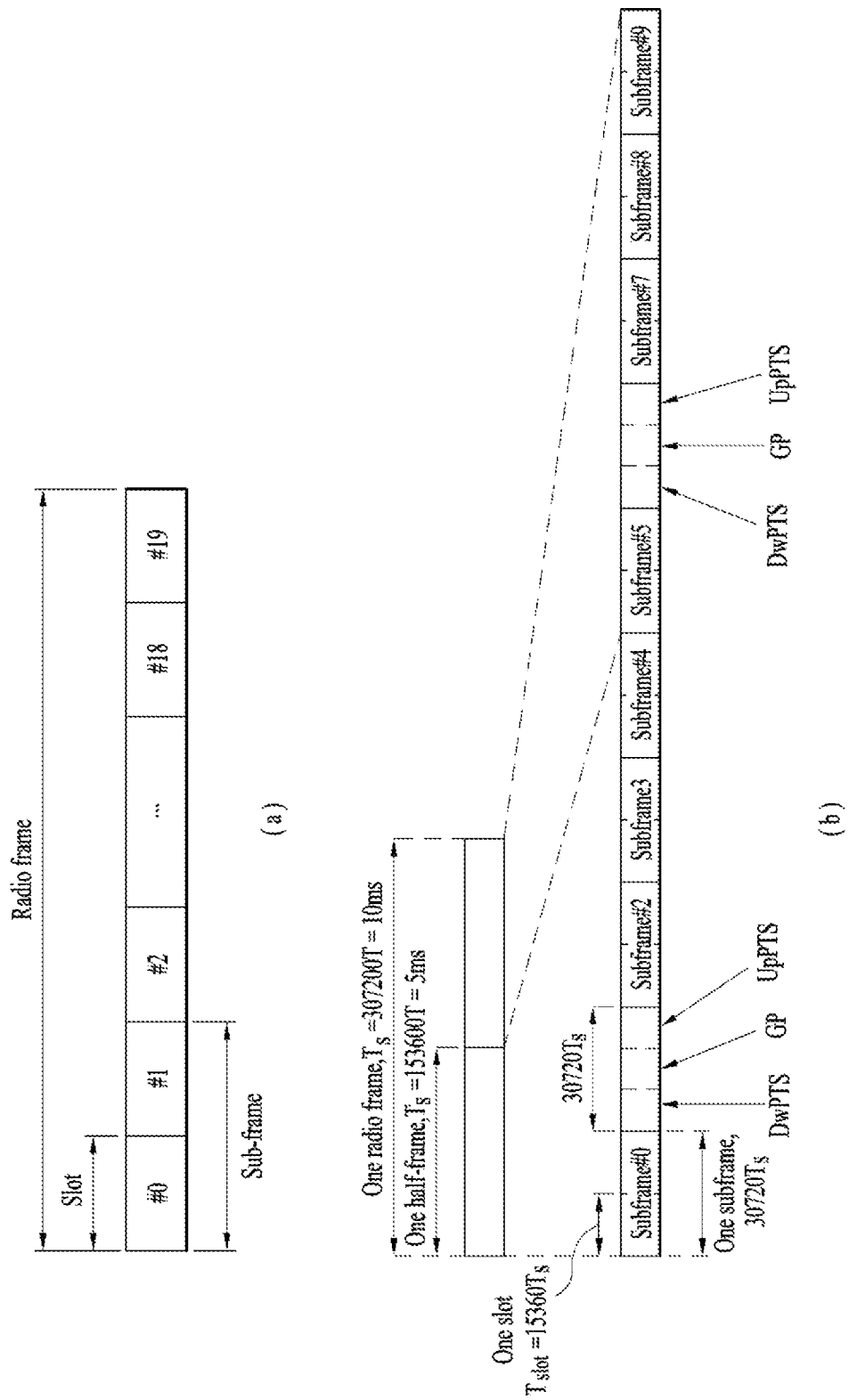
FIG. 3 illustrates a long-term evolution (LTE) radio frame structure.

FIG. 3 illustrates LTE radio frame structures. LTE supports frame type 1 for frequency division duplex (FDD), frame type 2 for time division duplex (TDD), and frame type 3 for an unlicensed cell (UCell). Up to 31 secondary cells (SCells) may be aggregated in addition to a primary cell (PCell). Unless otherwise specified, operations described in the disclosure may be applied independently on a cell basis. In multi-cell aggregation, different frame structures may be used for different cells. Further, time resources (e.g., a subframe, a slot, and a subslot) within a frame structure may be generically referred to as a time unit (TU).

FIG. 3(a) illustrates frame type 1. A DL radio frame is defined by 10 1-ms subframes (SFs). A subframe includes 14 or 12 symbols according to a cyclic prefix (CP). In a normal CP case, a subframe includes 14 symbols, and in an extended CP case, a subframe includes 12 symbols. Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

FIG. 3(b) illustrates frame type 2. Frame type 2 includes two half frames. A half frame includes 4 (or 5) general subframes and 1 (or 0) special subframe. According to a UL-DL configuration, a general subframe is used for UL or DL. A subframe includes two slots.

The above-described radio frame structures are merely exemplary, and the number of subframes in a radio frame, the number of slots in a subframe, and the number of symbols in a slot may vary.

Figure 4:
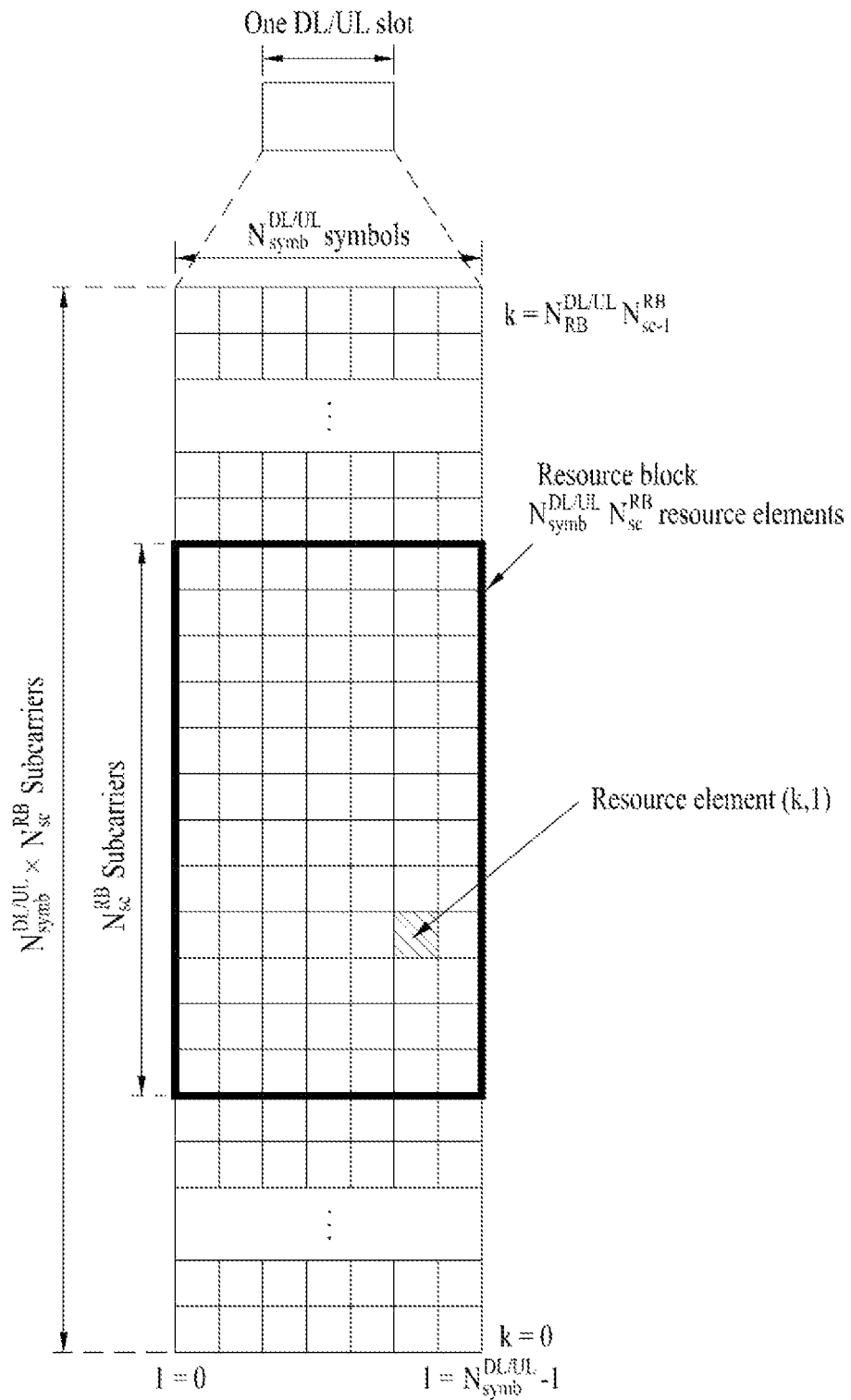
FIG. 4 illustrates the structure of a slot in an LTE frame.

FIG. 4 is a diagram illustrating a slot structure in an LTE frame.

Referring to FIG. 4, a slot includes a plurality of symbols in the time domain by a plurality of resource blocks (RBs) in the frequency domain. A symbol may refer to a symbol duration.

A slot structure may be represented as a resource grid including $N^{DL/UL}_{RB} \times N^{RB}_{sc}$ subcarriers and $N^{DL/UL}_{symb}$ symbols. $N^{DL}_{RB}$ represents the number of RBs in a DL slot, and $N^{UL}_{RB}$ represents the number of RBs in a UL slot. $N^{DL}_{RB}$ and $N^{UL}_{RB}$ are dependent on a DL bandwidth and a UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers in one RB. The number of symbols in a slot may vary according to a subcarrier spacing (SCS) and a CP length. For example, one slot includes 7 symbols in the normal CP case, whereas one slot includes 6 symbols in the extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource including one symbol by one subcarrier is referred to as a resource element (RE) or tone. Each RE of a resource grid may be uniquely identified by an index pair (k, l) in a slot where k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Up to three (or four) OFDM(A) symbols at the beginning of the first slot of a subframe correspond to a control region. The remaining OFDM(A) symbols correspond to a data region in which a PDSCH is allocated, and a basic resource unit of the data region is an RB. DL control channels include physical control format indicator channel (PCFICH), PDCCH, physical hybrid-ARQ indicator channel (PHICH), and so on. The PCFICH is transmitted in the first OFDM symbol of a subframe, conveying information about the number of OFDM symbols used for transmission of control channels in the subframe. The PHICH is a response to a UL transmission, conveying an HARQ ACK/NACK signal. Control information delivered on the PDCCH is called downlink control information (DCI). The DCI includes UL resource allocation information, DL resource control information, or a UL transmit power control command for any UE group.

A subframe includes two 0.5-ms slots. Each slot includes a plurality of symbols, each corresponding to one SC-FDMA symbol. An RB is a resource allocation unit corresponding to 12 subcarriers in the frequency domain by one slot in the time domain. An LTE UL subframe is divided largely into a control region and a data region. The data region is communication resources used for each UE to transmit data such as voice, packets, and so on, including a PUSCH. The control region is communication resources used for each UE to transmit a DL channel quality report, an ACK/NACK for a DL signal, a UL scheduling request, and so on, including a PUCCH. A sounding reference signal (SRS) is transmitted in the last SC-FDMA symbol of a subframe in the time domain.

Figure 5:
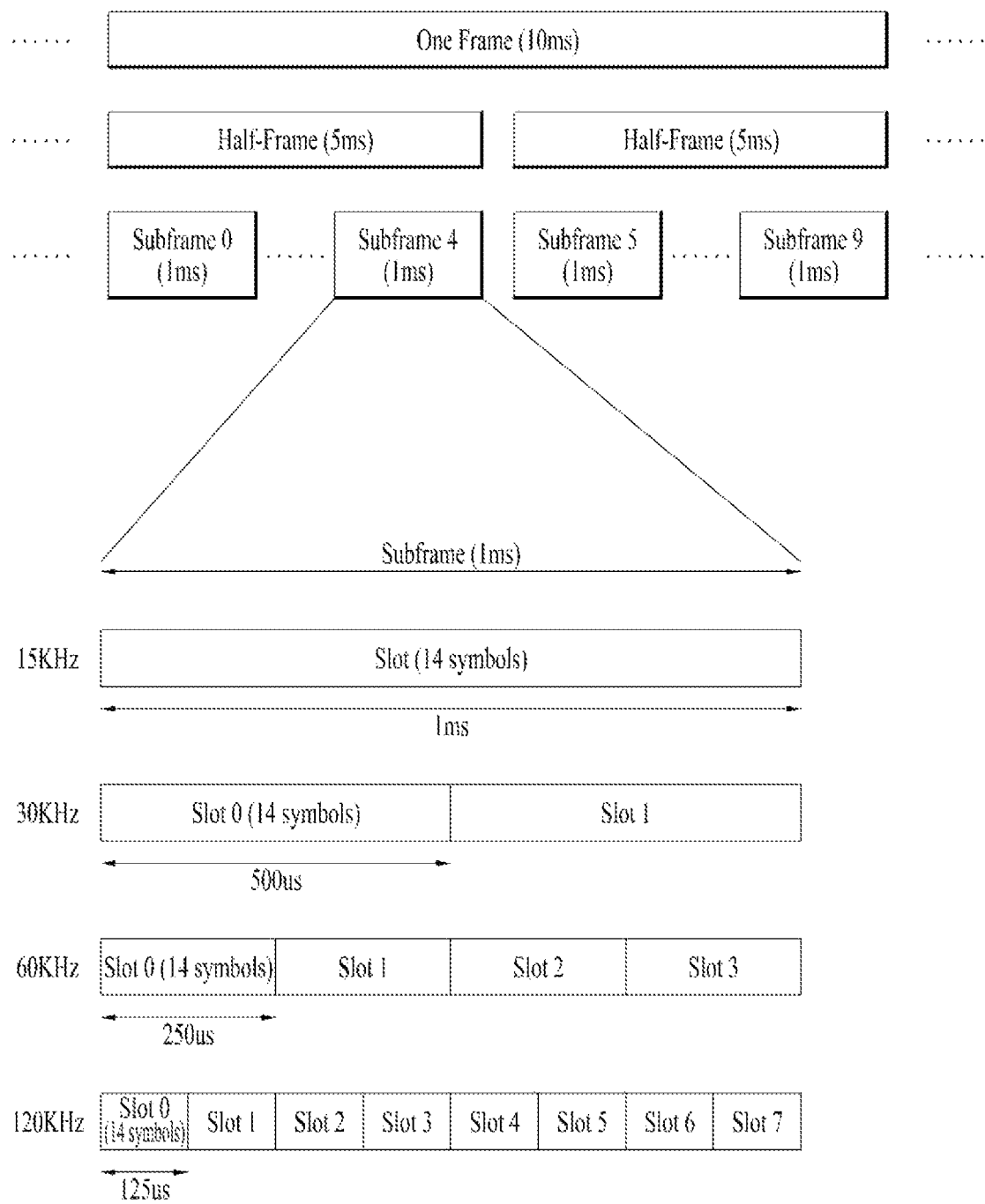
FIG. 5 illustrates the structure of a radio frame used in a new radio (NR) system.

FIG. 5 illustrates a radio frame structure used in an NR system.

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on an SCS. Each slot includes 12 or 14 OFDM(A) symbols according to a CP. When a normal CP is used, each slot includes 14 OFDM symbols. When an extended CP is used, each slot includes 12 OFDM symbols. A symbol may include an OFDM symbol (CP-OFDM symbol) and an SC-FDMA symbol (or DFT-s-OFDM symbol).

Table 1 exemplarily illustrates that the number of symbols per slot, the number of slots per frame, and the number of slots per subframe vary according to SCSs in the normal CP case.

TABLE 1

| SCS ($15 \times 2^\mu$) | $N^{slot}_{symb}$ | $N^{frame,\mu}_{slot}$ | $N^{subframe,\mu}_{slot}$ |
|---|---|---|---|
| 15 KHz ($\mu = 0$) | 14 | 10 | 1 |
| 30 KHz ($\mu = 1$) | 14 | 20 | 2 |

TABLE 1-continued

| SCS (15 × $2^\mu$) | $N_{symb}^{slot}$ | $N_{slot}^{frame,\mu}$ | $N_{slot}^{subframe,\mu}$ |
|---|---|---|---|
| 60 KHz (μ = 2) | 14 | 40 | 4 |
| 120 KHz (μ = 3) | 14 | 80 | 8 |
| 240 KHz (μ = 4) | 14 | 160 | 16 |

$N_{symb}^{slot}$: number of symbols in a slot
$N_{slot}^{frame,\mu}$: number of slots in a frame
$N_{slot}^{subframe,\mu}$: number of slots in a subframe Table 2 illustrates that the number of symbols per slot, the number of slots per frame, and the number of slots per subframe vary according to SCSs in the extended CP case.

TABLE 2

| SCS (15 × $2^\mu$) | $N_{symb}^{slot}$ | $N_{slot}^{frame,\mu}$ | $N_{slot}^{subframe,\mu}$ |
|---|---|---|---|
| 60 KHz (μ = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a TU) including the same number of symbols may be configured differently for the aggregated cells.

Figure 6:
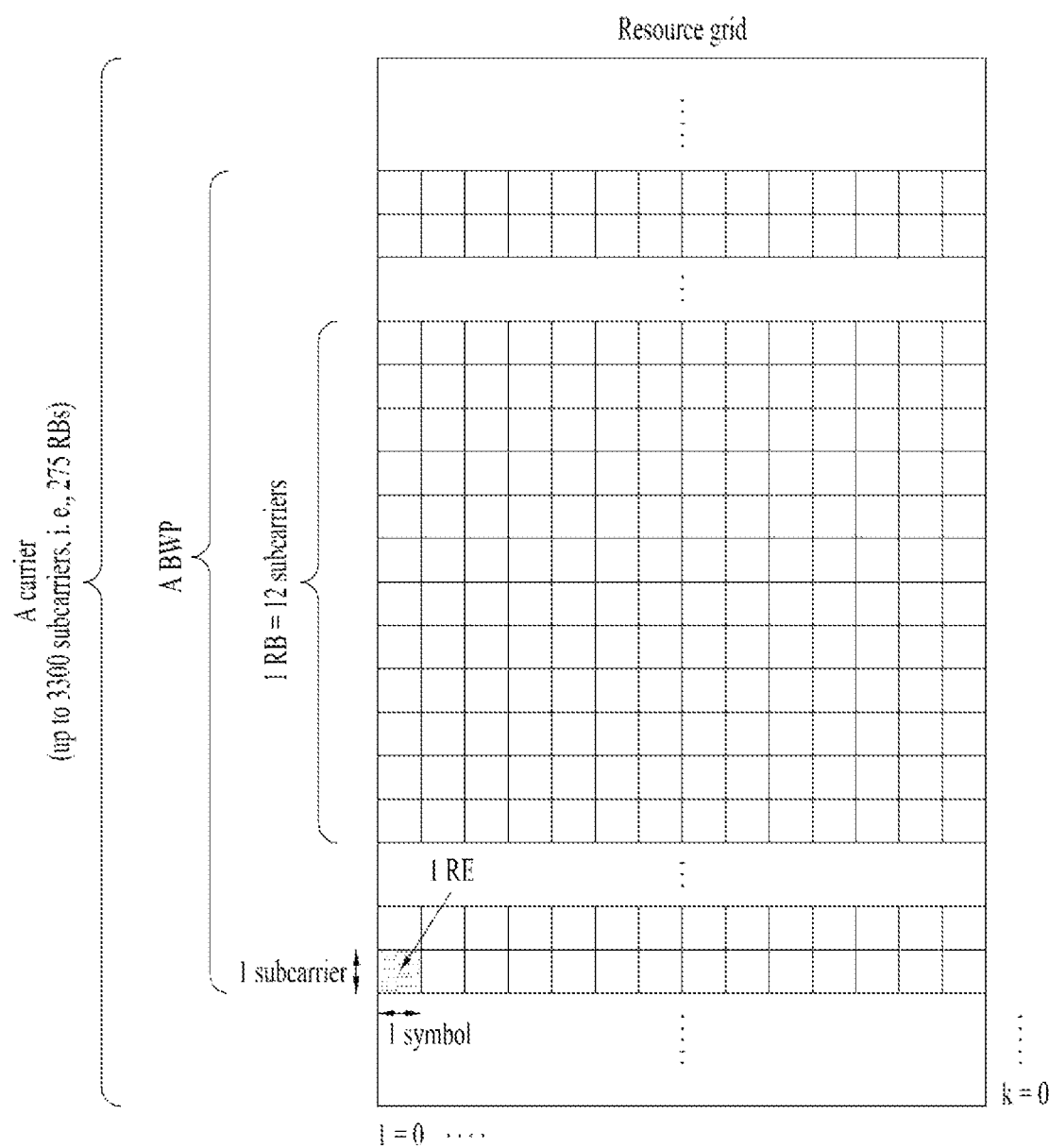
FIG. 6 illustrates the structure of a slot in an NR frame.

FIG. 6 illustrates a slot structure of an NR frame.

A slot includes a plurality of symbols in the time domain. For example, one slot includes 14 symbols in the normal CP case and 12 symbols in the extended CP case. A carrier includes a plurality of subcarriers in the frequency domain. An RB may be defined by a plurality of (e.g., 12) consecutive subcarriers in the frequency domain. A bandwidth part (BWP) may be defined by a plurality of consecutive (P)RBs in the frequency domain and correspond to one numerology (e.g., SCS, CP length, and so on). A carrier may include up to N (e.g., 5) BWPs. Data communication may be conducted in an active BWP, and only one BWP may be activated for one UE. Each element of a resource grid may be referred to as an RE, to which one complex symbol may be mapped.

B. UL and DL Channels

DL Channels

A BS transmits related signals on DL channels to a UE, and the UE receives the related signals on the DL channels from the BS.

(1) Physical Downlink Shared Channel (PDSCH)

The PDSCH delivers DL data (e.g., a DL shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a demodulation reference signal (DMRS) to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

The UE acquires DCI delivered on the PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in a CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 3 lists exemplary features of each search space type.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 3-continued

| Type | Search Space | RNTI | Use Case |
|---|---|---|---|
| | UE Specific | C-RNTI, or MCS-C-RNTI, or CS-RNTI(s) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

UL Channels

A UE transmits related signals on UL channels to a BS, and the BS receives the related signals on the UL channels from the UE.

(1) Physical Uplink Shared Channel (PUSCH)

The PUSCH delivers UL data (e.g., UL shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be scheduled dynamically by a UL grant in DCI, or semi-statically by higher-layer signaling (e.g., RRC signaling) (and/or layer 1 (L1) signaling such as a PDCCH) (configured grant). The PUSCH transmission may be performed in a codebook-based or non-codebook-based manner.

(2) Physical Uplink Control Channel (PUCCH)

The PUCCH delivers UCI, an HARQ ACK, and/or an SR and is classified as a short PUCCH or a long PUCCH according to the transmission duration of the PUCCH. Table 5 lists exemplary PUCCH formats.

TABLE 5

| PUCCH format | Length in OFDM symbols $N_{symb}^{PCCCI}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre OFT OCC) |

C. Machine Type Communication (MTC)

MTC, which is a type of data communication involving one or more machines, may be applied to machine-to-machine (M2M) or Internet of things (IoT). A machine refers to an entity that does not require direct human manipulation or intervention. For example, machines include a smart meter equipped with a mobile communication module, a vending machine, a portable terminal having an MTC function, and so on. For example, services such as meter reading, water level measurement, use of surveillance cameras, and inventory reporting of vending machines may be provided through MTC. MTC has the features of a small amount of transmission data and intermittent UL/DL data transmissions/receptions. Therefore, it is efficient to lower the unit cost of MTC devices and reduce battery consumption in correspondence with low data rates. An MTC device generally has low mobility, and thus MTC is conducted in a channel environment which hardly changes.

The 3GPP has applied MTC since release 10, and MTC may be implemented to satisfy the requirements of low cost and low complexity, coverage enhancement, and low power consumption. For example, 3GPP Release 12 added features for low-cost MTC devices and thus defined UE category 0. A UE category is an indicator indicating the amount of data that a UE may process in a communication modem. A UE of UE category 0 may reduce baseband/radio frequency (RF) complexity by using a reduced peak data rate, a half-duplex operation with relaxed RF requirements, and a single reception (Rx) antenna. In 3GPP Release 12, enhanced MTC (eMTC) was introduced, and the price and power consumption of MTC UEs were further lowered by operating the MTC UEs only at 1.08 MHz (that is, 6 RBs), a minimum frequency bandwidth supported in legacy LTE.

While the present disclosure is described mainly in the context of features related to eMTC, the present disclosure is equally applicable to MTC, eMTC, and MTC applied to 5G (or NR) unless otherwise specified. For the convenience of description, MTC, eMTC, and MTC applied to 5G (or NR) are generically referred to as MTC herein.

FIG. 7 illustrates cell coverage enhancement in MTC. Coverage enhancement may also be expressed as coverage extension, and a technique for coverage enhancement described in relation to MTC may be applied to NB-IoT and 5G (or NR) in the same/similar manner.

For cell extension or cell enhancement (CE) of a BS 1204 to an MTC device 1202, various CE techniques are under discussion. For example, for CE, the BS/UE may transmit/receive one physical channel/signal in a plurality of occasions (a bundle of physical channels). The physical channel/signal may be repeatedly transmitted/received according to a predefined rule during a bundle interval. A receiver may increase the decoding success rate of the physical channel/signal by decoding some or all of the physical channel/signal bundle. An occasion may mean resources (e.g., time/frequency) in which a physical channel/signal may be transmitted/received. An occasion for a physical channel/signal may include a subframe, a slot, or a symbol set in the time domain. The symbol set may include one or more consecutive OFDM-based symbols. An OFDM-based symbol may include an OFDM(A) symbol and a DFT-s-OFDM(A) (i.e., SC-FDM(A)) symbol. The occasion for a physical channel/signal may include a frequency band or an RB set in the frequency domain. For example, a PBCH, a PRACH, an MTC PDCCH (MPDCCH), a PDSCH, a PUCCH, and a PUSCH may be repeatedly transmitted/received.

MTC supports an operation mode for CE, and a mode supporting repeated transmissions/receptions of a signal for CE may be referred to as a CE mode. The number of repeated transmissions/receptions of a signal for CE may be referred to as a CE level. Table 6 illustrates exemplary CE modes/levels supported in MTC.

TABLE 6

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

A first mode (e.g. CE Mode A) is defined for small CE, supporting full mobility and CSI feedback, in which no repetition or a small number of repetitions are performed. A first-mode operation may be identical to the operation range of UE category 1. A second mode (e.g., CE Mode B) is defined for UEs in an extremely poor coverage condition, supporting CSI feedback and limited mobility, in which a large number of repeated transmissions are defined. The second mode provides up to 15 dB of CE with respect to the range of UE category 1. Each level of MTC is defined differently for a random access procedure (or RACH procedure) and a paging procedure.

FIG. 8 illustrates MTC signal bands.

Referring to FIG. 8, to reduce the unit cost of MTC UEs, MTC may be conducted only in a specific band (or channel band) (MTC subband or narrowband (NB)) of the system bandwidth of a cell, regardless of the system bandwidth of the cell. For example, an MTC UE may perform a UL/DL operation only in a 1.08-MHz frequency band. 1.08 MHz corresponds to six consecutive PRBs in the LTE system, and is defined to enable MTC UEs to follow the same cell search and random access procedures as LTE UEs. FIG. 8(*a*) illustrates an MTC subband configured at the center of a cell (e.g., center 6 PRBs), and FIG. 8(*b*) illustrates a plurality of MTC subbands configured within a cell. The plurality of MTC subbands may be configured contiguously/non-contiguously in the frequency domain. Physical channels/signals for MTC may be transmitted and received in one MTC subband. In the NR system, an MTC subband may be defined in consideration of a frequency range and an SCS. In the NR system, for example, the size of an MTC subband may be defined as X consecutive PRBs (i.e., $0.18*X*(2^\mu)$ MHz bandwidth) (see Table 1 for $\mu$). X may be set to 20 according to the size of a synchronization signal/physical broadcast channel (SS/PBCH) block. In the NR system, MTC may operate in at least one BWP. A plurality of MTC subbands may be configured in a BWP.

Figure 9:
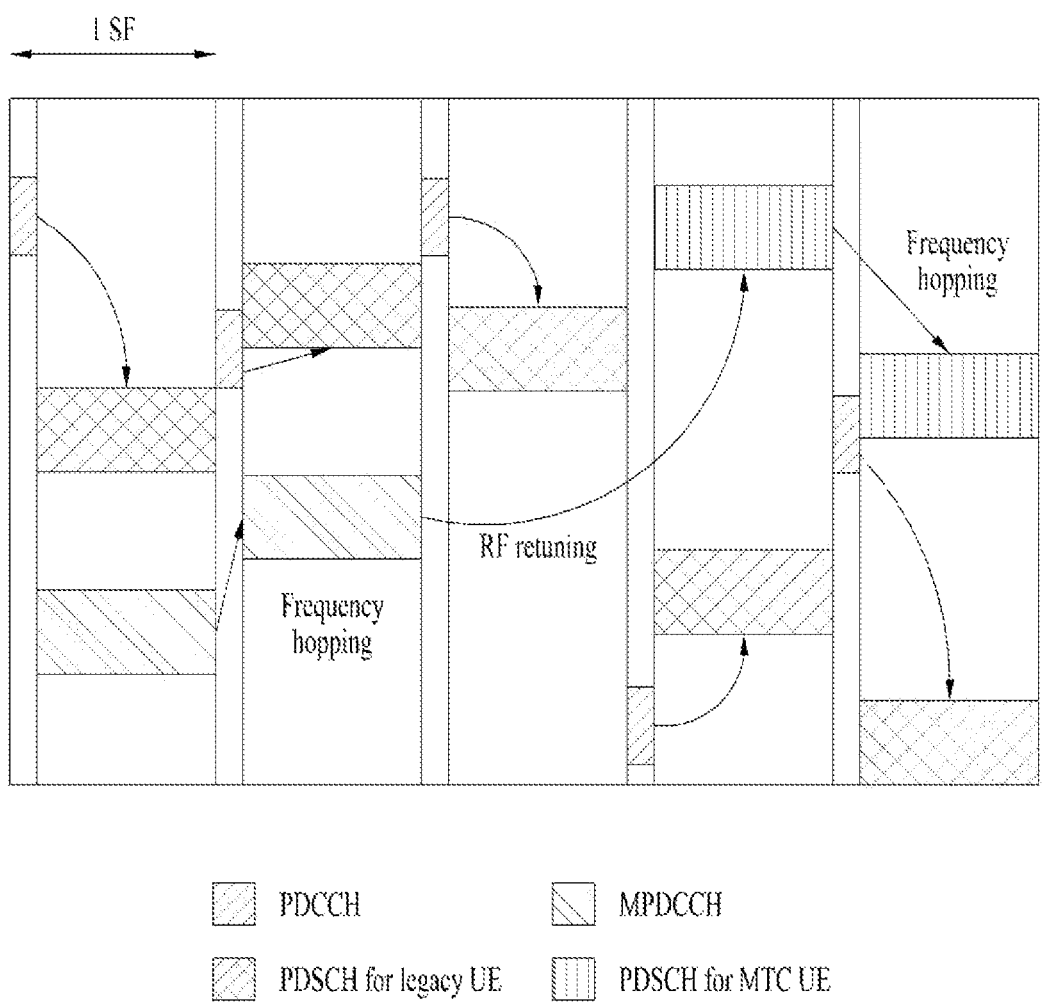
FIG. 9 illustrates scheduling in legacy LTE and MTC.

FIG. 9 illustrates scheduling in legacy LTE and MTC.

Referring to FIG. 9, a PDSCH is scheduled by a PDCCH in legacy LTE. Specifically, the PDCCH may be transmitted in the first N OFDM symbols in a subframe (N=1 to 3), and the PDSCH scheduled by the PDCCH is transmitted in the same subframe. In MTC, a PDSCH is scheduled by an MPDCCH. Accordingly, an MTC UE may monitor MPDCCH candidates in a search space within a subframe. The monitoring includes blind decoding of the MPDCCH candidates. The MPDCCH delivers DCI, and the DCI includes UL or DL scheduling information. The MPDCCH is multiplexed with the PDSCH in FDM in a subframe. The MPDCCH is repeatedly transmitted in up to 256 subframes, and the DCI carried in the MPDCCH includes information about an MPDCCH repetition number. In DL scheduling, when the repeated transmissions of the MPDCCH end in subframe #N, transmission of the PDSCH scheduled by the MPDCCH starts in subframe #N+2. The PDSCH may be repeatedly transmitted in up to 2048 subframes. The MPDCCH and the PDSCH may be transmitted in different MTC subbands. In UL scheduling, when the repeated transmissions of the MPDCCH end in subframe #N, transmission of a PUSCH scheduled by the MPDCCH starts in subframe #N+4. For example, when the PDSCH is repeatedly transmitted in 32 subframes, the PDSCH may be transmitted in the first 16 subframes in a first MTC subband, and in the remaining 16 subframes in a second MTC subband. MTC operates in a half-duplex mode. MTC HARQ retransmission is adaptive and asynchronous.

D. Narrowband Internet of Things (NB-IoT)

NB-IoT is a narrowband Internet of things technology supporting a low-power wide area network through an existing wireless communication system (e.g., LTE or NR). Further, NB-IoT may refer to a system supporting low complexity and low power consumption in a narrowband (NB). Since an NB-IoT system uses the same OFDM parameters as those of an existing system, such as an SCS, there is no need to allocate an additional band separately for the NB-IoT system. For example, one PRB of an existing system band may be allocated for NB-IoT. Considering that an NB-IoT UE perceives a single PRB as a carrier, PRB and carrier may be interpreted as the same meaning in the description of NB-IoT.

NB-IoT may operate in a multi-carrier mode. In NB-IoT, a carrier may be defined as an anchor type carrier (i.e., anchor carrier or anchor PRB) or a non-anchor type carrier (i.e., non-anchor carrier or non-anchor PRB). From the perspective of a BS, the anchor carrier may mean a carrier carrying a narrowband PSS (NPSS), a narrowband SSS (NSSS), and a narrowband PBCH (NPBCH) for initial access, and a narrowband PDSCH (NPDSCH) for a narrowband system information block (N-SIB). That is, in NB-IoT, a carrier for initial access may be referred to as an anchor carrier, and the other carrier(s) may be referred to as non-anchor carrier(s). One or more anchor carriers may exist in the system.

While NB-IoT is described mainly in the context of being applied to the legacy LTE system in the present disclosure, the description may be extended to a next-generation system (e.g., NR system). In the present disclosure, the description of NB-IoT may be extended to MTC serving a similar technical purpose (e.g., low-power, low-cost, and CE). The term NB-IoT may be replaced with other equivalent terms such as NB-LTE, NB-IoT enhancement, enhanced NB-IoT, further enhanced NB-IoT, and NB-NR.

NB-IoT DL physical channels include NPBCH, NPDSCH, and NPDCCH, and NB-IoT DL physical signals include NPSS, NSSS, and narrowband RS (NRS).

A different NB-IoT frame structure may be configured according to an SCS. For example, the NB-IoT system may support a 15 kHz SCS and a 3.75 kHz SCS. NB-IoT may be considered for any other SCS (e.g., 30 kHz) with different time/frequency units, not limited to the 15 kHz SCS and the 3.75 kHz SCS. While the NB-IoT frame structure based on the LTE system frame structure has been described herein for the convenience of description, the present disclosure is not limited thereto, and methods described in the present disclosure may be extended to NB-IoT based on a frame structure of the next-generation system (e.g., NR system).

An NB-IoT frame structure for the 15 kHz SCS may be configured to be identical to the frame structure of the above-described legacy system (i.e., LTE system). That is, a 10-ms NB-IoT frame may include 10 1-ms NB-IoT subframes, each including two 0.5-ms NB-IoT slots. Each 0.5-ms NB-IoT slot may include 7 OFDM symbols.

For the 3.75 kHz SCS, a 10-ms NB-IoT frame includes 5 2-ms NB-IoT subframes, each including 7 OFDM symbols and one guard period (GP). A 2-ms NB-IoT subframe may also be referred to as an NB-IoT slot or an NB-IoT resource unit (RU).

NB-IoT DL physical resources may be configured based on the configuration of physical resources in another wireless communication system (e.g., LTE or NR), except that an NR system bandwidth is a certain number of RBs (e.g., one RB, i.e., 180 kHz). For example, when the NB-IoT DL supports only the 15 kHz SCS, the NB-IoT DL physical resources may be configured as the resource area of one RB (i.e., one PRB) in the frequency domain, to which the resource grid of the LTE system illustrated in FIG. 4 is limited, as described above. Likewise, for NB-IoT UL physical resources, the system bandwidth may be limited to one RB.

Figure 10:
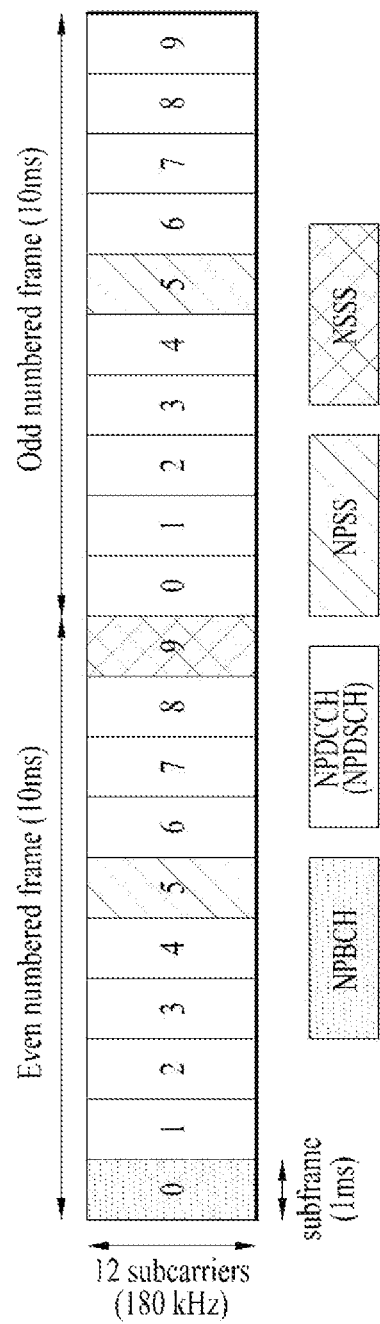
FIG. 10 illustrates transmission of downlink physical channels/signals in narrowband Internet of Things (NB-IoT).

FIG. 10 illustrates transmission of NB-IoT DL physical channels/signals. An NB-IoT DL physical channel/signal is transmitted in one PRB and supports the 15 kHz SCS/multi-tone transmission.

Referring to FIG. 10, the NPSS is transmitted in the sixth subframe of every frame, and the NSSS is transmitted in the last (e.g., tenth) subframe of every even-numbered frame. A UE may acquire frequency, symbol, and frame synchronization using the synchronization signals (NPSS and NSSS) and search 504 physical cell IDs (PCIDs) (i.e., BS IDs). The NPBCH is transmitted in the first subframe of every frame, carrying an NB-MIB. The NRS is provided as an RS for DL physical channel demodulation and generated in the same manner as in LTE. However, an NB-PCID (NCell ID or NB-IoT BS ID) is used as an initialization value for generation of an NRS sequence. The NRS is transmitted through one or two antenna ports. The NPDCCH and the NPDSCH may be transmitted in the remaining subframes except for the subframes carrying the NPSS, the NSSS, and the NPBCH. The NPDCCH and the NPDSCH may not be transmitted in the same subframe. The NPDCCH carries DCI, and the DCI supports three types of DCI formats. DCI format N0 includes NPUSCH scheduling information, and DCI formats N1 and N2 include NPDSCH scheduling information. The NPDCCH may be transmitted up to 2048 times, for CE. The NPDSCH is used to transmit data (e.g., TB) of a transport channel such as a DL-SCH and a paging channel (PCH). A maximum TB size (TBS) is 680 bits, and a TB may be repeatedly transmitted up to 2048 times, for CE.

NB-IoT UL physical channels include narrowband PRACH (NPRACH) and NPUSCH, and support single-tone transmission and multi-tone transmission. Single-tone transmission is supported for the SCSs of 3.5 kHz and 15 kHz, and multi-tone transmission is supported only for the 15 kHz SCS.

SC-FDMA may be applied to NB-IoT UL based on the SCS of 15 kHz or 3.75 kHz. Multi-tone transmission and single-tone transmission may be supported for the NB-IoT UL. For example, multi-tone transmission is supported only for the 15 kHz SCS, and single-tone transmission may be supported for the SCSs of 15 kHz and 3.75 kHz.

As mentioned in relation to the NB-IoT DL, the physical channels of the NB-IoT system may have names added with "N (Narrowband)" to distinguish them from the channels of the existing systems. For example, the NB-IoT UL physical channels may include NPRACH, NPUSCH, and so on, and the NB-IoT UL physical signals may include narrowband DMRS (NDMRS).

The NPUSCH may be configured in NPUSCH format 1 or NPUSCH format 2. For example, NPUSCH format 1 may be used to carry (or deliver) a UL-SCH, and NPUSCH format 2 may be used to transmit UCI such as an HARQ ACK.

Characteristically, the UL channel of the NB-IoT system, NPRACH may be repeatedly transmitted, for CE. In this case, frequency hopping may be applied to the repeated transmissions.

E. Network Access and Communication Procedure

A UE may perform a network access procedure to perform the procedures and/or methods described/proposed in the present disclosure. For example, the UE may receive system information and configuration information required to perform the described/proposed procedures and/or methods and store the received information in a memory, during network (BS) access. The configuration information required for the present disclosure may be received by higher-layer signaling (e.g., RRC layer signaling, MAC-layer signaling, or the like).

Figure 11:
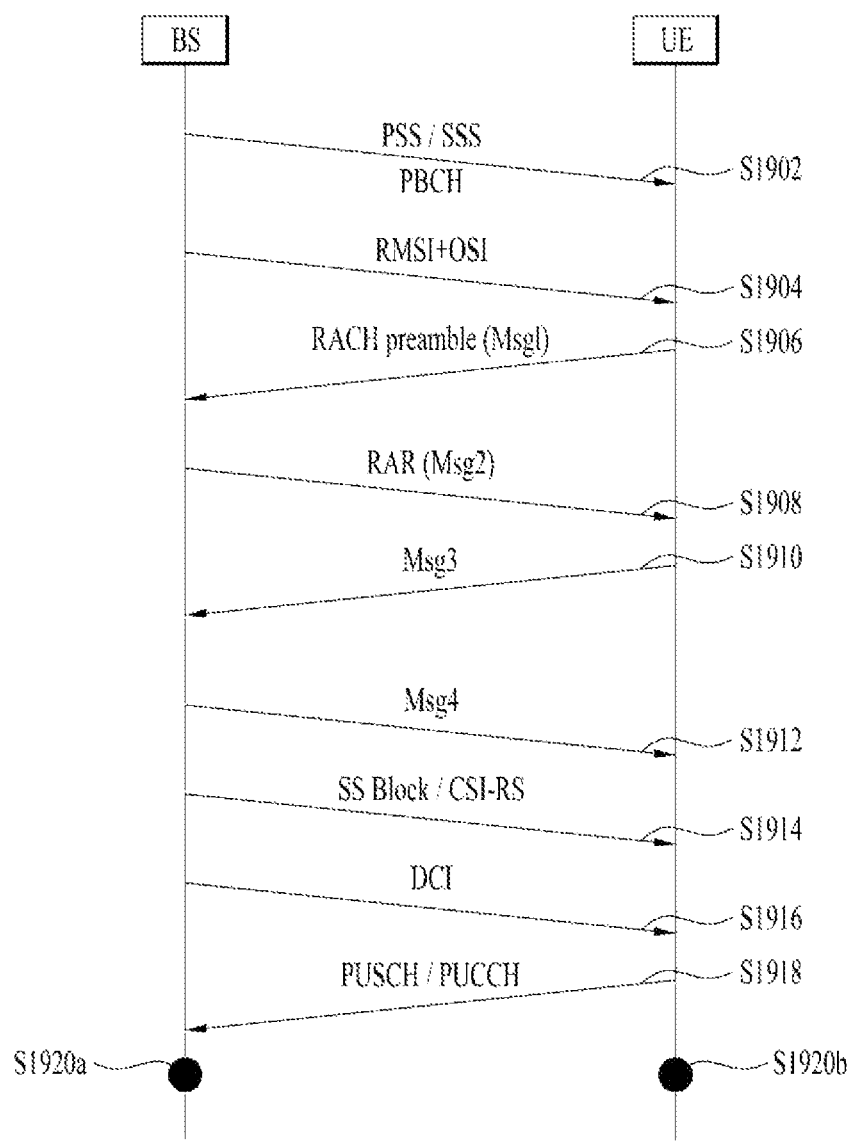
FIG. 11 illustrates initial network access and subsequent communication processes in the NR system.

FIG. 11 is a diagram illustrating a signal flow for an initial network access procedure and a subsequent communication procedure in the NR system. In NR, a physical channel and an RS may be transmitted by beamforming. When beamforming-based signal transmission is supported, a beam management process may be involved to align beams between a BS and a UE. Further, signals proposed in the present disclosure may be transmitted/received by beamforming. In RRC idle mode, beam alignment may be performed based on an SSB, whereas in RRC connected mode, beam alignment may be performed based on a CSI-RS (in DL) and an SRS (in UL). On the contrary, when beamforming-based signal transmission is not supported, an operation related to a beam may be skipped in the description of the present disclosure.

Referring to FIG. 11, a BS may periodically transmit an SSB (S1902). The SSB includes a PSS, an SSS, and a PBCH. The SSB may be transmitted by beam sweeping. The PBCH includes an MIB, and the MIB may include scheduling information for remaining minimum system information (RMSI). Subsequently, the BS may transmit the RMSI and other system information (OSI) (S1904). The RMSI may include information (e.g., PRACH configuration information) required for a UE to initially access the BS. After detecting SSBs, the UE identifies the best SSB. The UE may then transmit an RACH preamble (message 1 or Msg1) to the BS in PRACH resources linked/corresponding to the index (i.e., beam) of the best SSB (S1906). The beam direction of the RACH preamble is associated with the PRACH resources. The association between the PRACH resources (and/or the RACH preamble) and the SSB (index) may be configured by system information (e.g., RMSI). As part of the random access procedure (or RACH procedure), the BS may transmit an RAR (Msg2) in response to the RACH preamble (S1908). The UE may transmit Msg3 (e.g., RRC Connection Request) based on a UL grant included in the RAR (S1910), and the BS may transmit a contention resolution message (Msg4) (S1920). Msg4 may include an RRC Connection Setup message.

When an RRC connection is established between the BS and the UE in the random access procedure (or RACH procedure), a subsequent beam alignment may be performed based on an SSB/CSI-RS (in DL) and an SRS (in UL). For example, the UE may receive an SSB/CSI-RS (S1914). The SSB/CSI-RS may be used for the UE to generate a beam/CSI report. The BS may request a beam/CSI report to the UE by DCI (S1916). In this case, the UE may generate a beam/CSI report based on the SSB/CSI-RS, and transmit the generated beam/CSI report to the BS on a PUSCH/PUCCH (S1918). The beam/CSI report may include a beam measurement result, information about a preferred beam, and so on. The BS and the UE may switch a beam based on the beam/CSI report (S1920a and S1920b).

Subsequently, the UE and the BS may perform the above-described/proposed procedures and/or methods. For example, the UE and the BS may process information stored in the memory and transmit a radio signal or process a received radio signal and store the processed signal in the memory according to a proposal of the present disclosure, based on the configuration information obtained in the network access procedure (e.g., the system information acquisition procedure, the RRC connection procedure through an RACH, and so on). The radio signal may include at least one of a PDCCH, a PDSCH, or an RS for DL, and at least one of a PUCCH, a PUSCH, or an SRS for UL.

Basically, the above description may be applied commonly to MTC and NB-IoT. The difference between MTC and NB-IoT will further be described below.

MTC Network Access Procedure

An MTC network access procedure will be further described in the context of LTE. The following description may be extended to NR as well. In FIG. 1 and/or FIG. 11, a PDCCH is replaced by an MPDCCH (e.g., see FIG. 9 and the related description).

In LTE, an MIB includes 10 reserved bits. In MTC, 5 most significant bits (MSBs) out of the 10 reserved bits of the MIB are used to indicate scheduling information for system information block for bandwidth reduced device (SIB1-BR). The 5 MSBs are used to indicate the repetition number and TBS of the SIB1-BR. The SIB1-BR is transmitted on a PDSCH. The SIB1-BR may be kept unchanged in 512 radio frames (5120 ms) to allow combining of multiple subframes. The SIB1-BR delivers similar information to that of SIB1 in LTE.

An MTC random access procedure (or RACH procedure) is basically identical to the LTE random access procedure (or RACH procedure) (e.g., see FIG. 2 and the related description), except that the former is performed based on a CE level. For example, whether the PRACH is repeatedly transmitted and/or the repetition number of the PRACH may vary with CE levels, for PRACH CE. As described with reference to Table 6, a mode supporting repeated transmissions of a signal for CE is referred to as a CE mode, and the repetition number of the signal for CE is referred to as a CE level. For example, as illustrated in Table 6, the first mode (e.g., CE Mode A) is a mode for small CE supporting full mobility and CSI feedback, in which no repetition or a small number of repetitions may be set. The second mode (e.g., CE Mode B) is a mode for a UE in an extremely poor coverage condition, supporting CSI feedback and limited mobility, in which a large repetition number may be set.

The BS broadcasts system information including a plurality of (e.g., three) reference signal received power (RSRP) thresholds, and the UE may determine a CE level by comparing the RSRP thresholds with an RSRP measurement. The following information may be independently configured on a CE level basis by system information.

PRACH resource information: the periodicity/offset of PRACH occasions, and PRACH frequency resources Preamble Group: Preamble set allocated for each CE level Repetition number per preamble attempt and maximum number of preamble attempts RAR window time: the length of a time period during which RAR reception is expected (e.g., in subframes)

Contention resolution window time: the length of a time period during which a contention resolution message is expected to be received The UE may select PRACH resources corresponding to its CE level and then perform a PRACH transmission in the selected PRACH resources. A PRACH waveform used in MTC is identical to a PRACH waveform used in LTE (e.g., OFDM and Zadoff-Chu sequence). Signals/messages transmitted after the PRACH may also be repeatedly transmitted, and their repetition numbers may be independently set according to CE modes/levels.

NB-IoT Network Access Procedure

A NB-IoT network access procedure will be further described in the context of LTE. The following description may be extended to NR as well. In FIGS. 1 and 11, PSS, SSS, and PBCH are replaced with NPSS, NSSS, and NPBCH in NB-IoT, respectively. For details of the NPSS, the NSSS and the NPBCH, refer to FIG. 10. Further, PDCCH, PDSCH, PUSCH, and PRACH are replaced with NPDCCH, NPDSCH, NPUSCH, and NPRACH, respectively in FIG. 1 and/or FIG. 11.

The NB-IoT random access procedure (or RACH procedure) is basically identical to the LTE random access procedure (or RACH procedure) (e.g., see FIG. 2 and the related description), differing in the following. First, RACH preamble formats are different. In LTE, a preamble is based on a code/sequence (e.g., Zadoff-Chu sequence), whereas in NB-IoT, a preamble is a subcarrier. Second, the NB-IoT random access procedure (or RACH procedure) is performed based on a CE level. Therefore, different PRACH resources are allocated for different CE levels. Third, since SR resource are not configured in NB-IoT, a UL resource allocation request is transmitted in the random access process (or RACH procedure) in NB-IoT.

FIG. 12 illustrates preamble transmission on the NB-IoT RACH.

Referring to FIG. 12, an NPRACH preamble includes four symbol groups, each including a CP and a plurality of (e.g., 5)SC-FDMA symbols. In NR, SC-FDMA symbol may be replaced with OFDM symbol or DFT-s-OFDM symbol. For the NPRACH, only single-tone transmission with the 3.75 kHz SCS is supported, and CPs of 66.7 μs and 266.67 μs in length are provided to support different cell radii. Frequency hopping takes place in each symbol group, in the following hopping pattern. Subcarriers carrying the first symbol group are determined pseudo-randomly. 1-subcarrier hop, 6-subcarrier hop, and 1-subcarrier hop take place respectively in the second, third, and fourth symbol groups. In the case of repeated transmissions, the frequency hopping procedure is repeatedly applied, and the NPRACH preamble may be repeatedly transmitted {1, 2, 4, 8, 16, 32, 64, 128} times, for CE. NPRACH resources may be configured on a CE level basis. The UE may select NPRACH resources based on a CE level determined according to a DL measurement result (e.g., RSRP), and transmit the RACH preamble in the selected NPRACH resources. The NPRACH may be transmitted on an anchor carrier, or a non-anchor carrier configured with the NPRACH resources.

F. Symbols, Abbreviations, and Terms

The following symbols/abbreviations/terms are used in this document.

PDCCH: PDCCH is the abbreviation of Physical Downlink Control Channel. The PDCCH refers to a physical layer communication channel for providing DL control information. The methods proposed in the present disclosure are applicable to various PDCCH structures such as an enhanced-PDCCH (EPDCCH), an MTC-PDCCH (MPDCCH), and a narrowband-PDCCH (NPDCCH) even unless otherwise specified. In this document, the PDCCH is used as a term representing various PDCCH structures unless stated otherwise.

PUCCH: PUCCH is the abbreviation of Physical Uplink Control Channel. The PUCCH refers to a physical layer communication channel for providing UL control information. The methods proposed in the present disclosure are applicable to various PUCCH structures even unless otherwise specified. In this document, the PUCCH is used as a term representing various PUCCH structures unless stated otherwise.

PDSCH: PDSCH is the abbreviation of Physical Downlink Shared Channel. The PDSCH refers to a physical layer communication channel for providing DL data. The methods proposed in the present disclosure are applicable to various PDSCH structures such as a narrowband-PDSCH (NPDSCH) even unless otherwise specified. In this document, the PDSCH is used as a term representing various PDSCH structures unless stated otherwise.

PUSCH: PUSCH is the abbreviation of Physical Uplink Shared Channel. The PUSCH refers to a physical layer communication channel for providing UL data. The methods proposed in the present disclosure are applicable to various PUSCH structures such as a narrowband-PUSCH (NPUSCH) even unless otherwise specified. In this document, the PUSCH is used as a term representing various PUSCH structures unless stated otherwise.

DCI: DCI is the abbreviation of Downlink Control Information.

UCI: UCI is the abbreviation of Uplink Control Information.

NDI: NDI is the abbreviation of New Data Indicator. The NDI may be included in DCI (transmitted over the PDCCH). The NDI may indicate whether new data is transmitted or received on the PDSCH/PUSCH scheduled by the DCI or previous data is retransmitted CB: CB is the abbreviation of Code Block.

CBG: CBG is the abbreviation of Code Block Group.

TB: TB is the abbreviation of Transport Block.

TBS: TBS is the abbreviation of Transport Block Size.

SF: SF is the abbreviation of Subframe.

RE: RE is the abbreviation of Resource Element.

RB: RB is the abbreviation of Resource Block.

HARQ: HARQ is the abbreviation of Hybrid Automatic Repeat reQuest.

SIB: SIB is the abbreviation of System Information Block.

RV: RV is the abbreviation of Redundancy Version.

LAA: LAA is the abbreviation of Licensed Assisted Access. A band defined in the LTE/LTE-A/L,TE-A Pro/5G/NR system is referred to as a licensed band, and a band undefined in the LTE/LTE-A/LTE-A Pro/5G/NR system such as a Wi-Fi band or a Bluetooth (BT) band is referred to as an unlicensed band. Operation in the unlicensed band is referred to as the LAA.

Target information: As a part of information that a transmitter desires to transfer to a receiver, target information is defined as information to which the present disclosure is applied.

Additional information: Additional information is defined as information added to support target information.

Main bit area: A main bit area is defined as a bit set consisting of one or more bits. Bits included in the main bit area are in order. The main bit area may include not only target information but also additional information.

Additional information area: An additional information area is defined as a bit set consisting of one or more bits. The additional information area may be present only if there is a main bit area. The additional information area may include additional information for target information included in a related main bit area.

Process: A process is defined as a unit for performing an independent operation. For example, the process may refer to a HARQ process. Alternatively, the process may be used to represent a transmission unit. For example, the process may refer to a TB, a CB, a CBG, an SF, a slot, etc.

Joint encoding: Joint encoding is defined as a mechanism for combining and representing two or more types of information in one bit area (e.g., a set of bits).

Mod(X, Y): Mod(X, Y) is a symbol for representing the result of the modular (or modulo) operation of X and Y, where X and Y are any integers.

Combination(X, Y): Combination(X, Y) is a symbol for representing the number of all possible combinations when Y samples are selected from among X samples, regardless of order. The calculation result may be defined by $$\prod_{i=0}^{Y-1}(X-i)/\prod_{i=1}^{Y}(i).$$

G. Proposed Methods

In communication systems such as LTE and NR, one DCI is generally used to schedule one PDSCH or PUSCH. However, if the size of transmitted data is larger than the size of the TBS capable of being transmitted at one time over the PDSCH/PUSCH or if continuous PDSCH/PUSCH transmission is required due to periodic data transmission, it may cause an increase in network overhead from the point of view of the BS because PDCCH transmission is repeated. In addition, from the point of view of the UE, power consumption may increase because PDCCH monitoring is repeated. In LTE, a structure for controlling transmission of a plurality of PUSCHs through one DCI in the LAA communication system has been proposed. In this structure, the BS may schedule transmission of PUSCHs corresponding to up to four HARQ processes through one DCI, and thus it has an advantage that the UE may transmit multiple PUSCHs by performing PDCCH monitoring once. However, in some cases, such a DCI design method introduced for the LAA may generate unnecessary bits that are not used, which may cause performance degradation due to an unnecessary increase in the code rate during DCI decoding.

When one DCI indicates transmission/reception of multiple HARQ processes, if the number of scheduled HARQ processes and configuration information about the scheduled HARQ processes all need to be included in the corresponding DCI, the size of bits required to represent the configuration information about the HARQ processes may vary depending on the number of scheduled HARQ processes. Therefore, when a bit area for representing the number of HARQ processes and a bit area for representing the configuration information about the HARQ processes are designed independently and separately, if the number of scheduled HARQ processes is small, some bits in the bit area for representing the configuration information about the HARQ processes may be unnecessarily wasted. For example, when configuration information about P (<Pmax) HARQ processes is included in a bit area for representing configuration information about Pmax HARQ processes, bits for (Pmax-P) HARQ processes may be wasted.

To solve these problems, the present disclosure proposes methods of joint encoding two or more types of information and representing the joint encoded information in one bit area. Particularly, the methods proposed in the present disclosure includes methods of representing the value of N and information about N processes at the same time when the information about the N processes are configured and the value of N is dynamically controlled. In addition, the methods proposed in the present disclosure includes methods of reducing the number of bits for representing joint-encoded information and methods of increasing flexibility in representing information while maintaining the number of bits.

The methods proposed in the present disclosure are applicable to MTC in LTE and multi-TB scheduling (or multiple-TB scheduling) in NB-IoT where transmission of one or more TBs is controlled by one DCI. MTC and NB-IoT are technologies that require low UE complexity and wide coverage. If DCI overhead increases, the code rate of a PDCCH including the corresponding DCI increases, and if the same repetition is applied to the PDCCH, the coverage may be reduced. Further, if the number of repetitions increases to main the coverage, it may cause problems of increasing transmission overhead and increasing power consumption of the UE. The methods proposed in the present disclosure are suitable for solving such problems because the methods may reduce the number of DCI bits. Alternatively, the methods proposed in the present disclosure are applicable to multi-SF scheduling (or multiple-SF scheduling) in LTE-LAA where transmission of one or more PUSCHs are scheduled by one DCI. According to the multi-SF scheduling defined for the LAA, information on the number of HARQ processes, information on HARQ process identifiers (IDs), and information on an NDI for each HARQ process are all mapped to independent bit areas in order to simultaneously transmit information on a plurality of HARQ processes. However, since the information is related to each other, a structure for reducing the number of bits based on joint encoding may be considered, and the methods proposed in the present disclosure are suitable for solving such a problem. In the unlicensed band (U-band) technology discussed in the NR system, since there is a similarity to the LAA technology of the LTE system, the same problem-solving approach may be considered. Specifically, multi-TTI scheduling (or multiple-TTI scheduling) for scheduling a TB for each slot or for multiple slots through one DCI is currently discussed for the U-band technology, and the proposed methods may be applied to implement DCI design with low overhead. In addition, multi-slot scheduling for scheduling one or more PDSCHs/PUSCHs through one DCI is considered as one of the candidate technologies for power saving of the UE in the NR system, and in this case, the proposed methods may also be applied to ensure scheduling flexibility while reducing DCI overhead. In addition to the technologies to which the proposed methods are applicable, the proposed methods may be applied to design a control channel carrying DCI or UCI in general communication systems as long as the principles of the present disclosure are maintained.

Methods Proposed in the Present Disclosure

Figure 13:
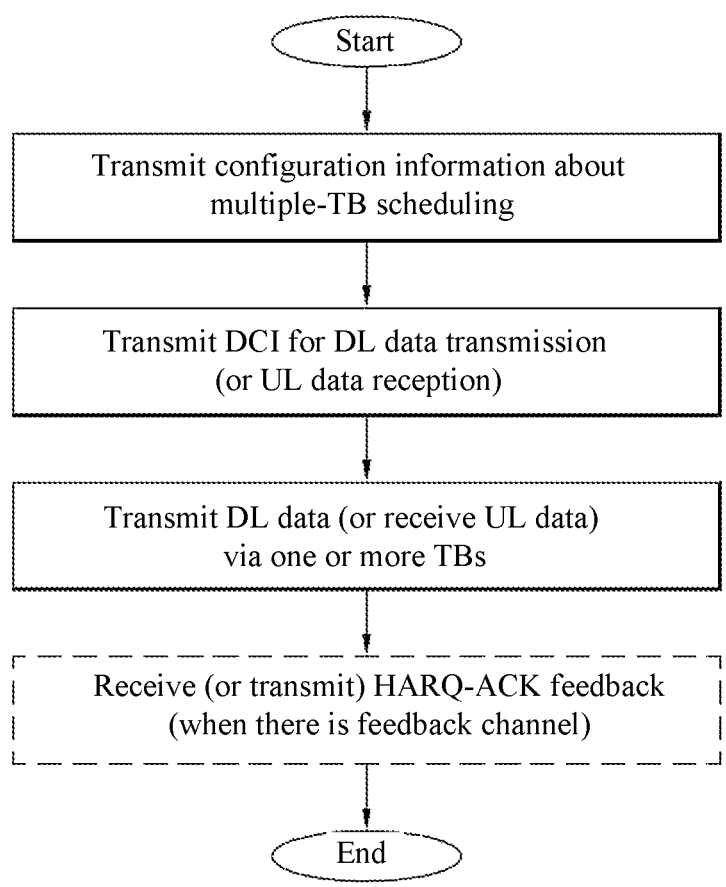
FIG. 13 illustrates operations of a base station (BS) to which the methods proposed in the present disclosure are applicable.

As an example to which the methods proposed in the present disclosure are applied, a multiple-TB scheduling method for dynamically scheduling one or more TBs through one DCI in a communication system such as LTE and NR may be considered. Here, the TB is a term for describing a unit in which transmission is performed, and the TB may be substituted with a proper transmission unit (e.g., CB, CBG, subframe, slot, symbol, RE, RB, HARQ process, etc.) for performing scheduling in an applied technology. To this end, the BS may signal to the UE information for informing that multi-TB scheduling is supported and information about related parameters. For example, the signaling may be information transmitted through higher layer signaling such as SIB or RRC signaling or information dynamically configured by DCI. If the BS has data to transmit to the UE or data to receive from the UE, the BS transmits DCI for scheduling TB transmission/reception. If the BS has data to transmit to the UE, the BS transmits one or more TBs after transmitting the DCI. If a HARQ acknowledgment (HARQ-ACK) feedback channel is required, the BS performs an operation for receiving the HARQ-ACK feedback channel. If the BS has data to receive, the BS receives one or more TBs after transmitting the DCI. If a HARQ-ACK feedback channel is required, the BS performs an operation for transmitting the HARQ-ACK feedback channel. FIG. 13 schematically illustrates the above-described BS operations.

Figure 14:
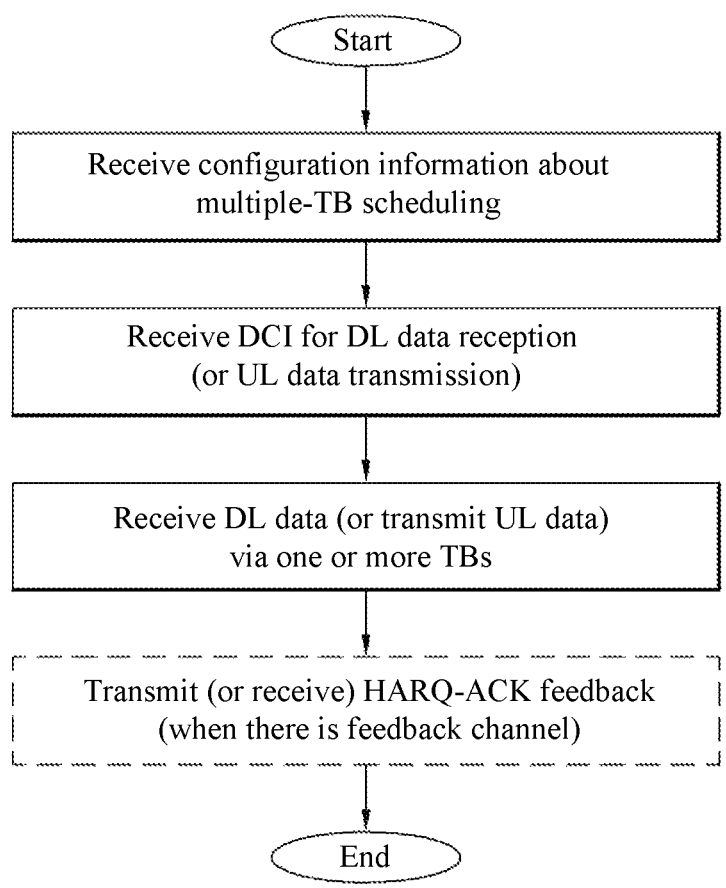
FIG. 14 illustrates operations of a use equipment (UE) to which the methods proposed in the present disclosure are applicable.

If the UE receives signaling including information for informing that multi-TB scheduling is supported and information about related parameters, the UE may perform DCI monitoring for the multi-TB scheduling. Thereafter, if the UE detects/receives DCI including information for scheduling the multi-TB scheduling, the UE may determine locations for TB transmission/reception based on the signaling and the information scheduled by the DCI. If the UE has data to receive, the UE receives one or more TBs after receiving the DCI. If a HARQ-ACK feedback channel is required, the UE may perform an operation for transmitting the HARQ-ACK feedback channel. If the UE has data to transmit, the UE transmits one or more TBs after the receiving DCI. If a HARQ-ACK feedback channel is required, the UE performs an operation for receiving the HARQ-ACK feedback channel. FIG. 14 schematically illustrates the above-described UE operations.

Figure 15:
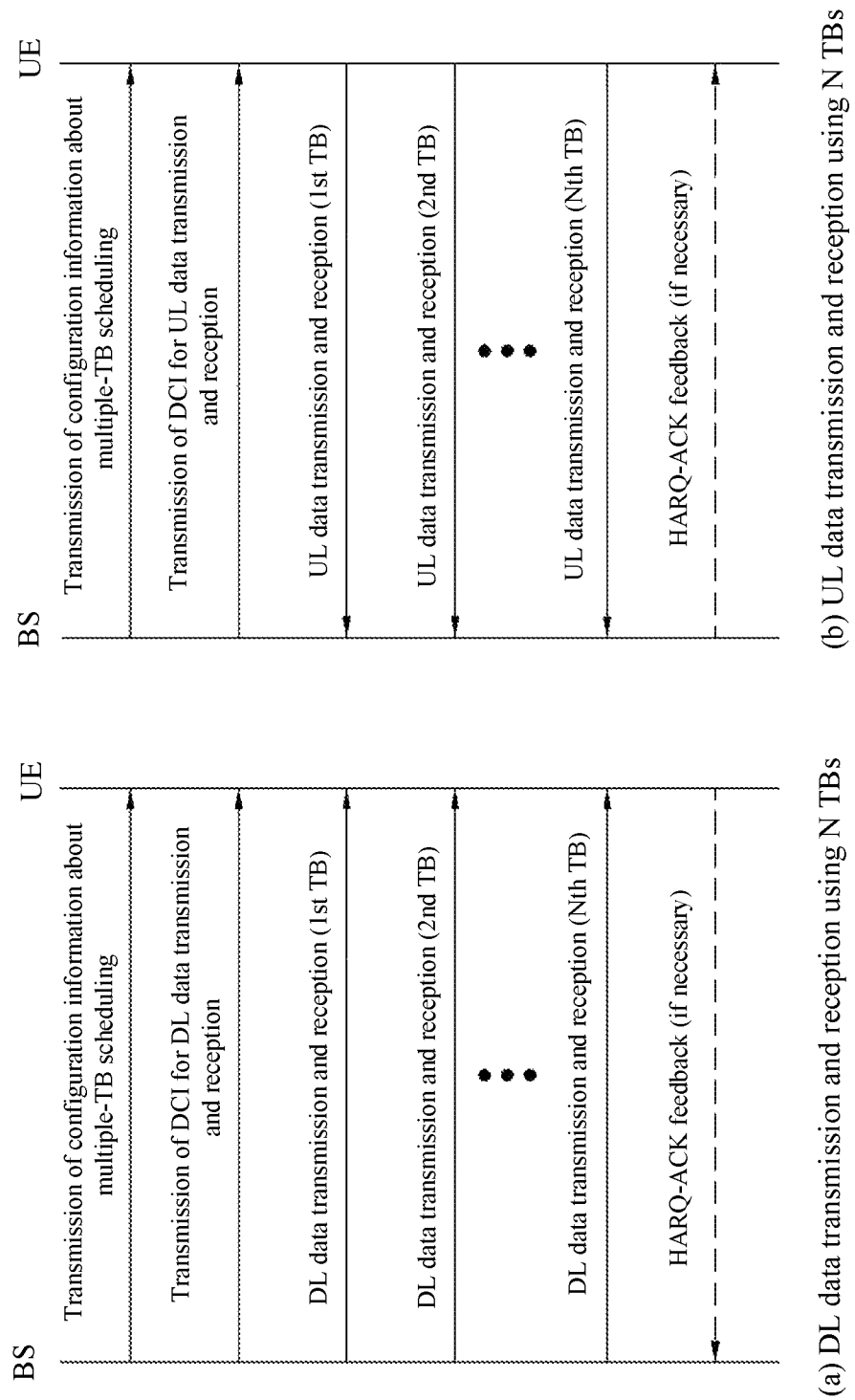
FIG. 15 schematically illustrates a transmission/reception process between the BS and the UE.

FIG. 15 schematically illustrates a transmission/reception process between the BS and the UE.

In the example of FIGS. 13 to 15, if the system supports MTC, DCI may be transmitted/received over an MPDCCH, UL data may be transmitted/received at least once over a PUSCH, DL data may be transmitted/received at least once over a PDSCH, and HARQ-ACK feedback may be transmitted/received at least once over a PUSCH (see C. MTC (Machine Type Communication)). In the example of FIGS. 13 to 15, if the system supports NB-IoT, DCI may be transmitted/received over an NPDCCH, UL data may be transmitted/received at least once over an NPUSCH, DL data may be transmitted/received at least once over an NPDSCH, and HARQ-ACK feedback may be transmitted/received at least once over an NPUSCH (see D. NB-IoT (Narrowband-Internet of Things)). The NPDCCH and MPDCCH may be collectively referred to as the PDCCH, the NPUSCH may be referred to as the PUSCH, and the NPDSCH may be referred to as the PDSCH.

Hereinabove, the BS and UE operations have been described based on the multi-TB scheduling structure using one DCI. However, the principles of the present disclosure are also applicable to transmission of other types of information such as control channels based on UCI.

Regarding the methods proposed in the present disclosure, some of the following methods may be selected and applied. Each method may be performed independently with no combination, or one or more methods may be combined and executed. Several terms, symbols, and sequences used in this document may be replaced with other terms, symbols, and sequences as long as the principles of the present disclosure are maintained.

(Method 1)

The present disclosure considers a case in which the size of target information dynamically varies depending on situations. In this case, when the transmitter transmits the target information to the receiver, the transmitter also needs to transmit information about the target information size. Simply, a method of separately configuring a bit area for representing the target information size may be applied, but the method has a disadvantage in that the number of bits required for transmission increases. Method 1 proposes a method of reducing the number of bits required for transmission by joint encoding the target information and the target information size.

Method 1 proposes a method of representing the size of target information to be transferred based on a position where a specific bit pattern first appears in ascending (or descending) order within a set of ordered bits. For example, when a total of N bits are indexed from #0 to #(N−1), if a specific bit pattern consisting of M bits first appears from #A to #(A+M−1) in ascending order, the target information size may be determined to be equivalent to information expressed by N−(A+M) bits. Specifically, assuming that one bit of 1 is used as the specific bit pattern, if 0 is mapped from #0 to #(A−1) and 1 is first mapped to #A, bits from #(A+1) to #(N−1) may be used as the target information.

If Method 1 is applied to a certain bit area of DCI (or UCI), the transmitter may perform transmission by mapping a bit pattern to a bit area according to the size of target information to be transmitted. The receiver may decode the DCI (or UCI) and estimate the size of the received target information from the position of the bit pattern in the bit area to which Method 1 is applied.

FIG. 16 schematically illustrates a process for determining the size of target information to be transferred based on a position where a bit pattern consisting of one or two bits (one-bit indicator or two-bit indicator in FIG. 16) first appears when Method 1 is applied to N bits (N=9). In the example of FIG. 16, the main bit area corresponds to bits #0 to #8, and as illustrated in FIG. 16, the target information may have a size of 1 to 8 bits according to the position of the bit pattern. The number of bits is merely an example to help understand the present disclosure, and the present disclosure is not limited thereto.

(Method 1-1)

The method proposed in Method 1 may be used to represent the type and configuration of target information as well as the size of the target information. The method may be used to select an efficient information transfer method according to the size of the bit area to which the target information is mapped and provide information necessary for analysis of the bit area of the target information when the transmitter selects the type of necessary target information depending on situations. Method 1-1 proposes a method of representing the type and configuration of the target information based on the method proposed in Method 1.

Method 1-1 proposes a method of representing the type and configuration of target information to be transferred based on a position where a specific bit pattern first appears in ascending (or descending) order within a set of ordered bits. For example, when a total of N bits are indexed from #0 to #(N−1), if a specific bit pattern consisting of M bits first appears in ascending order from #A to #(A+M−1), the type and configuration of the target information may be determined by the position A where the bit pattern appears. Specifically, assuming that one bit of 1 is used as the specific bit pattern, if 0 is mapped from #0 to #(A−1) and 1 is first mapped to #A, the type and configuration of the target information expressed by bits from #(A+1) to #(N−1) may be determined by the position (e.g., value of A) where the bit pattern appears.

If Method 1-1 is applied to a certain bit area of DCI (or UCI), the transmitter may perform transmission by mapping a bit pattern to a bit area according to the type and configuration of target information to be transmitted. The receiver may decode the DCI (or UCI) and estimate the type and configuration of the received target information from the position of the bit pattern in the bit area to which Method 1 is applied.

(Method 1-2) (Method of Using More Information Based on all Zeros)

When the size of information is provided by the position of a bit pattern as described in the method proposed in Method 1 and there are B positions where the bit pattern may appear, positions in which no bit patterns appear may also be used for information transfer. For example, when information is provided by a position where 1 first appears in an bit area consisting of B bits, it is possible to use B pieces of information represented by positions where 1 appears in the bit area and one piece of information represented by mapping 0 to the entirety of the bit area. In this case, B+1 pieces of information may be distinguished. Method 1-2 proposes a method of using a state in which a bit pattern does not appear at positions where the bit pattern may be mapped as a way of transferring information when the positions are predetermined and limited.

According to Method 1-2, when a set of positions where the bit pattern of Method 1 may be mapped is predetermined in a set of ordered bits, a state in which the bit pattern does not appear in the position set may be used as one information representation method for informing the size, type, and configuration of target information. For example, when a set of bits indexed from #0 to #(N−1) are used, if the relationship between a bit pattern appearing in bits indexed from #0 to #Amax and the target information is defined, a state in which the bit pattern does not exist in the bits from #0 to #Amax may be used to represent information about the target information. In this case, bits indexed from #(Amax+1) to #(N−1) may be used as target information. This target information may have a different size, type, and/or configuration from the target information with the bit pattern using a bit with index #Amax.

If Method 1-2 is applied to a certain bit area of DCI (or UCI), the transmitter may perform transmission by determining whether to transmit a bit pattern and the position of the bit pattern in a bit pattern transmittable area according to the size of target information to be transmitted and mapping the bit pattern. The receiver may decode the DCI (or UCI) and estimate the size, type, and configuration of the received target information based on whether the bit pattern is transmitted and the position of the bit pattern in the bit pattern transmittable area to which Method 1-2 is applied.

Figure 17:
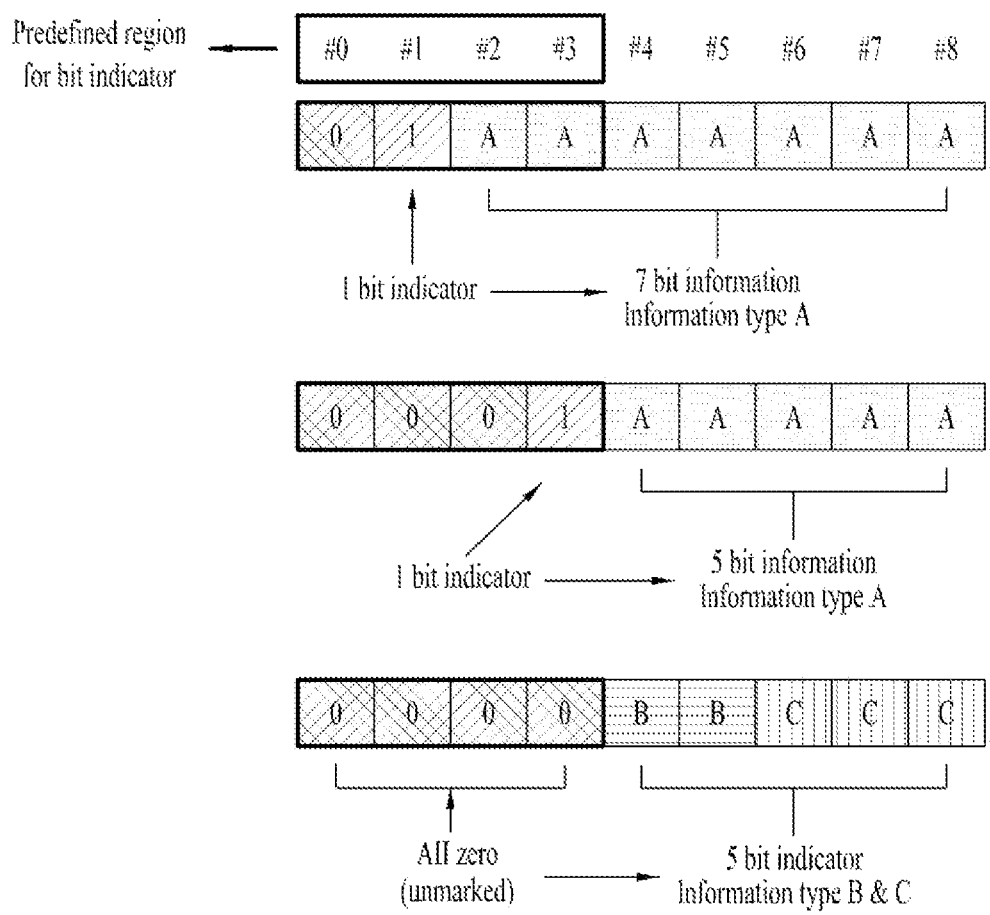

FIG. 17 schematically illustrates a process for determining the size, type, and configuration of target information to be transferred based on the position and presence of a bit pattern when Method 1 and Method 1-2 are applied to N bits (N=9). The number of bits is merely an example to help understand the present disclosure, and the present disclosure is not limited thereto.

(Method 2) (Method for Refining Method 1 in Relation to HARQ Process)

Method 1 may be applied when information on one or more processes is included in target information. Method 2 proposes a method of determining the number of included processes based on the size of the target information, which is represented by the method proposed in Method 1.

Specifically, Method 2 proposes a method of determining the number of independent processes included in the target information depending on the target information size described in Method 1. For example, when the maximum number of processes that may be included in the target information is Pmax, a case in which information on P (≤Pmax) processes, which is smaller than or equal to Pmax, is selected as the target information may be considered. If each process includes L-bit information, the size of the target information may be P*L bits.

If Method 2 is applied to a certain bit area of DCI (or UCI), the transmitter may determine the size of target information based on the number of independent processes to be transmitted and the number of information bits included in each process, represent the size of the target information by applying Method 1, and then map the target information. The receiver may decode the DCI (or UCI) and estimate the size of the received target information from the position of a bit pattern in the bit area to which Method 1 is applied. By doing so, the receiver may estimate the number of independent processes included in the target information.

Figure 18:
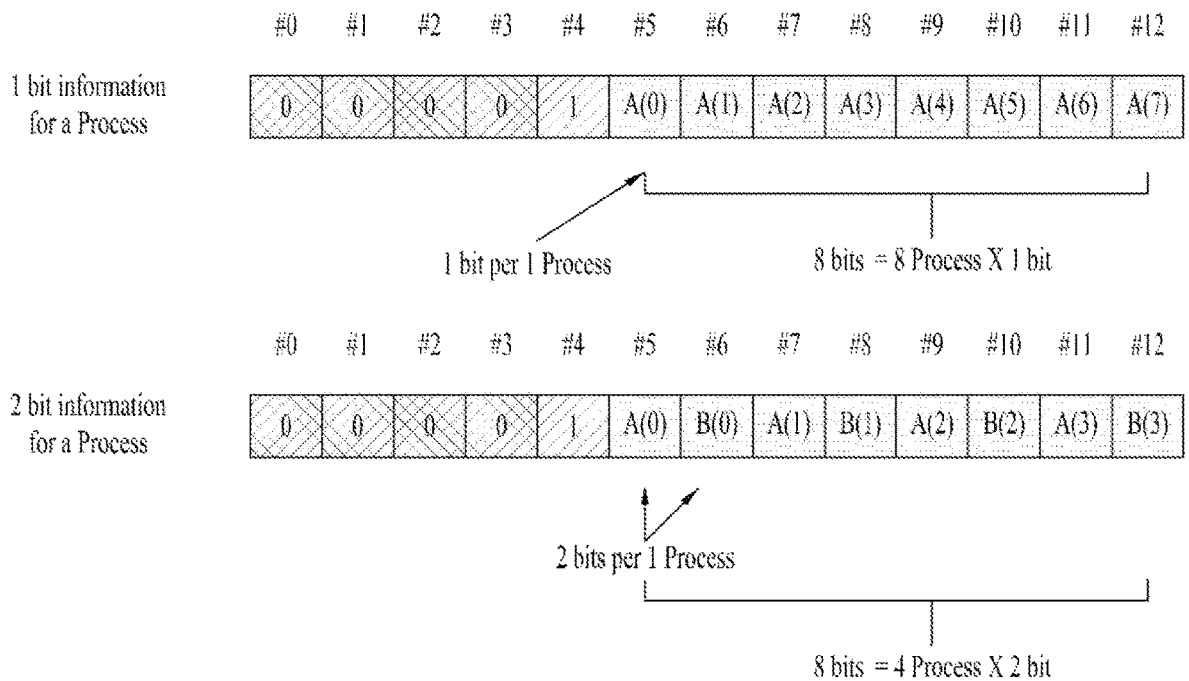

FIG. 18 schematically illustrates a process for determining the size of target information to be transmitted based on the number of processes when method 2 is applied and information for each process consists of L bits (L=1 or 2). The number of bits and the number of processes are only examples to help understand the present disclosure, and the present disclosure is not limited thereto.

(Method 3) (Embodiment for DCI Operation of Multi-TB Scheduling)

When target information includes information on a plurality of processes, information for classifying each process may be required. If the information is a unique number assigned to each process, a method of adding an extra bit for representing the unique number of each process may be simply considered. However, this method has a disadvantage in that the number of bits for representing the unique number of each process increases in proportion to the number of processes included in the target information. Method 3 proposes a method of reducing the number of bits required for transmission by establishing a rule for the unique numbers of the processes included in the target information.

Method 3 proposes a method of classifying the unique numbers of the processes included in the target information in order in which information related to each process appears in a bit area for representing the target information. For example, when the target information is expressed by a set of ordered bits as in Method 1 and when the number of unique process numbers is Qmax, indices from #0 to #(Qmax−1) may be given to Qmax processes, and each of the indices may be used as the unique number for distinguishing each process. In this case, the information on the plurality of processes may be determined to be always arranged in ascending (or descending) order based on the unique number of each process. Specifically, when the unique number of a process first placed in the bit area of the target information is #Q and the number of processes included in the target information is P, the information related to each process may be determined to be arranged in ascending order of the unique process number such as #Q, #(mod(Q+1, Qmax)), ..., #(mod(Q+P−1, Qmax)) in the bit area of the target information. In this case, the mod( ) operation is applied to prepare for a case where Q+X has a value greater than or equal to Qmax for any integer X. The order in which the unique process numbers are arranged is merely an example for convenience of description, and the principles of the present disclosure may be equally applied even when the order is defined according to other predefined order patterns.

When Method 3 is applied to a certain bit area of DCI (or UCI), if the transmitter transmits information related to P independent processes, the transmitter may assign unique process numbers in ascending (or descending) order by using P consecutive indices. When the receiver decodes the DCI (or UCI), the receiver may estimate the size of target information and the number of processes included in the target information and then estimate the unique numbers of the processes included in the target information according to Method 3. If it is possible to transmit/receive processes having discontinuous unique numbers for a specific target information size, a separate method may be applied therefor.

Figure 19:
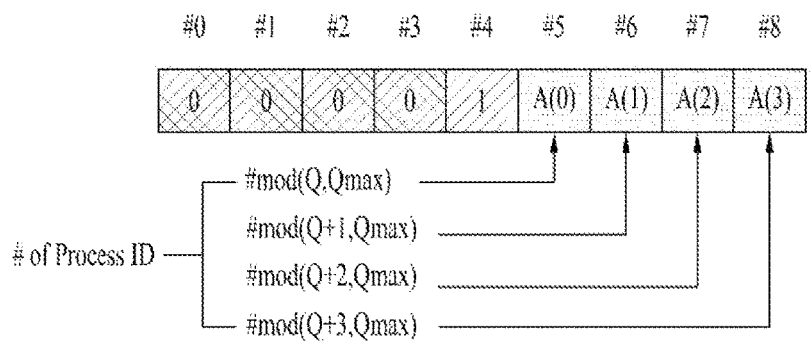

FIG. 19 schematically illustrates an example in which the unique number of each process corresponds to a bit of target information when Method 3 is applied and the target information includes at least one piece of one-bit information for each process. The number of bits and the number of processes are only examples to help understand the present disclosure, and the present disclosure is not limited thereto.

(Method 3-1) (Embodiment for DCI Operation of Multi-TB Scheduling)

In Method 3, if processes included in target information have discontinuous unique numbers, the starting point of the unique numbers in the target information may not be clear. To prepare for such a case, Method 3-1 proposes a method of always arranging the unique numbers of the processes included in the target information in ascending (or descending) order of the unique number.

For example, when the target information is expressed by a set of ordered bits as in Method 1, and when the number of unique process numbers is Qmax, indices #0 to #(Qmax−1) may be given to Qmax processes, and each of the indices may be used as the unique number for distinguishing each process. In this case, information on a plurality of processes may be determined to be always arranged in ascending (or descending) order based on the unique number of each process. The unique number of a first arranged process may be determined to have the smallest value among the unique numbers of the processes included in the target information. Specifically, when the target information contains information on P processes and the unique numbers of processes placed in a bit area of the target information are #R(1), #R(2), . . . , #R(P), if the relationship of R(1)<R(2)< . . . <R(P) is satisfied, information related to each process may be determined to be arranged in the ascending order of the unique process number such as #R(1), #R(2), . . . , #R(P) within the bit area of the target information.

When Method 3-1 is applied to a certain bit area of DCI (or UCI), if the transmitter transmits information related to P independent processes, unique process numbers may have continuous or non-contiguous indices according to a specific rule or information included in other bit areas in the DCI, information about each process may be arranged in ascending (or descending) order of the unique number, starting from a process with the smallest unique number in target information. When the receiver decodes the DCI (or UCI), the receiver may estimate the size of the target information and the number of processes included in the target information and then estimate the unique numbers of the processes included in the target information according to Method 3-1.

Figure 20:
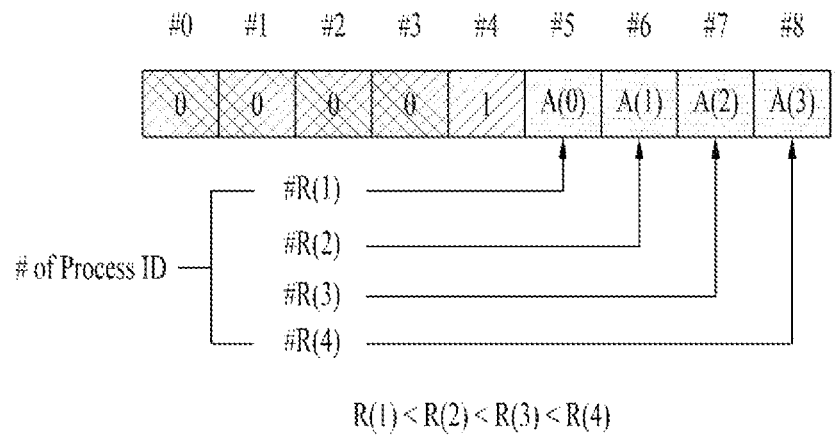

FIG. 20 schematically illustrates an example in which the unique number of each process corresponds to a bit of target information when Method 3-1 is applied and the target information includes at least one piece of one-bit information for each process. The number of bits and the number of processes are only examples to help understand the present disclosure, and the present disclosure is not limited thereto.
(Method 4) (Embodiment for DCI Operation of Multi-TB Scheduling)

If the number of unique process numbers included in target information is Qmax and the number of processes included in actual target information is P(<Qmax), which is smaller than Qmax, the number of combinations of consecutive P unique numbers may be Qmax. Therefore, it may be necessary to provide additional information for representing at least Qmax states in order to represent the unique process numbers included in the target information according to Method 3. Method 4 proposes a method of providing additional information for representing the unique process numbers included in the target information.

Method 4 proposes a method of transmitting additional information for calculating the unique process numbers to represent the unique process numbers included in the target information. For example, the additional information may be information indicating index #Q where the unique process number starts in the example to which Method 3 is applied. If the number of unique process numbers, Qmax is greater than $2^{q\_max-1}$ and less than or equal to $2^{q\_max}$, the additional information may be expressed by q_max bits. For example, a binary number expressed by q_max bits may mean a unique process number expressed as a decimal number. The represented unique number may be used as #Q, which is the unique process number mapped first in a bit area of the target information.

If Method 4 is applied to a certain bit area of DCI (or UCI), the transmitter may determine the starting point of processes with continuous indices included in transmission and transmit addition information bits for representing the starting point in the DCI (or UCI). The receiver may decode the DCI (or UCI) to obtain additional information about unique process numbers included in target information from a bit area to which method 4 is applied.
(Method 4-1) (Structure in which Additional Information of Method 4 is Provided Independently of Bit Area of Target Information)

Method 4-1 proposes a method of providing the additional information proposed in Method 4 through independent bits outside a bit area including target information. Method 4-1 may be applied to prevent the size of the target information from being affected by the additional information.
(Method 4-2) (Structure in which Additional Information of Method 4 is Included in Bit Area of Target Information)

The size of the additional information proposed in Method 4 may vary depending on information included in target information. For example, when Qmax unique process numbers exist and all Qmax processes are included in the target information, if Method 3 is used, it is possible to estimate all unique process numbers without the additional information proposed in Method 4. As another example, a method of reducing the size of the additional information by limiting combinations of unique process numbers when the target information has a predetermine size may be considered in order to reduce the number of bits required for transmission.

Method 4-2 proposes a method of including the additional information proposed in Method 4 in a bit area of the target information. In this case, the size of the target information is calculated including the number of bits of the additional information.

In the method proposed in Method 4-2, the number of bits for representing the additional information may vary depending on the number, types, and configurations of processes included in the target information. Alternatively, the number of bits for representing the additional information may vary according to the size of the target information. In some cases, the additional information may not exist.
(Method 4-3)

The type and configuration of the additional information proposed in Method 4 may vary depending on information included in target information. For example, when Qmax unique process numbers exist and all Qmax processes are included in the target information, if Method 3 is used, it is possible to estimate all unique process numbers without the additional information proposed in Method 4. Accordingly, in this case, bits allocated for the additional information may be used for other purposes.

Method 4-3 proposes a method of differently interpreting the information type and bits of the addition information proposed in Method 4 depending on situations. For example, the situations may include the location of the bit pattern proposed in Method 1 or the size, type, and configuration of the target information. Specifically, when the type or interpretation of the additional information is changed by the position of the bit pattern or the size of the target information, some of the additional information, which may be classified by the bit area, may be used to identify the type or configuration of the target information. Additionally, when the type or interpretation of the additional information is changed by the position of the bit pattern or the size of the target information, some of the additional information, which may be classified by the bit area, may correspond to information commonly applied to all (or some) processes included in the target information.

(Method 5)

The methods proposed in Method 3 and Method 4 may be used to reduce the number of bits when processes to be transmitted have continuous unique numbers. On the other hand, when it is necessary to support discontinuous unique process number, the above methods may require unnecessary transmission. Method 5 proposes a method for representing unique process numbers when the numbers are discontinuous.

Method 5 proposes a method of including ON/OFF information for each process in target information using a P-bit bitmap when the target information is capable of including information related to P processes. In this case, the ON/OFF information for each process may be expressed by one bit. For example, when 1 (or 0), the ON information may be indicated. Otherwise, the OFF information may be indicated.

In the method proposed in Method 5, when a bit corresponding to a specific process is expressed as ON, it may mean that transmission including the target information includes information related to the process. On the contrary, when the bit corresponding to the specific process is expressed as OFF, it means that the transmission including the target information does not include the information related to the corresponding process, or that the information included in the transmission is not reflected.

In the method proposed in Method 5, when the first bit of the P-bit bitmap corresponds to a process having a unique number of #Q, the subsequent bits may be sequentially determined as follows: #(mod(Q+1, Qmax)), #(mod(Q+2, Qmax)), and #(mod(Q+P−1, Qmax)). This may be to calculate information on the unique number of a process corresponding to each bit of the bitmap without a separate increase in the number of bits. If the size of the bitmap P is equal to the number of unique process numbers Qmax, the Q value may be set to zero. If the size of the bitmap P is smaller than the number of unique process numbers Qmax, additional information for indicating the Q value may be required, and in this case, Method 4 may be used.

If Method 5 is applied to a certain bit area of DCI (or UCI), the transmitter may transmit processes included in target information by expressing the processes as ON in a bitmap. The receiver may decode the DCI (or UCI), check ON/OFF information in the bit area to which Method 5 is applied, and estimate the unique numbers of the processes to which the received information is applied.

(Method 5-1)

When the method proposed in Method 5 is used, a plurality of processes expressed as ON may require different information. Method 5-1 proposes a method for representing information related to each process with an independent bit area in target information when Method 5 is applied.

Method 5-1 proposes a method of including information on P processes as an independent bit area when target information includes the information on the P processes and also includes ON/OFF information for each process using a P-bit bitmap as described in Method 5. To this end, a bit area capable of supporting independent information on the P processes may be configured to have the same size in a main bit area including the target information to which Method 5 is applied, regardless of the number of processes that are expressed as ON. For example, if information about one process has a length of L bits, the main bit area to which Method 5-1 is applied may include P bits for representing ON/OFF information and P*L bits for representing the information about the P processes.

In the method proposed in Method 5-1, when the first bit of the P-bit bitmap corresponds to a process with a unique number of #Q, the first L bits in the bit area with the P*L size may be configured to represent information about the process with the unique number of #Q. When an A-th bit of the P-bit bitmap corresponds to a process having a unique number of #(mod(Q+A, Qmax)), (L*A+1) to (L*(A+1))-th bits in the bit area with the P*L size may be configured to represent information about a process having a unique number of #(mod(Q+A, Qmax)).

If Method 5-1 is applied to a certain bit area of DCI (or UCI), the transmitter may transmit information about processes included in target information by expressing the processes in the bit area with a size of P*L. When the receiver decodes the DCI (or UCI) and confirms that the target information includes ON/OFF information for P processes in the bit area to which Method 5-1 is applied, the receiver may obtain information about each process from the bit area of the P*L size.

Figure 21:
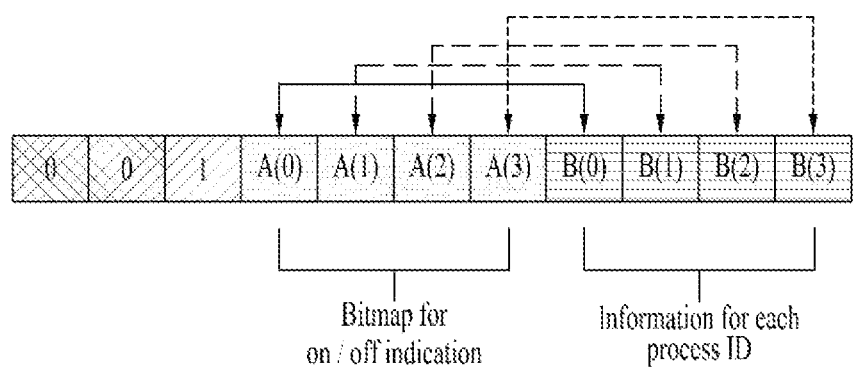

FIG. 21 schematically illustrates an example in which Method 5-1 is applied and ON/OFF information for four processes and information about each process are given as L bits (L=1). In the example of FIG. 21, if A(n) denotes ON/OFF information about an (X+n)-th process, B(n) may denote information about the (X+n)-th process. The number of bits and the number of processes are only examples to help understand the present disclosure, and the present disclosure is not limited thereto.

(Method 5-2)

When the method proposed in Method 5 is used, a plurality of processes expressed as ON may be restricted to have the same common information to reduce the size of a main bit area. Method 5-2 proposes a method of representing some (or all) of information related to processes included in target information as a single common bit area when Method 5 is used.

Method 5-2 proposes a method in which when the target information includes information about P processes and also includes ON/OFF information for each process using a P-bit bitmap as described in Method 5, the information on all P processes makes the same and is included in a common bit area. In this case, if common information about the processes expressed as ON has a length of L bits, the main bit area to which Method 5-2 is applied may be configured to include P bits for representing the ON/OFF information and L bits for the common bit area.

The method proposed in Method 5-2 may be used in combination with the method proposed in Method 5-1. The reason for this is to integrate information capable of being represented in common in order to reduce the number of bits and distinguish information incapable of being represented in common.

If Method 5-2 is applied to a certain bit area of DCI (or UCI), the transmitter may transmit information about processes included in target information by expressing the processes in a common bit area with a size L. When the receiver decodes the DCI (or UCI) and confirms that the target information includes ON/OFF information for P processes in the bit area to which Method 5-2 is applied, the receiver may obtain the information about the processes included in the target information from the common bit area of the L size.

FIG. 22 schematically illustrates examples in which only Method 5-2 is used and both Method 5-1 and Method 5-2 are used when ON/OFF information for four processes and common information about processes included in target information are given as L bits (L=2). The number of bits and the number of processes are only examples to help understand the present disclosure, and the present disclosure is not limited thereto.

(Method 6)

If the number of all schedulable cases is indicated by target information, it is possible to obtain gain in terms of the scheduling flexibility, but there is a disadvantage in that the number of bits included in the target information may increase. When the number of bits included in the target information increases, the following problems may occur: a decrease in decoding performance, a decrease in supportable coverage, and an increase in transmission overhead. Therefore, a method of reducing the size of bits included in the target information may be considered by restricting the scheduling flexibility. Method 6 proposes a method of reducing the size of the target information by limiting the number of continuous processes representable by the target information.

Method 6 proposes a method of reducing the numbers of bits required to transmit the target information by limiting the number of possible target information sizes. For example, it may be considered that information on a total of Pmax processes is included in target information, information on P (≤Pmax) processes is included in actual transmission, and the size of the target information is determined according to the value of P. In this case, to reduce the size of the target information, the selectable value of P may be determined such that only some values between 1 and Pmax are selected.

If Method 6 is applied to a certain bit area of DCI (or UCI), the transmitter may perform transmission by mapping a bit pattern in the bit area according to the size of target information to be transmitted. In this case, the selectable size of the target information may be limited to a range predetermined by standards. The receiver may decodes the DCI (or UCI) and estimate the size of the received target information from the position of the bit pattern in the bit area to which Method 6 is applied. In this case, the expected target information size may be limited to the range predetermined by standards.

(Method 6-1)

To solve possible problems when the number of bits included in target information increases as described in Method 6, a method of reducing the size of bits included in the target information may be considered by restricting the scheduling flexibility. Method 6-1 proposes a method of reducing the size of the target information by differentiating the size of additional information included in the target information.

Method 6-1 proposes a method of reducing the number of bits required to transmit the target information by varying the size of the additional information depending on each size of the target information when the target information includes the additional information. For example, it may be considered that information on a total of Pmax processes is included in the target information and information on P (Pmax) processes is included in actual transmission. In this case, to reduce the size of the target information, the size of the additional information included in the target information may be differentially determined according to the number of processes included in the target information, P.

According to Method 6-1, when there are Qmax unique process numbers and the additional information included in the target information represents the starting index of consecutive unique numbers of P processes included in the target information, the scheduling flexibility of the unique process number representable by the additional information may be configured to vary according to the number of processes included in the target information, P. For example, for a certain P value, all Qmax starting indices may be represented by the additional information, whereas for some P values, only starting indices smaller than Qmax may be represented If Method 6-1 is applied to a certain bit area of DCI (or UCI), the transmitter may perform transmission by mapping a bit pattern in the bit area according to the size of target information to be transmitted. In this case, the size of the target information may be configured to match the number of processes and the size of available additional information. The receiver may decode the DCI (or UCI) and estimate the size of the received target information from the position of the bit pattern in the bit area to which Method 6-1 is applied. In this case, the receiver may estimate the number of processes and additional information included in the target information from the estimated target information size.

(Method 7)

If the number of unique process numbers that may be included in target information is Qmax and the number of processes included in actual target information is smaller than P (<Qmax), the number of all combinations of selecting P unique numbers among Qmax processes may be combination (Qmax, P) in total. If combinations of all P discontinuous unique process numbers need to be represented, the combination (Qmax, P) of unique number combinations may be simply used in the form of a lookup table. However, as the number of available unique numbers increases, the size of the lookup table also increases proportionally, which may be a disadvantage in terms of the transceiver/receiver implementation complexity. Method 7 proposes a method of configuring additional information such that discontinuous combinations of the unique process numbers included in the target information are supported when the additional information for representing the unique process numbers included in the target information is provided.

Method 7 proposes a method of configuring additional information for representing the unique number of each process included in the target information when information related to P processes is included in the target information and the processes are capable of having discontinuous unique numbers. For example, when the target information is expressed by a set of ordered bits as in Method 1 and when the number of unique process numbers included therein is Qmax, indices #0 to #(Qmax−1) may be given to Qmax processes, and each of the indices may be used as the unique number for distinguishing each process. In this case, if the target information includes the information about the P processes, additional information may be used to indicate unique information about the processes, and the additional information may be divided into a plurality pieces of sub-additional information. One piece of sub-additional information (sub-additional information R) may be used to represent the unique number of one of the processes included in the target information. The unique numbers of processes that do not correspond to the sub-additional information R may be determined to be calculated based on the sub-additional information R and offsets. The offsets may be provided by the sub-additional information R and other sub-additional information, or values predetermined by standards may be used.

Specifically, for example, when the one piece of sub-additional information R is included in the additional information and a unique process number representable by the sub-additional information R is between #0 and #(Qmax−1), the number of bits for representing the sub-additional information R may be defined as follows: $\lceil \log_2(Qmax) \rceil$ (where $\lceil \ \rceil$ denotes the ceiling function). If the unique process number expressed by the sub-additional information R is #Q, the unique numbers of the remaining (P−1) processes may be determined by the sum of Q and offsets. For example, if the offset values for the P−1 (=P') processes are D1, D2, . . . , DP', the unique numbers of the P processes included in the target information may be determined as follows: #Q, #(mod(Q+D1, Qmax)), . . . , #(mod(Q+DP'), Qmax)).

In the above example, all or some of the offset values may be predetermined by standards. This may be to reduce the number of bits for presenting the additional information. In the above example, D1, D2, . . . , DP' may be predetermined according to the size or configuration of the target information. Also, some or all of the offset values may be calculated based on sub-additional information. This may be to diversify the combinations of the unique process numbers that may be included in the target information. In this case, the sub-additional information may be independently provided for each offset, or a set of a plurality of offset values may be represented by a predetermined pattern. For example, when the sub-additional information is independently provided for each offset and the offset value D' for a specific process is represented by A bits: b(0), b(1), . . . , b(A−1), the offset value for determining the unique number of the corresponding process may be defined by $$D' = 1 + \sum_{i=0}^{A-1} 2^i \times b(i).$$

As another example, when there are patterns for a plurality of offset values for a specific number of processes and one pattern is selected by the sub-additional information, each pattern may be predetermined by a combination of different offset values. In addition, the index of a pattern to be applied may be designated by the sub-additional information.

When Method 7 is applied to a certain bit area of DCI (or UCI), if the transmitter transmits information related to P independent processes, the transmitter may determine combinations of unique process numbers and include the unique number of one process in the DCI (or UCI) to express the unique numbers. If necessary, the transmitter may include information about offset(s) for representing the unique numbers for the remaining processes in the DCI (or UCI). When the receiver decodes the DCI (or UCI), the receiver may estimate the size of target information and the number of processes included in the target information and then estimate the unique numbers of the processes included in the target information according to Method 7.

It is schematically shown an example in which Method 5-1 is applied and ON/OFF information for four processes and information for each process are given as L bits (L=1).

FIG. 23 schematically illustrates a method of representing D1 and D2 when Method 7 is applied and information about two processes having unique numbers of #D1 and #D2 is included in target information. In the example of FIG. 23, D1 may be expressed as a value between 0 and 7 based on B(0), B(1), and B(2). In addition, an offset may be configured between 1 and 4 based on A(0) and A(1), and then D2 may be determined by the offset and the value of D1 (e.g., D2=D1+Offset). The number of bits and the number of processes are only examples to help understand the present disclosure, and the present disclosure is not limited thereto.

The method proposed in Method 7 may be used to designate the unique number of a process that is not included in target information. For example, if there are Qmax processes and information on P processes among the Qmax processes is included in the target information, the method proposed in Method 7 may be applied to represent the unique numbers of (Qmax−P) processes not included in the target information. Since such a method has the same amount of information as a method of representing the unique number of a process included in target information according to the method proposed in Method 7, the size of a required bit area is also the same.

(Method A)

DCI may be designed in consideration of how the BS adjusts the size of the DCI by considering various factors. For example, the DCI size may be determined in consideration of various factors such as information required by the UE, the capability of the UE, and the coverage state of the UE. When the DCI size is large, the DCI may be designed to have high scheduling flexibility or include various types of information because the DCI is capable of indicating a lot of information. On the other hand, when the DCI size is relatively small, information representation may be limited, and thus the DCI may be designed to have low scheduling flexibility or have a limitation on information types. Therefore, it may be important to determine an appropriate information size and type depending on the DCI size and to design the DCI by reflecting the appropriate information size and type. The present disclosure proposes a method of determining the size of a main bit area and the size of an additional information area based on information configured by the BS. In addition, the present disclosure proposes a method of determining the types and forms of target information and additional information based on the information configured by the BS.

Method A proposes a method of determining the size of the main bit area and the size of the additional information area according to the maximum number of processes that the BS may dynamically schedule. In addition, the method proposed by method A may include a method in which the types and forms of information included in the target information and additional information are determined according to the maximum number of processes that the BS may dynamically schedule.

If Method A is applied to a certain bit area of DCI (or UCI), the BS may provide the UE with the maximum number of processes scheduled by the DCI (or UCI) through higher layer signaling (e.g., SIB or RRC signaling). Thereafter, the transmitter may determine the sizes and shapes of the main bit area and additional information area based on information on the maximum number of processes. The receiver may decode the DCI (or UCI) by assuming the sizes and shapes of the main bit area and additional information area based on the information on the maximum number of processes.

Examples of Method Combinations and Practical Applications

When the above-described methods are combined to design a method of transmitting control channel information such as DCI or UCI, a variety of conditions such as the amount and format of information to be transferred, the number of available bits, the level of scheduling flexibility, etc. need to be considered. In the following embodiments, information transfer methods that may be configured by combining the above-described methods are proposed. Particularly, the following embodiments will be described based on an information transfer method that may be considered when TBs corresponding to a plurality of HARQ processes are scheduled by one DCI. However, it is apparent that the information transfer method proposed in the following embodiments is applicable to other information transfer units other than a plurality of HARQ processes as long as the principle thereof is maintained. For example, the HARQ process may be replaced with basic transmission units such as a TB, CB, CBG, SF, slot, and so on. In addition, the BS or UE may support one or more embodiments depending on the capability thereof, and in this case, the actually used method may be determined based on information on whether the BS or UE supports the method, information included in a signal/channel transmitted by the BS or UE, information reported by the UE, and/or the operating mode of the UE.

Embodiment 1

The methods proposed in the present disclosure may be used to represent the number of HARQ processes, the IDs of included HARQ processes, and NDI information for each HARQ process ID when one DCI schedules a plurality of HARQ processes at the same time.

Specifically, Embodiment 1 proposes a method of scheduling P (≤Pmax) HARQ processes with consecutive HARQ process IDs through one DCI and providing the number of scheduled HARQ processes P, the IDs of the scheduled HARQ processes, and an NDI for each HARQ process ID.

In Embodiment 1, Method 1, Method 2, Method 3, and Method 4 may be used in combination. Embodiment 1 is only an example to help understand the present disclosure, and the present disclosure is not limited thereto.

As a specific method of Embodiment 1, when the maximum number of HARQ processes controlled by one DCI is Pmax and among the Pmax HARQ processes, P (≤Pmax) consecutive HARQ process IDs are scheduled, the size of a bit area in the DCI for representing the number of scheduled HARQ processes and the NDI for each process in combination may be Pmax+1 bits, and indices #0 to #Pmax may be assigned to bits in the bit area. In the following, the bit area having the above indices is defined as a main bit area for convenience of description. The number of HARQ processes may be represented by the index of a bit in which 1 (or 0) first appears in ascending (or descending) order in the main bit area. In addition, the indices of bits after the bit in which 1 (or 0) first appears in the ascending (or descending) order may be used to represent NDI information for each HARQ process. If the number of remaining bits is P, the remaining bits sequentially represent NDIs related to consecutive HARQ process IDs from #X to #(mod(X+P−1, Qmax)). In this case, Qmax refers the maximum number of HARQ processes applicable to a system to which Embodiment 1 is applied. Further, X denotes the starting number of the consecutive HARQ process IDs and may be expressed by separate $\lceil \log_2(Qmax) \rceil$ bits (where $\lceil \; \rceil$ denotes the ceiling function).

As an example of Embodiment 1, when the number of scheduled HARQ processes is P, 1 may be mapped to a bit with index #(Pmax−P) in the main bit area with a size of Pmax+1, and 0 may be mapped to all bits before the corresponding index. For a ∈{0, 1 . . . , P−1}, a bit with index #(Pmax−P+1+a) in the main bit area may be used to represent NDI information about a HARQ process ID with a unique number of #(mod(X+a, Qmax)).

The method proposed in Embodiment 1 has an advantage of reducing the number of required bits by joint encoding bit areas for representing the number of scheduled HARQ processes and NDI information for each HARQ process.

FIG. 24 illustrates DCI areas to which the method proposed in Embodiment 1 is applied in the form of a table when the maximum number of schedulable HARQ processes is Pmax=8 as in CE mode A of MTC (see Table 6) and the maximum number of available HARQ processes is Qmax=8. In the example of FIG. 24, three bits from #0 to #2 correspond to an additional information area, and 9 bits from #3 to #11 correspond to a main bit area. In this case, the number of HARQ processes may be determined based on a position where 1 first appears in ascending order of bits #3 to #10. If the position is bit #A, bits #(A+1) to #11 may be used to represent NDI information. For an arbitrary number a, N(a) means NDI information about HARQ process ID #(mod(a+X, 8)), where X is a value between 0 and 7 and may be indicated by the three bits from #0 to #2. The number of bits and the number of processes are only examples to help understand the present disclosure, and the present disclosure is not limited thereto.

FIG. 25 illustrates DCI areas to which the method proposed in Embodiment 1 is applied in the form of a table when the maximum number of schedulable HARQ processes is Pmax=4 as in LAA and the maximum number of available HARQ processes is Qmax=16. In the example of FIG. 25, four bits from #0 to #3 correspond to an additional information area, and five bits from #4 to #8 correspond to a main bit area. In this case, the number of HARQ processes may be determined based on a position where 1 first appears in ascending order of the bits #4 to #8. If the position is bit #A, bits #(A+1) to #8 may be used to represent NDI information. For an arbitrary number a, N(a) means NDI information about HARQ process ID #(mod(a+X, 16)), where X is a value between 0 and 15 and may be indicated by the four bits from #0 to #3. The number of bits and the number of processes are only examples to help understand the present disclosure, and the present disclosure is not limited thereto.

Embodiment 1-1

When a plurality of HARQ processes is scheduled by one DCI, a method of setting some parameters as common information to reduce DCI bits may be considered. In particular, Embodiment 1 shows a method of expressing, as common information, all information other than NDI information among information for configuring scheduled HARQ processes. However, increasing the amount of independent information for each HARQ process may be considered to improve the scheduling flexibility. For example, each HARQ process may be designed to have a different RV to increase retransmission gain. To this end, Embodiment 1-1 considers a case in which information expressed for each HARQ process scheduled in the method proposed in Embodiment 1 is M (>1) bits.

Specifically, Embodiment 1-1 proposes a method of scheduling P (≤Pmax) HARQ processes with consecutive HARQ process IDs through one DCI and providing the number of scheduled HARQ processes P, information about the IDs of the scheduled HARQ processes, and information about NDIs and RVs for the scheduled HARQ processes for each HARQ process ID.

In Embodiment 1-1, Method 1, Method 2, Method 3, and Method 4 may be used in combination. Embodiment 1-1 is only an example to help understand the present disclosure, and the present disclosure is not limited thereto.

As a specific method of Embodiment 1-1, when the maximum number of HARQ processes controlled by one DCI is Pmax and among the Pmax HARQ processes, P (≤Pmax) consecutive HARQ process IDs are scheduled, the size of a bit area in the DCI for representing the number of scheduled HARQ processes and M-bit information configured for each process in combination may be M*Pmax+1 bits, and indices #0 to #(M*Pmax) may be assigned to bits in the bit area. In the following, the bit area having the above indices is defined as a main bit area for convenience of description. The number of HARQ processes may be represented by the index of a bit in which 1 (or 0) first appears in ascending (or descending) order in the main bit area. In addition, the indices of bits after the bit in which 1 (or 0) first appears in the ascending (or descending) order may be used to represent M-bit configuration information for each HARQ process. The configuration information for each HARQ process may include the NDI and/or RV therefor. If the number of remaining bits is P*M, the remaining bits may be sequentially paired by M bits to represent configuration information related to consecutive HARQ process IDs from #X to #(mod(X+P−1,Qmax)). In this case, Qmax refers the maximum number of HARQ processes applicable to a system to which Embodiment 1-1 is applied. Further, X denotes the starting number of the consecutive HARQ process IDs and may be expressed by separate $\lceil \log_2(Qmax) \rceil$ bits (where $\lceil \ \rceil$ denotes the ceiling function).

As an example of Embodiment 1-1, when the number of scheduled HARQ processes is P, 1 may be mapped to a bit with index #(M*(Pmax−P)) in the main bit area with a size of M*Pmax+1, and 0 may be mapped to all bits before the corresponding index. For a ∈{0, 1, . . . , P−1} bits with indices #(M*(Pmax−P+a)+1) to #(M*(Pmax−P+a+1)) in the main bit area may be used to represent scheduling information about a HARQ process ID with a unique number of #(mod(X+a, Qmax)).

The method proposed in Embodiment 1-1 has an advantage of reducing the number of required bits by joint encoding bit areas for representing the number of scheduled HARQ processes and multi-bit information for each HARQ process.

FIG. 26 illustrates DCI areas to which the method proposed in Embodiment 1-1 is applied in the form of a table when the maximum number of schedulable HARQ processes is Pmax=8 as in CE mode A of MTC (see Table 6) and the maximum number of available HARQ processes is Qmax=8. Specifically, FIG. 26 shows a case where two bits of information are required to express the NDI and RV for each HARQ process. In the example of FIG. 26, three bits from #0 to #2 correspond to an additional information area, and 17 bits from #3 to #19 correspond to a main bit area. In this case, the number of HARQ processes may be determined based on a position where 1 first appears in ascending order of the bits #3 to #19. If the position is bit #A, bits #(A+1) to #19 may be used to represent information about the NDI and RV for each HARQ process. For an arbitrary number a, N(a) and R(a) respectively mean information about the NDI and RV of HARQ process ID #(mod(a+X, 8)), where X is a value between 0 and 7 and may be indicated by the three bits from #0 to #2. The number of bits and the number of processes are only examples to help understand the present disclosure, and the present disclosure is not limited thereto.

Embodiment 2

In some cases, separate $\lceil \log_2(Qmax) \rceil$ bits, which are used to indicate the starting number of HARQ process IDs in Embodiment 1, may become unnecessary. For example, when all schedulable HARQ process IDs are included in one DCI, information about all HARQ processes may be included regardless of the starting order of the HARQ process IDs. As a result, information about the start point of the HARQ process IDs is not needed. Thus, the separate $\lceil \log_2(Qmax) \rceil$ bits for indicating the starting number of the HARQ process IDs may be used for other purposes.

Specifically, Embodiment 2 proposes a method of using a bit area for determining the start position of HARQ process IDs to determine the type and configuration of target information by modifying Embodiment 1 when the size of the target information, which is represented by the position of a bit pattern, is equivalent to the size of information about Qmax HARQ processes (Qmax is the maximum number of HARQ processes applicable to the system).

In Embodiment 2, Method 1, Method 1-1, Method 2, Method 3, Method 4, and Method 4-3 may be used in combination. Additionally, Method 5 and Method 5-2 may be further used. Embodiment 2 is only an example to help understand the present disclosure, and the present disclosure is not limited thereto.

As a specific method of Embodiment 2, when the maximum number of HARQ processes controlled by one DCI is Pmax and among the Pmax HARQ processes, P (≤Pmax) HARQ process IDs are scheduled, the size of a bit area in the DCI for representing the number of scheduled HARQ processes and the NDI for each process in combination may be Pmax+1 bits, and indices #0 to #Pmax may be assigned to bits in the bit area. In the following, the bit area having the above indices is defined as a main bit area for convenience of description. The size, type, and configuration of information included in the bit area may be represented by the index of a bit in which 1 (or 0) first appears in ascending (or descending) order in the main bit area. If the index of the bit in which 1 (or 0) first appears in the ascending (or descending) order is not #0, the indices of bits after the bit in which 1 (or 0) first appears in the ascending (or descending) order may be used to represent NDI information for each HARQ process. If the number of remaining bits is P, the remaining bits sequentially represent NDIs related to consecutive HARQ process IDs from #X to #(mod(X+P−1, Pmax)), where X denotes the starting number of the consecutive HARQ process IDs and may be expressed by separate $\lceil \log_2(Qmax) \rceil$ bits (where $\lceil \ \rceil$ denotes the ceiling function). In the following, a bit set with a size of $\lceil \log_2(Qmax) \rceil$ is defined as an additional information area for convenience of description.

If the index of the bit where 1 (or 0) first appears in the ascending (or descending) order in the main bit area is #0, the remaining bits, which have indices #1 to #Pmax, are used for information transfer. In this case, the type and configuration of information included in the main bit area may be represented by combination of bits included in the additional information area. The type and configuration of the information included in the main bit area may include the following options.

(Option 1-1-A) The bits with indices #1 to #Pmax in the main bit area may be used to represent NDI information related to Pmax HARQ process IDs. In this case, a bit with index #Y (Y>0) in the main bit area may be used to represent NDI information about HARQ process ID #Y.

(Option 1-1-B) The bits with indices #1 to #Pmax in the main bit area may be used to schedule one or more HARQ process IDs by indicating the same NDI value, which is designated by the additional information area. If a bit with index (Y>0) is expressed as 1 (or 0) in the main bit area, it may mean that transmission of HARQ process ID #Y is scheduled. The NDI information commonly applied to the scheduled HARQ processes may be distinguished by the additional information area. For example, the bit representation of an additional information area to which NDI=0 is applied may be different from the bit representation of an additional information area to which NDI=1 is applied. If the additional information area indicates a specific NDI value, all HARQ process IDs scheduled in the main bit area may be determined to have the specific NDI value.

(Option 1-1-C) The bits with indices #1 to #Pmax in the main bit area may be used to represent scheduled P HARQ process IDs and the NDI value related to each HARQ process ID. In this case, the size of P may be indicated by the additional information area. To this end, the bits with indices #1 to #Pmax in the main bit area may be divided into an area for representing HARQ process IDs and an area for representing NDIs. Each HARQ process ID may be indicated by a bit with an independent size of $\lceil \log_2(Qmax) \rceil$ In addition, the area for representing P NDIs may be indicated by P bits, and each bit sequentially presents an NDI value related to a scheduled HARQ process ID. Therefore, the size of P must satisfy the condition of $P \times \lceil \log_2(Pmax) \rceil + P \leq Pmax$ As an example of Embodiment 2, when the number of scheduled HARQ processes is P, 1 may be mapped to a bit with index #(Pmax-P) in the main bit area with a size of Pmax+1, and 0 may be mapped to all bits before the corresponding index. In this case, if P<Pmax, a bit with index #(Pmax−P+1+a) in the main bit area may be used to represent NDI information about a HARQ process ID with a unique number of #(mod(X+a, Pmax)) for a ∈{0, 1, . . . , P−1}. If P=Pmax, the type of information represented by bits with indices #1 to #Pmax in the main bit area may vary according to representation by $\lceil \log_2(Qmax) \rceil$ bits in the additional information area.

The method proposed in Embodiment 2 has an advantage of reducing the number of required bits by joint encoding bit areas for representing the number of scheduled HARQ processes and NDI information for each HARQ process. In addition, the method has an advantage of improving the scheduling flexibility by avoiding representation of overlapping information and representing other information in behalf thereof.

FIG. 27 illustrates DCI areas to which the method proposed in Embodiment 2 is applied in the form of a table when both the maximum number of schedulable HARQ processes and the maximum number of available HARQ processes is Pmax=8 as in CE mode A of MTC (see Table 6). In the example of FIG. 27, three bits from #0 to #2 correspond to an additional information area described in Embodiment 1-1, and 9 bits from #3 to #11 correspond to a main bit area described in Embodiment 2. In this case, if a position where 1 first appears in ascending order of bits #3 to #10 is between #4 and #10, the maximum number of available HARQ processes may be determined based on the position of 1. For an arbitrary number a, N(a) means NDI information about HARQ process ID #(mod(a+X, 8)), where X is a value between 0 and 7 and may be indicated by the three bits from #0 to #2. The number of bits and the number of processes are only examples to help understand the present disclosure, and the present disclosure is not limited thereto. If the position where 1 first appears in the ascending order of the bits #3 to #10 is #3, information represented by bits #4 to #11 may be determined by bits #0 to #2. For example, when bits #0 to #2 have values of 0, 0, and 0, respectively as shown in the table, the bits may be used to schedule 8 HARQ processes, and bits #3 to #11 may be used to represent NDI information (see option 1-1-A). For example, when bits #0 to #2 have values of 0, 0, and 1, respectively as shown in the table, the bits may be used to schedule two HARQ processes. In this case, bits #4 and #8 may be used to indicate the NDI value of each HARQ process, a bundle of bits #5 to #7 and a bundle of bits #8 to #11 may be used to represent a HARQ process ID, respectively (see option 1-1-C). For example, when bits #0 to #1 have values of 0 and 1, respectively as shown in the table, the bits may be used to schedule a plurality of HARQ processes with the same NDI value. In this case, bit #2 may be used to represent the NDI value, and bits #4 to #11 may be used to represent whether each HARQ process is scheduled. For example, when bit #a is 1 for a ∈{4, 5, 6, 7, 8, 9, 10,11}, it may be determined to mean that HARQ process ID #(a-3) is scheduled (see option 1-1-B). The number of bits and the number of processes are only examples to help understand the present disclosure, and the present disclosure is not limited thereto.

Embodiment 3

As the size of bits included in DCI increases, the scheduling flexibility may also increase proportionally. However, as the size of the DCI increases, problems such as a decrease in DCI decoding performance and a decrease in supportable coverage may occur. Therefore, a decrease in the number of DCI bits may be considered by giving up the scheduling flexibility according to system requirements.

Specifically, Embodiment 3 proposes a method of reducing the size of bits included in DCI by limiting the flexibility in the number of HARQ processes capable of being scheduled by one DCI by modifying Embodiment 1.

In Embodiment 3, Method 1, Method 1-1, Method 1-2, Method 2, Method 3, Method 4, Method 4-2, Method 4-3, and Method 6 may be used in combination. Embodiment 3 is only an example to help understand the present disclosure, and the present disclosure is not limited thereto.

As a specific method of Embodiment 3, when the maximum number of HARQ processes controlled by one DCI is Pmax and among the Pmax HARQ processes, P (≤Pmax) HARQ process IDs are scheduled, the size of a bit area in the DCI for representing the number of scheduled HARQ processes and the NDI for each process in combination may be Pmax+c bits, and indices #0 to #(Pmax+c−1) may be assigned to bits in the bit area. In the following, the bit area having the above indices is defined as a main bit area for convenience of description. The size, type, and configuration of information included in the bit area may be represented by the index of a bit in which 1 (or 0) first appears in ascending (or descending) order in the main bit area. When the bit in which 1 (or 0) first appears in the ascending (or descending) order in the main bit area is bit #a and when a is not equal to c−1 but an integer between 0 and Pmax+c, bits with indices #(a+1) to #(Pmax+c−1) may include additional information that has a size of $\lceil \log_2(Pmax) \rceil$ and represents the starting number of HARQ process IDs and also include NDI information for ((Pmax+c−1)−a−$\lceil \log_2 (Pmax) \rceil$) HARQ processes with consecutive HARQ process IDs (where ⌈ ⌉ denotes the ceiling function). If bit #(c−1) is the bit in which 1 (or 0) first appears in the ascending (or descending) order in the main bit area, bits with indices #c to #(Pmax+c−1) may be used to represent NDI information related to Pmax HARQ process IDs.

As an example of Embodiment 3, a case in which the number of scheduled HARQ processes is P may be considered. If P≠Pmax, 1 may be mapped to bit #(Pmax−P−⌈log$_2$(Pmax)⌉+c−1) in the main bit area with a size of Pmax+c, and 0 may be mapped to all bits before the corresponding index. For a ∈{0, 1, . . . , P−1}, a bit with index #(Pmax−P+c+a) in the main bit area may be used to represent NDI information about a HARQ process ID with a unique number of #(mod(X+a, Pmax)), and bits with indices #(Pmax−P−⌈log$_2$(Pmax)⌉+c) to #(Pmax−P+c−1) may be used to represent the value of X in the range of 0 to Pmax. If P=Pmax, 1 may be mapped to bit #(c−1) in the main bit area with the size of Pmax+c, and 0 may be mapped to all bits before the corresponding index. In this case, a bit with index #(Y+c) (Y≥0) may be used to represent NDI information about HARQ process ID #Y.

The method proposed in Embodiment 3 has an advantage of reducing the number of required bits by joint encoding bit areas for representing the number of scheduled HARQ processes and NDI information for each HARQ process. In addition, the method has an advantage of further reducing the number of required bits by partially limiting the scheduling flexibility.

FIGS. 28 and 29 illustrate DCI areas to which the method proposed in Embodiment 3 is applied in the form of a table when the maximum number of schedulable HARQ processes is Pmax=8 as in CE mode A of MTC (see Table 6) and the maximum number of available HARQ processes is Qmax=8.

In the example of FIG. 28, a total of 9 bits are used, and the number of HARQ processes may be selected as one of the following values: 1, 2, 3, 4, and 8. In the example of FIG. 28, when 8 HARQ processes are scheduled, 1 is mapped to bit #0, and NDI information for the 8 HARQ processes is represented by bits with indices #1 to #8. If a position where 1 first appears in ascending order is #A and A is a value between 1 and 4, the value of X, which indicates the position where the HARQ process ID starts, may be represented as a value between 0 and 7 by three bits from #(A+1) to #(A+3). Bits with indices #(A+4) to #8 are used to represent 5−A pieces of NDI information. For an arbitrary number a, N(a) means NDI information about HARQ process ID #(mod(a+X, 8)).

In the example of FIG. 29, a total of 10 bits are used, and the number of HARQ processes may be selected as one of the following values: 1, 2, 3, 4, 6 and 8. In the example of FIG. 29, when 8 HARQ processes are scheduled, 0 is mapped to bit #0, 1 is mapped to bit #1, and NDI information for the 8 HARQ processes is represented by bits with indices #2 to #9. If a position where 1 first appears in ascending order is #A and the value of A is 0 or between 2 and 5, the value of X, which indicates the position where the HARQ process ID starts, may be represented as a value between 0 and 7 by three bits from #(A+1) to #(A+3). Bits with indices #(A+4) to #9 are used to represent 6−A pieces of NDI information. For an arbitrary number a, N(a) means NDI information about HARQ process ID #(mod(a+X, 8)). The number of bits and the number of processes are only examples to help understand the present disclosure, and the present disclosure is not limited thereto.

Embodiment 3-1

When transmission for all HARQ processes is initial transmission, the flexibility in the number of schedulable HARQ processes is important in terms of preventing an increase in overhead and power consumption due to additional DCI transmission. Therefore, when the scheduling flexibility is limited in order to reduce the number of DCI bits, maintaining the flexibility in the number of schedulable HARQ processes may be considered. In this respect, a method of reducing the scheduling flexibility of additional information required to schedule some HARQ processes instead of maintaining the flexibility in the number of schedulable HARQ processes may be considered. In addition, a method of using one bit pattern in representing the number of multiple HARQ processes in order to indicate scheduling of the multiple HARQ processes with a limited number of bits and a including the correct number of HARQ processes in additional information may be considered.

Specifically, Embodiment 3-1 proposes a method of reducing the size of bits included in DCI by varying the size of a bit area for determining the start position of HARQ process IDs for each number of scheduled HARQ processes while maintaining the flexibility in the number of HARQ processes schedulable by one DCI through modification of Embodiment 1.

In Embodiment 3-1, Method 1, Method 1-1, Method 2, Method 3, Method 4, Method 4-2, Method 4-3, and Method 6-1 may be used in combination. Additionally, Method 5 may be further used. Embodiment 3-1 is only an example to help understand the present disclosure, and the present disclosure is not limited thereto.

As a specific method of Embodiment 3, when the maximum number of HARQ processes controlled by one DCI is Pmax and among the Pmax HARQ processes, P (≤Pmax) HARQ process IDs are scheduled, the size of a bit area in the DCI for representing the number of scheduled HARQ processes and the NDI for each process in combination may be Pmax+c bits, and indices #0 to #(Pmax+c−1) may be assigned to bits in the bit area. In the following, the bit area having the above indices is defined as a main bit area for convenience of description. The size, type, and configuration of information included in the bit area may be represented by the index of a bit in which 1 (or 0) first appears in ascending (or descending) order in the main bit area. When the index of the bit in which 1 (or 0) first appears in the ascending (or descending) order in the main bit area is #a, bits #(a+1) to #(a+b(a)) may be used to additionally indicate the type and configuration of information included in bits #(a+b(a)+1) to #(Pmax+c−1). Specifically, candidates for information about HARQ processes capable of being included in the main bit area may be determined by the value of a, and one of the selectable candidates may be determined by the following b(a) bits. In this case, b(a) may be set to a value determined by a, and b(a)=0 may be configured for a specific value of a. When b(a)=0, it means that there is one candidate for the information about the HARQ processes determined by a. For example, when b(a')=0 for a specific value a' and #a' is the index of the bit in which 1 (or 0) first appears, bits with indices #(a'+1) to #(Pmax+c−1) may include additional information that has a size of ⌈log$_2$(Pmax)⌉ and represents the starting number of HARQ process IDs and also include NDI information for ((Pmax+c−1)-a-⌈log$_2$(Pmax)⌉) HARQ processes with consecutive HARQ process IDs (where ⌈ ⌉ denotes the ceiling function). If b(a)>0 for a specific value a, there may be a plurality of candidates for information on HARQ processes determined by a, and there may be a maximum of 2b(a) candidates. For example, if b(a")>0 for a specific value a" and #a" is the index of the bit in which 1 (or 0) first appears, the number of schedulable HARQ processes may be determined by bits with indices #(a"+1) to #(a) in the main bit area. If the number of schedulable HARQ processes represented by b(a") bits is P", bits with indices #(a"+b(a")+1) to #(Pmax+c−1) in the main bit area may include NDI information about P HARQ processes, and the remaining bits may be used to represent the starting number of the HARQ process IDs. In this case, the size of bits for representing the starting number of the HARQ process IDs may be smaller than $\lceil \log_2(Pmax) \rceil$. To this end, that the starting number of the HARQ process IDs may be determined to be limitedly selected according to a predetermined criterion (e.g., lookup table or equation).

The method proposed in Embodiment 3-1 has an advantage of reducing the number of bits required for DCI transmission while maintaining the flexibility in the number of scheduled HARQ processes. In particular, it may be suitable for a communication system in which retransmission is less likely to occur.

FIGS. 30 and 31 illustrate DCI areas to which the method proposed in Embodiment 3-1 is applied in the form of a table when the maximum number of schedulable HARQ processes is Pmax=8 as in CE mode A of MTC (see Table 6) and the maximum number of available HARQ processes is Qmax=8. In the example of FIG. 30, a total of 11 bits are used. In the example of FIG. 30, when 1 is first mapped to bit #A for A∈{1, 2, . . . , 6}, the value of X, which indicates the position where the HARQ process ID starts, may be represented as a value between 0 and 7 by bits with indices #(A+1) to #(A+3). Bits with indices #(A+4) to #10 may be used to represent 7-A pieces of NDI information. In the example of FIG. 30, when 1 is first mapped to #0, 7 HARQ processes and 8 HARQ processes may be distinguished by bits with indices #1 and #2. If the 7 HARQ processes are scheduled, bit #3 may be used to represent the value of X, which is information indicating the starting point of the HARQ process IDs. For example, X may be determined to have a value of either 0 or 1. In addition, bits with indices #4 to #10 may be used to represent seven pieces of NDI information. If the 8 HARQ processes are scheduled, bits with indices #3 to #10 may be used to represent 8 pieces of NDI information. In the example of FIG. 30, the reserved state may be used to distinguish different types of information representation methods. In the example of FIG. 31, a total of 10 bits are used. In the example of FIG. 31, if 1 is mapped to bit #A for A∈{2, 3, . . . , 5}, the value of X, which the position where the HARQ process ID starts, may be represented as a value between 0 and 7 by bits with indices #(A+1) to #(A+3). Bits with indices #(A+4) to #9 may be used to represent 6-A pieces of NDI information. In the example of FIG. 31, when 1 is first mapped to bit #A for A∈{0, 1}, bit #(A+1) may be used to distinguish (8-A) HARQ processes and (7-A) HARQ processes. If the 7 HARQ processes are scheduled, bit #3 may be used to represent the value of X, which is information indicating the starting point of the HARQ process IDs. For example, X may be determined to have a value of either 0 or 1. In addition, bits with indices #4 to #10 may be used to represent seven pieces of NDI information. If the 8 HARQ processes are scheduled, bits with indices #3 to #10 may be used to represent 8 pieces of NDI information.

In the example of FIG. 30, the reserved state may be used to distinguish different types of information representation methods. If the (8-A) HARQ processes are scheduled, first A bits after #(A+1) may be used to represent the value of X, which indicates the position where the HARQ process ID starts. If the (7-A) HARQ process are scheduled, first A+1 bits after #(A+1) may be used to represent the value of X, which indicates the position where the HARQ process ID starts. In this case, all of the remaining bits may be used to represent the NDI. The number of bits and the number of processes are only examples to help understand the present disclosure, and the present disclosure is not limited thereto.

Embodiment 3-2

In the method proposed in Embodiment 1-1, if all HARQ process IDs are included in scheduling, separate $\lceil \log_2(Qmax) \rceil$ bits, which are used to indicate the starting number of HARQ process IDs, may become unnecessary. In particular, when independent information for each HARQ process is represented by a plurality of bits, the size of DCI bits may become problematic, and thus a method of reducing the size of DCI bits by removing unnecessary information needs to be considered.

Specifically, Embodiment 3-2 proposes a method of reducing the size of bits included in DCI by removing information about the starting number of HARQ process IDs from target information for Pmax HARQ processes through modification of Embodiment 1-1 when information for each scheduled HARQ process includes a plurality of bits. In particular, the method proposed in Embodiment 3-2 is applicable when the size of additional information used to inform the starting number of HARQ process IDs, $\lceil \log_2(Qmax) \rceil$ is larger than M, which is the size of information configured for each HARQ process.

In Embodiment 3-2, Method 1, Method 1-1, Method 2, Method 3, Method 4, Method 4-2, and Method 6-1 may be used in combination. Embodiment 3-2 is only an example to help understand the present disclosure, and the present disclosure is not limited thereto.

As a specific method of Embodiment 3-2, when the maximum number of HARQ processes controlled by one DCI is Pmax and among the Pmax HARQ processes, P (≤Pmax) HARQ process IDs are scheduled, the size of a bit area in the DCI for representing the number of scheduled HARQ processes and M-bit information configured for each process in combination may be M*Pmax+c bits, and indices #0 to #(M*Pmax+c−1) may be assigned to bits in the bit area. The value of c may be determined as ($\lceil \log_2(Qmax) \rceil$−M+1). In the following, the bit area having the above indices is defined as a main bit area for convenience of description. The size, type, and configuration of information included in the main bit area may be represented by the index of a bit in which 1 (or 0) first appears in ascending (or descending) order in the main bit area. When the bit in which 1 (or 0) first appears in the ascending (or descending) order in the main bit area is bit #a and when a is not equal to c−1 but an integer between 0 and M*Pmax+c−1, bits with indices #(a+1) to #(M*Pmax+c−1) may include additional information that has a size of $\lceil \log_2(Pmax) \rceil$ and represents the starting number of HARQ process IDs. In addition, the bits may be used to represent M-bit configuration information for each of (Pmax+c−1)-a-$\lceil \log_2(Pmax) \rceil$ HARQ processes with consecutive HARQ process IDs. The configuration information for each HARQ process may include the NDI and/or RV therefor. If bit #(c−1) is the bit in which 1 (or 0) first appears in the ascending (or descending) order in the main bit area, bits with indices #c to #(Pmax+c−1) may be used to represent M-bit configuration information related to Pmax HARQ process IDs.

As an example of Embodiment 3-2, a case in which the number of scheduled HARQ processes is P may be considered. If P≠Pmax, 1 may be mapped to bit #(M*(Pmax-P)+c−1-$\lceil \log_2(Pmax) \rceil$) in the main bit area with a size of M*Pmax+c, and 0 may be mapped to all bits before the corresponding index. For a E {0, 1, . . . , P−1}, bits with indices #(M*(Pmax−P+a)+c) to #(M*(Pmax−P+a+1)+c−1) in the main bit area may be used to represent NDI information about a HARQ process ID with a unique number of #(mod(X+a, Pmax)), and bits with indices #(M*(Pmax−P)+c−$\lceil \log_2(\text{Pmax}) \rceil$) to #(M*(Pmax−P)+c−1) may be used to represent the value of X in the range of 0 to Pmax. If P=Pmax, 1 may be mapped to bit #(c−1) in the main bit area with the size of Pmax+c, and 0 may be mapped to all bits before the corresponding index. In this case, bits with indices #(M*Y+c) to #(M*(Y+1)+c−1) (Y≥0) may be used to represent NDI information about HARQ process ID #Y.

The method proposed in Embodiment 3-2 has an advantage of reducing the number of required bits by removing unnecessary information during joint encoding of bit areas for representing the number of scheduled HARQ processes and NDI information for each HARQ process.

FIG. 32 illustrates DCI areas to which the method proposed in Embodiment 3-2 is applied in the form of a table when the maximum number of schedulable HARQ processes is Pmax=8 as in CE mode A of MTC (see Table 6) and the maximum number of available HARQ processes is Qmax=8. Specifically, FIG. 32 shows a case where M (M=2) bits of information are required to express the NDI and RV for each HARQ process. In the example of FIG. 32, if the number of scheduled HARQ processes is 8, bit #1 may be a position where 1 first appears in ascending order. In addition, bits #2 to #17 may represent information about NDIs and RVs for 8 HARQ processes in order of HARQ process IDs. For an arbitrary number a, N(a) and R(a) respectively mean information about the NDI and RV of HARQ process ID #a, where X is a value between 0 and 7 and may be indicated by the three bits from #0 to #2. The number of bits and the number of processes are only examples to help understand the present disclosure, and the present disclosure is not limited thereto. In the example of FIG. 32, when the number of scheduled HARQ processes is P and the value of P is an integer between 1 and 7, if the position where 1 first appears in ascending order is #A, A may have a value of 2*(7−P). In this case, bits with indices #(A+1) to #(A+3) may be used to represent the value of X, which indicates the number where the HARQ process ID starts and has a value between 0 and 7. Bits with indices #(A+4) to #17 may be used to represent information about NDIs and RVs of scheduled HARQ processes. For an arbitrary number a, N(a) and R(a) mean information about the NDI and RV of HARQ process ID #(mod(a+X, 8)), respectively. The number of bits and the number of processes are only examples to help understand the present disclosure, and the present disclosure is not limited thereto.

Embodiment 4

When the information representation method described in Method 5 is used, that is, when representation of ON/OFF information about a HARQ process is allowed and information about P HARQ processes is scheduled, if OFF information is indicated for one or more processes, the above information expression method may be used to schedule HARQ processes smaller than the P HARQ processes. In this case, if information on the P HARQ processes are represented separately, the scheduling flexibility may be improved within the scope of the continuous P HARQ processes.

Specifically, Embodiment 4 proposes a method of scheduling HARQ processes less than or equal to P_fix HARQ processes based on a target information representation method when the target information representation method includes a bitmap for representing ON/OFF information about HARQ processes with P_fix (<Pmax) consecutive IDs and NDI information one-to-one related to each of the HARQ processes.

In Embodiment 4, Method 1, Method 1-1, Method 1-2, Method 2, Method 3, Method 4, Method 4-2, Method 4-3, Method 5, Method 5-1, and Method 5-2 may be used in combination. Embodiment 4 is only an example to help understand the present disclosure, and the present disclosure is not limited thereto.

As a specific method of Embodiment 4, when the maximum number of HARQ processes controlled by one DCI is Pmax and among the Pmax HARQ processes, P (≤Pmax) HARQ process IDs are scheduled, the size of a bit area in the DCI for representing the number of scheduled HARQ processes and the NDI for each process in combination may be Pmax+c bits, and indices #0 to #(Pmax+c−1) may be assigned to bits in the bit area. In the following, the bit area having the above indices is defined as a main bit area for convenience of description. The size, type, and configuration of information included in the bit area may be represented by the index of a bit in which 1 (or 0) first appears in ascending (or descending) order in the main bit area. When the bit in which 1 (or 0) first appears in the ascending (or descending) order in the main bit area is a bit with index #0, the types of information included in the target information may include: additional information that has a bit size of $\lceil \log_2(\text{Pmax}) \rceil$ and represents the number where the HARQ process ID starts; an ON/OFF bitmap that has a size of P_fix and represents whether P_fix consecutive HARQ processes are scheduled; and a bit area that has a size of P_fix and represents NDI information one-to-one related to the P_fix consecutive HARQ processes. In this case, the size of P_fix must satisfy the following condition: 2×P_fix+$\lceil \log_2(\text{Pmax}) \rceil$+1=Pmax+c.

If the index of the bit where 1 (or 0) first appears in the ascending (or descending) order in the main bit area is not #0, the type and configuration of information included in the main bit area may include the following options.

(Option 1-3-A) When the index of the bit where 1 (or 0) first appears in the ascending (or descending) order in the main bit area is #(c−1) or when 0 (or 1) is mapped to an interval between #1 and #(c−1), bits with indices #c to #(Pmax+c−1) may be used to represent NDI information related to Pmax HARQ process IDs. In this case, a bit with index #(Y+c) in the main bit area may be used to represent NDI information about HARQ process ID #Y.

(Option 1-3-B) When the index of the bit where 1 (or 0) first appears in the ascending (or descending) order in the main bit area is #A and when A≠c−1, bits with indices #(A+1) to #(Pmax+c−1) may include additional information that has a size of $\lceil \log_2(\text{Pmax}) \rceil$ and represents the number where the HARQ process ID starts and NDI information about (Pmax+c−1)−A−$\lceil \log_2(\text{Pmax}) \rceil$ HARQ processes with consecutive HARQ process IDs.

As an example of Embodiment 4, when the number of scheduled HARQ processes is smaller than or equal to P_fix, it may be considered that 1 is mapped to bit #0 in the main bit area with a size of Pmax+c. For a ∈{0, 1, . . . , P_fix−1}, a bit with index #($\lceil \log_2(\text{Pmax}) \rceil$1+1+a) may represent whether a HARQ process ID having a unique number of #(mod(X+a, Pmax)) is included in the scheduling. If the corresponding bit has a value of 1, bit #(mod(X+a, Pmax)) may be included in the scheduling. For a ∈{0, 1, . . . , P_fix−1}, a bit with index #($\lceil \log_2(\text{Pmax}) \rceil$+1+P_fix+a) may be used to represent NDI information related to the HARQ process ID having the unique number of #(mod(X+a, Pmax)). In this case, bits with indices #1 to #⌈log$_2$(Pmax)⌉ may be used to represent the value of X in the range of 0 to Pmax.

The method proposed in Embodiment 4 has an advantage of reducing the number of required bits by joint encoding bit areas for representing the number of scheduled HARQ processes and NDI information for each HARQ process. In addition, the method has an advantage of further reducing the number of required bits by partially limiting the scheduling flexibility. In addition, when the number of scheduled HARQ processes is less than P_fix, the method has an advantage of selecting discontinuous HARQ process IDs within consecutive P_fix HARQ process IDs. Compared to the method proposed in Embodiment 1, the method proposed in Embodiment 4 may partially improve the scheduling flexibility while using the same number of bits FIG. 33 illustrates DCI areas to which the method proposed in Embodiment 4 is applied in the form of a table when both the maximum number of schedulable HARQ processes and the maximum number of available HARQ processes is Pmax=8 as in CE mode A of MTC (see Table 6). In the example of FIG. 32, the size, type, and configuration of target information may be represented by a position where 1 first appears in ascending order in a bit interval of #0 to #3. If a bit with index #0 has a value of 1, one to four HARQ processes may be scheduled. In this case, bits with indices #4 to #7 may be used to present whether four HARQ processes are scheduled. For example, when bit #(4+Y) is 1, HARQ process ID #(mod(X+Y, 8)) may be included in the scheduling. Bits with indices #8 to #11 may be used to provide NDI information about the four HARQ processes. For example, bit #(8+Y) may represent NDI information about HARQ process ID #(mod(X+Y, 8)), where X denotes a reference value at which the HARQ process ID starts and has a value between 0 and 7. The value of X may be represented by three bits from #1 to #3. If P HARQ processes with consecutive HARQ process IDs are to be scheduled (where P ∈ {5, 6, 7}), the position where 1 first appears in ascending order in the bit interval of #1 to #3 may be #(8-P), and bits #0 to #(7-P) may all have a value of 0. In this case, bits with indices #(12-P) to #11 may be used to represent NDI information about the scheduled HARQ processes. For example, a bit with index #(Y+12-P) may be configured to include NDI information about HARQ process ID #(mod(X+Y, 8)), where X denotes the reference value at which the HARQ process ID starts and has a value between 0 and 7. The value of X may be represented by three bits from #(9-P) to #(11-P). The number of bits and the number of processes are only examples to help understand the present disclosure, and the present disclosure is not limited thereto.

Embodiment NB-1

The methods proposed in the present disclosure may be used to represent the number of HARQ processes, the IDs of included HARQ processes, and NDI information for each HARQ process ID when up to two HARQ processes are simultaneously scheduled by one DCI.

Specifically, Embodiment NB-1 proposes a method of scheduling P (≤2) HARQ processes through one DCI and providing the number of scheduled HARQ processes P, the IDs of the scheduled HARQ process, and the NDI for each HARQ process ID.

In Embodiment NB-1, Method 1, Method 1-1, Method 1-2, Method 2, Method 3, Method 4, and Method 4-2 may be used in combination. Embodiment NB-1 is only an example to help understand the present disclosure, and the present disclosure is not limited thereto.

As a specific method of Embodiment NB-1, when the maximum number of HARQ processes controlled by one DCI is 2 and among two HARQ processes, P (2) HARQ process IDs are scheduled, the size of a bit area in the DCI for representing the number of scheduled HARQ processes and the NDI for each process in combination may be three bits, and indices #0 to #2 may be assigned to bits in the bit area. In the following, the bit area having the above indices is defined as a main bit area for convenience of description. To represent scheduling of P=2 HARQ processes, 1 (or 0) may be mapped to the first bit in ascending (or descending) order in the main bit area. The second and third bits in the ascending (or descending) order in the main bit area may be used to represent NDI information about HARQ process IDs #0 and #1, respectively. On the contrary, if 1 (or 0) is not mapped to the first bit in the in ascending (or descending) order in the main bit area, it may represent that only one HARQ process is scheduled. The second and third bits in the ascending (or descending) order in the main bit area may be used to represent information about the HARQ process ID of the scheduled HARQ process and NDI information related thereto.

As an example of Embodiment NB-1, when the number of scheduled HARQ processes is 2, 1 may be mapped to bit #0 in the three-bit main bit area, NDI information about HARQ process ID #0 may be represented by bit #1, and NDI information about HARQ process ID #1 may be represented by bit #2. If the number of scheduled HARQ processes is 1, 0 may be mapped to bit #0 in the three-bit main bit area, information about the HARQ process ID may be mapped to bit #1, and NDI information may be mapped to bit #2.

The method proposed in Embodiment NB-1 has an advantage of minimizing the number of required bits by joint encoding bit areas for representing NDI information for each HARQ process when the maximum number of scheduled HARQ processes is 2. In particular, the method has an advantage of supporting a multi-TB scheduling structure in the current NB-IoT system by adding one bit in DCI design methods for unicast purposes.

FIG. 34 illustrates DCI areas to which the method proposed in Embodiment NB-1 is applied in the form of a table when the maximum number of schedulable HARQ processes is Pmax=2 as in NB-IoT. In the example of FIG. 34, three bits from #0 to #2 correspond to a main bit area. When bit #0 is 1, the number of HARQ processes is 2. When bit #0 is 0, the number of HARQ processes is 1. If bit #0 is 1, bit #1 includes NDI information about HARQ process ID #0. If bit #0 is 0, bit #1 represents information about the ID of the scheduled HARQ process, and bit #2 bit may be used to represent NDI information related thereto. For example, when bit #1 is 0, it may mean HARQ process ID #0. When bit #1 is 1, it may mean HARQ process ID #1. In this case, bit #2 may be used to represent NDI information about the scheduled HARQ process. The number of bits and the number of processes are only examples to help understand the present disclosure, and the present disclosure is not limited thereto.

Embodiment 5

When a set of TBS values available for single-TB scheduling is defined as TBS-Single, low TBS values among TBS values included in the TBS-Single may not be needed in multi-TB scheduling (or multiple-TB scheduling). For example, assuming that there are two TBS values included in the TBS-Single: N1 and N2 and the value of N2 is about twice the value of N1, it may be more advantageous for the UE operating in the multi-TB scheduling to be scheduled with one TB having a TBS of N2 than be scheduled with two TBs each having a TBS of N1. This may be reasonable considering that the main purpose of the multi-TB scheduling is to save network overhead and a structure in which more TBs are scheduled is disadvantageous in terms of the network overhead. Therefore, when a set of TBS values for the multi-TB scheduling is defined as TBS-Multi, a method of designing the TBS-Multi by excluding some values included in the TBS-Single may be considered. This method may reduce the size of bits in DCI for the multi-TB scheduling when designing the DCI.

However, when the UE monitoring the DCI for the multi-TB scheduling is scheduled with only one TB through the DCI, if the TBS is selected based on the TBS-Multi reduced in size, the degree of freedom of the TBS selection may decrease compared to the conventional single-TB scheduling.

The methods proposed in the present disclosure allow an operation of simultaneously scheduling a plurality of HARQ processes through one DCI in order to solve the above problems. In this case, if a set of TBS values available when two or more TBs are scheduled is defined as the TBS-Multi, the methods may be used to designate more TBS values than TBSs included in the TBS-Multi when one TB is scheduled by the DCI.

Specifically, Embodiment 5 proposes a method of including bits for representing TBS information in a bit area used to provide the number of scheduled HARQ processes P, the IDs of the scheduled HARQ processes, and the NDI for each HARQ process ID when P=1.

In Embodiment 1, Method 1, Method 1-1, Method 1-2, Method 2, Method 3, Method 4, Method 4-1, and Method 4-2 may be used in combination. Embodiment 5 is only an example to help understand the present disclosure, and the present disclosure is not limited thereto.

As a specific method of Embodiment 5, when the maximum number of HARQ processes controlled by one DCI is Pmax and among the Pmax HARQ processes, P (≤Pmax) HARQ process IDs are scheduled, The size of a bit area used to provide the number of scheduled HARQ processes P together with the IDs of the scheduled HARQ processes and the NDI for each HARQ process ID may be Pmax+a bits, and indices #0 to #(Pmax+a−1) may be assigned to bits in the bit area. In the following, the bit area having the above indices is defined as a main bit area for convenience of description. The number of HARQ processes may be represented by the index of a bit in which 1 (or 0) first appears in ascending (or descending) order in the main bit area. In this case, if 1 (or 0) does not appear in a section between #0 to #(Pmax−2), the number of HARQ processes represented by the main bit area may be determined to be 1. The remaining section from #(Pmax−1) to #(Pmax+a−1) may be used to represent information other than the number of HARQ processes, and one-bit NDI information may be included in the section. In addition, some of the remaining bits except the one-bit NDI information in the section of #(Pmax−1) to #(Pmax+a−1) may be used to represent a part of information about a scheduled TBS. When the size of bits used to represent the part of the information about the TBS within the section of #(Pmax−1) to #(Pmax+a−1) is M1 (≤a) bits and the size of bits used to represent the rest of the TBS information in areas other than the main bit area is M2 bits, the TBS may be represented by M1+M2 bits if one HARQ process is scheduled.

The method proposed in Embodiment 5 has an advantage in that when the number of scheduled HARQ processes is 1, extra bits are secured by reducing unnecessary expression and the secured bits are used to extend the representation range of the TBS.

FIG. 35 illustrates DCI areas to which the method proposed in Embodiment 5 is applied in the form of a table when the size of the main bit area is L bits. In the example of FIG. 35, when one HARQ process is scheduled, bits #0 to #(L−3) may be configured to have a value of 0. In this case, bit #(L−2) corresponds to NDI information related to the scheduled HARQ process, and bit #(L−1) may represent a part of information about a scheduled TBS. When M bits out of the L-bit main bit area are used to represent the TBS, if two or more HARQ processes are scheduled, the TBS information may be represented by the M bits. When one HARQ process is scheduled, the TBS information may be used by M+1 bits.

The number of bits and the number of processes are only examples to help understand the present disclosure, and the present disclosure is not limited thereto. In addition, when P (<Pmax) HARQ processes are scheduled for an arbitrary integer P greater than 1, the main bit area may be interpreted according to other methods and embodiments proposed in the present disclosure.

Embodiment 6

The methods proposed in the present disclosure may be used to represent the number of HARQ processes, the IDs of included HARQ processes, and NDI information for each HARQ process ID when a plurality of HARQ processes are simultaneously scheduled by one DCI.

Specifically, Embodiment 6 proposes a method of scheduling P (≤Pmax) HARQ processes with continuous or discontinuous HARQ process IDs through one DCI and providing the number of scheduled HARQ processes P, the IDs of the scheduled HARQ process, and the NDI for each HARQ process ID.

In Embodiment 6, Method 1, Method 1-1, Method 3, Method 3-1, and Method 7 may be used in combination. Embodiment 6 is only an example to help understand the present disclosure, and the present disclosure is not limited thereto.

As a specific method of Embodiment 6, when the maximum number of HARQ processes controlled by one DCI is Pmax and among the Pmax HARQ processes, P (≤Pmax) continuous or discontinuous HARQ process IDs are scheduled, the size of a bit area in the DCI for representing the number of scheduled HARQ processes and the NDI for each process in combination may be Pmax+c bits, and indices #0 to #(Pmax+c−1) may be assigned to bits in the bit area. In the following, the bit area having the above indices is defined as a main bit area for convenience of description. The size, type, and configuration of information included in the bit area may be represented by the index of a bit in which 1 (or 0) first appears in ascending (or descending) order in the main bit area. In this case, the relationship between the index of the bit where 1 (or 0) first appears in the ascending (or descending) order in the main bit area and the size, type, and configuration of the information included in the bit area may be determined according to a predetermined rule. For example, the predetermined rule may be defined in specifications. When the bit where 1 (or 0) first appears in the ascending (or descending) order in the main bit area is bit #a, if the number of HARQ processes scheduled by the DCI is P(a), P(a) pieces of independent NDI information may be represented by bits with indices #(Pmax+c-P(a)) to #(Pmax+c−1) in the main bit area, and information on combinations of the HARQ process IDs of the scheduled HARQ processes may be represented by bits with indices #(a+1) to #(Pmax+c-P(a)−1) in the main bit area.

In the specific method of Embodiment 6 above, when the HARQ process IDs expressed by the bits with indices #(a+1) to #(Pmax+cP(a)-1) are #H(0), #H(1), . . . , #H(P(a)-1) and the condition of ##H(0)<#H(1)<. . . <#H(P(a)-1) is satisfied, a bit with index #(Pmax+c-P(a)+b) in the main bit area may be configured to represent NDI information about HARQ process ID #H(b).

FIG. 36 illustrates DCI areas to which the method proposed in Embodiment 3 is applied in the form of a table when the maximum number of schedulable HARQ processes is Pmax=8 as in CE mode A of MTC (see Table 6) and the maximum number of available HARQ processes is Qmax=8. In the example of FIG. 36, a total of 12 bits are used, and the number of HARQ processes may be selected as one of the following values: 1, 2, 4, 6, and 8. In the example of FIG. 36, when 8 HARQ processes are scheduled, 1 may be mapped to bit #3, and all bits before bit #3 may have a value of 0. NDI information about the 8 HARQ processes may be represented by bits with indices #4 to #11. When the 8 HARQ processes are scheduled, no separates bit for representing the ID of any scheduled HARQ process may be required because all schedulable HARQ processes are included. When 6 HARQ processes are scheduled, 1 may be mapped to bit #0, and NDI information about the 6 HARQ processes may be represented by bits with indices #6 to #11. The number of all combinations for selecting 6 HARQ process IDs from among 8 HARQ process IDs is combination(8,6)=28, and at least five bits are required to represent the combinations. To this end, bits with indices #1 to #5 may be used. When two HARQ processes are scheduled, 1 may be mapped to bit #4, and all bits before bit #4 may have a value of 0. NDI information about the two HARQ processes may be represented by bits with indices #10 and #11. The number of all combinations for selecting two HARQ process IDs from among 8 HARQ process IDs is combination(8,2)=28, and at least five bits are required to represent the combinations. To this end, bits with indices #5 to #9 may be used. When one HARQ process is scheduled, 1 may be mapped to bit #7, and all bits before bit #7 may have a value of 0. NDI information about the one HARQ process may be represented by a bit with index #11. The number of all combinations for selecting one HARQ process ID from among 8 HARQ process IDs is combination(8,1)=8, and at least three bits are required to represent the combinations. To this end, bits with indices #8 to #10 may be used. The number of all combinations for selecting four HARQ process IDs from among 8 HARQ process IDs is combination(8,4)=70. In the case of four HARQ processes, since there are many combinations of HARQ process IDs, two representation methods, which are distinguished by positions where 1 first appears in ascending order, may be used for the main bit area. For 4-HARQ scheduling, 1 may be mapped to bit #1 or #2, and all bits before bit #1 or #2 may have a value of 0. NDI information about the four HARQ processes may be represented by bits with indices #8 to #11.

When 1 first appears in bit #1, bits with indices #2 to #7 may be used to represent some combinations of the four HARQ process IDs. When 1 first appears in bit #2, bits with indices #3 to #7 may be used to represent the remaining combinations of the four HARQ process IDs. The number of bits and the number of processes are only examples to help understand the present disclosure, and the present disclosure is not limited thereto.

In FIG. 36, when the bit area for representing combinations of P HARQ process IDs includes L bits, the combinations of the HARQ process IDs may be expressed by a lookup table with a size of 2L. The lookup table may exist separately for each value of P. However, such a lookup table may increase the complexity of the BS and UE. In addition, if the lookup table is configured to include all combinations, an increase in memory load may be problematic. To solve such a problem, the method proposed in Method 7 may be applied.

FIG. 37 illustrates an example in which Method 7 is applied to the example of FIG. 36 in the form of a table. In the example of FIG. 37, when 6 HARQ processes are scheduled, bits with indices #1 to #5 for representing a combination of HARQ process IDs may be divided into three bits (e.g., bits #3 to #5) for representing one HARQ process ID and two bits (e.g., bits #1 and #2) for representing an offset for calculating another HARQ process ID. In the example of FIG. 37, when 6 HARQ processes are scheduled, bits #3 to #5 may represent a value between 0 and 7 to represent one HARQ process ID, and bits #1 and #2 may represent a value between 0 to 3 to represent an offset with another HARQ process ID. For example, when the HARQ process ID represented by bits #3 to #5 is #H1 and the size of the offset represented by bits #1 and #2 is D, the other HARQ process ID may be determined as #(mod(H1+D+1, 8)). When the 6 HARQ processes are scheduled, remaining 6 HARQ process IDs may be scheduled except the two HARQ process IDs determined as described above. In the example of FIG. 37, when two HARQ processes are scheduled, bits with indices #5 to #9 index for representing a combination of HARQ process IDs may be divided into three bits (e.g., bits #7 to #9) for representing one HARQ process ID and two bits (e.g., bits #5 and #6) for representing an offset for calculating another HARQ process ID. Two HARQ process IDs may be represented by the five bits in the same way as when the 6 HARQ process are scheduled. When the two HARQ processes is scheduled, the two HARQ process IDs determined as described above may be scheduled. In the example of FIG. 37, if one HARQ process is scheduled, bits with indices #8 to #10 for representing a combination of HARQ process IDs may represent a value between 0 and 7, and one HARQ process ID may be represented by this value. In the example of FIG. 37, when four HARQ processes are scheduled and the index of a bit where 1 first appears is #1, bits with indices #2 to #7 for representing combinations of HARQ process IDs may be divided into three bits (e.g., #5 to #7) for representing one HARQ process ID and three bits (e.g., #2 to #4) for representing offsets for calculating the remaining three HARQ process IDs. First HARQ process ID #H1 may be represented as a value between 0 and 7 by bits with indices #5 to #7. Second HARQ process ID #H2 may be calculated as #(mod(H1+D1+1, 8)) by an offset value D1 between 0 and 1, which is indicated by a bit with index #4. Third HARQ process ID #H3 may be calculated as #(mod(H2+D2+1, 8)) by an offset value D2 between 0 and 1, which is indicated by a bit with index #3. Fourth HARQ process ID #H4 may be calculated as #(mod(H3+D3+1, 8)) by an offset value D3 between 0 and 1, which is indicated by a bit with index #2. In the example of FIG. 37, when four HARQ processes are scheduled and the index of a bit where 1 first appears is #2, bits with indices #3 to #7 for representing combinations of HARQ process IDs may be divided into three bits (e.g., #5 to #7) for representing one HARQ process ID and two bits (e.g., #3 and #4) for representing offsets for calculating the remaining three HARQ process IDs. First HARQ process ID #H1 may be represented as a value between 0 and 7 by bits with indices #5 to #7. Second HARQ process ID #H2 may be always calculated as #(mod (H1+1, 8). Third HARQ process ID #H3 may be calculated as #(mod(H2+D2+1, 8)) by an offset value D2 between 0 and 2, which is indicated by bits with indices #3 and #4. Fourth HARQ process ID #H4 may be always calculated as #(mod(H2+4, 8)). When the above methods are used, combinations of all HARQ process IDs capable of scheduling 1, 2, 4, 6, or 8 HARQ processes may be calculated on a bit basis without using a lookup table.

FIG. 38 illustrates DCI areas to which the method proposed in Embodiment 3 is applied in the form of a table in a similar way to those of FIGS. 36 and 37 when the maximum number of schedulable HARQ processes is Pmax=4 as in CE mode B of MTC (see Table 6) and the maximum number of available HARQ processes is Qmax=4. FIG. 38 (a) shows a method of estimating HARQ process ID combinations based on a lookup table, similarly to the example of FIG. 36. FIG. 38 (b) shows a method in which when one HARQ process is scheduled, one HARQ process ID is represented by bits with indices #3 and #4 and when two HARQ processes are scheduled, one HARQ process ID is represented by bits with indices #2 and #3 and the remaining HARQ process ID is calculated based on an offset value between 0 and 1 indicated by a bit with index #1 similarly to the example of FIG. 37. For example, when the first HARQ process ID is #H1 and the offset value is D, the second HARQ process ID may be determined as #(mod(H1+D+1, 4)).

The method proposed in Embodiment 6 may be used in combination with the methods proposed in Embodiments 6-1 and 6-2 below. This means that the HARQ process scheduling method described in Embodiment 6 may be partially replaced by the methods proposed in Embodiments 6-1 and 6-2.

Embodiment 6-1

The number of combinations of HARQ process IDs represented by the method proposed in Embodiment 6 may be greater than the number of combinations of HARQ process IDs that is necessary. For example, the number of required HARQ process ID combinations is 28 when 6 HARQ processes are scheduled in the examples of FIGS. 36 and 37, but the number of HARQ process ID combinations representable by five bits is 32 in total. Embodiment 6-1 proposes a method of providing additional information by reducing wasteful representation of HARQ process ID combinations. In the following embodiments, one or more methods may be used in combination unless bit representation overlaps.

FIG. 39 proposes a method of replacing rows related to scheduling of 6 or 8 HARQ processes in the example of FIG. 36 (e.g., MTC CE mode A). In the example of the FIG. 39, when 8 HARQ processes are scheduled, 1 may be mapped to the first four bits (e.g., #0 to #3), and bits with indices #4 to #11 may be used to independently represent information about 8 NDIs related to scheduled HARQ process IDs. In the example of FIG. 39, 1 is mapped to a bit with index #0, but if at least one of bits with indices #1 to #3 has a value of 0, 6 HARQ processes may be scheduled. In addition, bits with indices #6 to #11 may be used to independently represent information about 6 NDIs related to scheduled HARQ process IDs. In this case, bits with indices #1 to #5 may be used to represent 28 combinations for selecting 6 HARQ process IDs from among 8 HARQ process IDs. Bit combinations where the bits #1 to #3 all have a value of 1 may not be used to represent the above combinations.

FIG. 40 illustrates an example in which Method 7 is applied to the HARQ process ID representation method in the example of FIG. 39 when 6 HARQ processes are scheduled. In the example of FIG. 40, HARQ process IDs may be obtained in the same wat as the methods described above in Embodiment 6. However, when bits #1 to #3 are all 1, it may be used to schedule 8 HARQ processes.

According to the methods proposed in FIGS. 39 and 40, when 6 HARQ processes are scheduled, unnecessary expression of HARQ process ID combinations may be removed, and corresponding bits may be used for scheduling of 8 HARQ processes, thereby improving bit-use efficiency.

A method similar to the methods proposed in FIGS. 39 and 40 may also be applied to when one or two HARQ processes are scheduled. The number of combinations required to schedule two HARQ processes is a total of 28, but when five bits are used to represent all combinations of two HARQ process IDs as in the example of FIG. 36, some bit representation may be wasted. To solve such a problem, the structures shown in FIGS. 41 and 42 may be used. In the example of FIGS. 41 and 42, when one or two HARQ process IDs are specified (e.g., when 1 first appears in a bit with index #4), if all bits from #5 to #7 have a value of 1, it may mean that one HARQ process is scheduled. In this case, bits with indices #8 to #10 may be represent the HARQ process ID. When one or two HARQ process IDs are specified (e.g., when 1 first appears in the bit with index #4), if at least one of the bits from #5 to #7 has a value of 0, it may mean that two HARQ processes are scheduled. In this case, bits with indices #8 to #10 may be represent the combinations of the HARQ process IDs. In the examples of FIGS. 41 and 42, the method of specifying one or two HARQ process IDs is merely an example. That is, if the method proposed in Method 1-2 is used (e.g., when scheduling of all other HARQ processes except the one or two HARQ processes is distinguished by positions where 1 first appears in ascending order in bits #0 to #3, the bit with index #4 may have a value of 0.

When the proposed method is used in MTC CE mode A and Pmax=8 and Qmax=2, a DCI field may be configured by using only bits with indices #5 to #11 in the tables of FIGS. 41 and 42.

Similarly, a method of replacing rows related to scheduling of one or two HARQ processes in the example of FIG. 38 (MTC CE mode B) (e.g., CE mode A of MTC) may be applied and implemented in the form shown in FIG. 43. In the example of FIG. 43, if a bit with index #0 is 1, it may mean that one or two HARQ processes are scheduled. If all bits with indices #1 and #2 index are 1, it may mean that one HARQ process is scheduled. Otherwise, two HARQ processes may be scheduled.

In a DCI structure in which the form shown in FIG. 43 is supported, there is representation of bit combinations that are not used, and the corresponding bit combination representation may be used to represent additional information. In the example of FIG. 43, bit representation when all bits from #0 to #2 are 0 is not used, and this bit representation may be additionally used for scheduling of three HARQ processes. For example, a representation method in a DCI structure shown in FIG. 44 may be used to support three HARQ processes for limited HARQ process ID combinations. In the example of FIG. 44, bits with indices #3 to #5 may be used to represent three pieces of independent NDI information, and a bit with index #2 may be used to provide information about a position where the HARQ process ID starts. For example, when a bit with index #2 is 0, bit #a may be used to represent the NDI of HARQ process ID #(a−3) (where 3≤a≤5). when the bit with index #2 is 1, bit #a may be used to represent the NDI of HARQ process ID #(a−2). When this method is used, all information represented by 6 bits are used, and thus there is an advantage in terms of the bit-use efficiency.

In the example of FIG. 36 (e.g., MTC CE mode A), the method shown in FIG. 45 may be used to increasing the bit-use efficiency in representing the combinations of four HARQ process IDs. In the example of FIG. 36, when bits #0 and #1 are expressed as (0, 1) or bits #0 to #4 are expressed as (0, 0, 0, 0, 1), it may be determined that four HARQ process are scheduled. When bits #0 and #1 are expressed as (0, 1), the combinations of HARQ process IDs may be represented by bits #2 to #7. When bits #0 to #4 are expressed as (0, 0,0, 0, 1), the combinations of HARQ process IDs may be represented by bits #5 to #7. When the method as shown in the example in FIG. 36 is used, a total of $2^6+2^3=72$ pieces of information may be identified, which is similar to the number of cases where four HARQ process IDs are randomly selected from among 8 HARQ process IDs, combination(8, 4)=70, and thus, it is advantageous in that waste of unnecessary information may be minimized.

Embodiment 6-2

When the methods proposed in Embodiment 6 and Embodiment 6-1 are applied to MTC CE mode A, when the maximum number of schedulable HARQ processes (e.g., the number of HARQ process IDs) is Pmax=8, when the maximum number of available HARQ processes is Qmax=8, and when a case in which all bits with indices #0 and #1 are 0 and a bit with index #2 is 1 is excluded for scheduling of any other number of HARQ processes except one or two HARQ processes, if the one or two HARQ processes are scheduled, additional two-bit information may be inserted and transmitted. FIGS. 46 and 47 show examples of such a method in the form of a table. In the examples of FIGS. 46 and 47, the configuration and information representation method for bits with indices #2 to #9 may be the same as those for indices #4 to #11 in the examples of FIGS. 41 and 42.

According to the method proposed in Embodiment 6-2, the effect of the present disclosure is not changed even if any combinations of other values are used as long as the representation with bits with indices #0 to #2 does not overlap with other scheduling methods. That is, FIGS. 46 and 47 show cases in which bits #0 to #2 are (0, 0, 1), but the methods proposed in the present disclosure may be equally applied unless specific bit combinations such as (0, 0, 0) or (1, 1, 1) are used for other purposes.

If the proposed method is used in MTC CE mode A and when Pmax=8 and Qmax=2, a DCI field may be configured by using only bits with indices #3 to #11 in the tables of FIGS. 46 and 47.

Embodiment A

Among the methods and embodiments proposed in the present disclosure, a plurality of methods may be adopted and used. When operation is performed by selecting one of the plurality of methods, the criterion for performing the operation may be the maximum number of schedulable HARQ processes.

In particular, it is assumed in Embodiment A that when the maximum number of HARQ processes that may be supported by the UE is P, if the BS determines P', which is an arbitrary integer less than or equal to P, and informs the UE of P', the maximum number of HARQ processes schedulable by one DCI becomes P'. In this case, P' may be provided to the UE through higher layer signaling (e.g., SIB or RRC signaling)) transmitted by the BS to the UE. The size, type, and format of a DCI field for indicating a part of information included in the DCI may be determined by P'. As a specific example, the DCI field for indication the partial information may be an area in which the number of scheduled HARQ processes and NDI information are joint-encoded.

FIG. 48 illustrates DCI field to which the method proposed in Embodiment A is applied in the form of a table when the maximum number of schedulable HARQ processes is Pmax=8 as in CE mode A of MTC (see Table 6) and the number of HARQ processes schedulable by one DCI is specified as P by the BS. In the example of FIG. 48, Table (a) is a table used when P is Pmax, and the size of rows and columns is determined according to the maximum number of supportable HARQ processes. In the example of FIG. 48, Table (b) is a table used when P' is smaller than Pmax. The table used when P' is smaller than Pmax may be represented by selecting some of the rows and columns of the table used when P'=Pmax. In Table (b), P'=4, and the DCI field may be interpreted based on 5 rows and 4 columns in the table used when P'=Pmax. In the example of FIG. 48, Embodiment A is described based on the structure of the table used in Embodiment 1 for convenience of explanation, but the same principles may be applied even when tables with different structures (e.g., the structure of tables used in other embodiments) are used.

H. System and Apparatus to which Methods Proposed in the Present Disclosure are Applicable The various details, functions, procedures, proposals, methods, and/or operational flowcharts related to the methods described above in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

Figure 49:
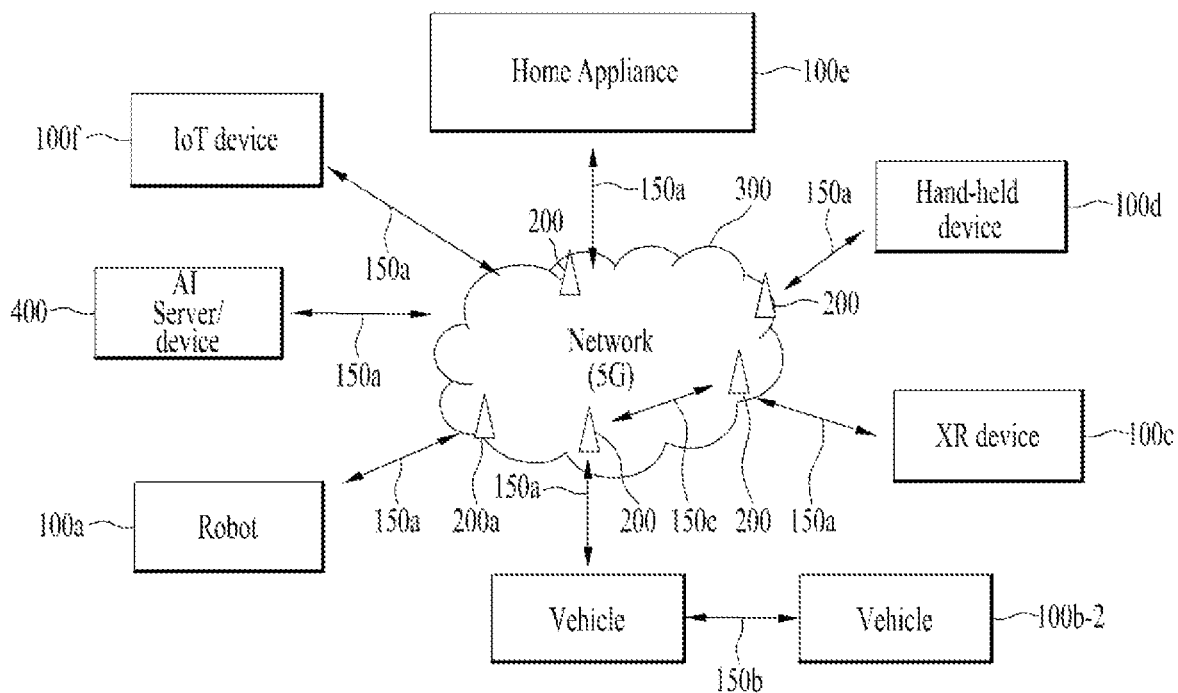
FIGS. 49 to 53 illustrate a system and communication devices to which the methods proposed in the present disclosure are applicable.

FIG. 49 illustrates a communication system 1 applied to the proposed methods of the present disclosure.

Referring to FIG. 49, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 50:
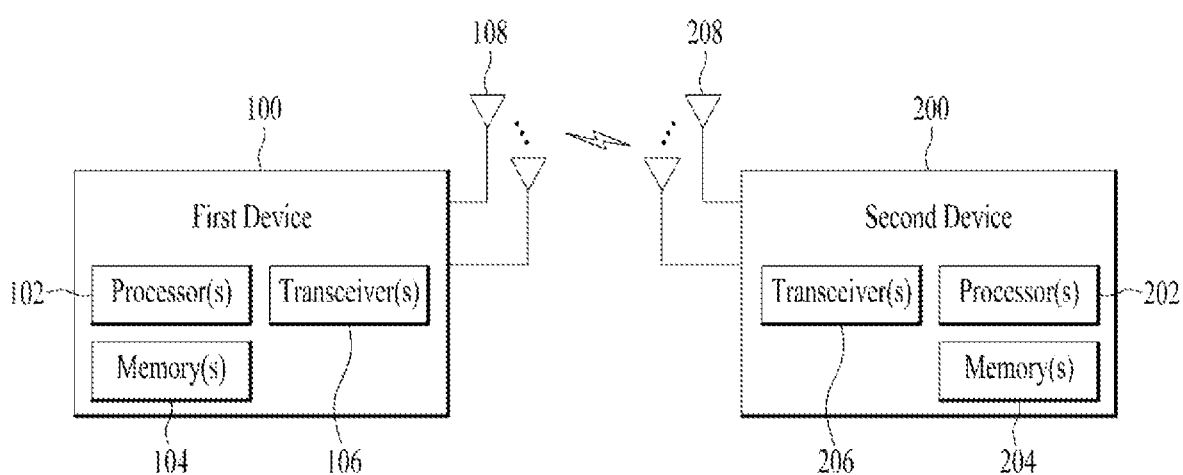

FIG. 50 illustrates wireless devices applicable to the present disclosure.

Referring to FIG. 50, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 49.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 51:
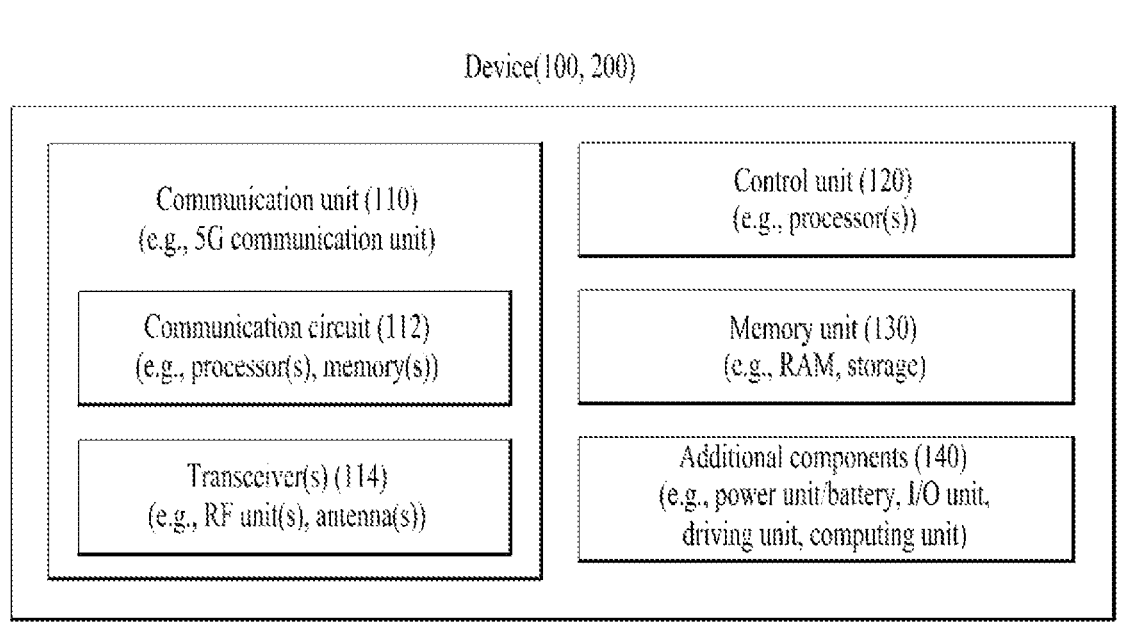

FIG. 51 illustrates another example of wireless devices applied to the present disclosure. The wireless devices may be implemented in various forms according to use-cases/services (refer to FIG. 49).

Referring to FIG. 51, wireless devices 100 and 200 may correspond to the wireless devices 100 and 200 of FIG. 50 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 50. For example, the transceiver(s) 114 may include the one or more transceivers 106 and 206 and/or the one or more antennas 108 and 208 of FIG. 50. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 49), the vehicles (100*b*-1 and 100*b*-2 of FIG. 49), the XR device (100*c* of FIG. 49), the hand-held device (100*d* of FIG. 49), the home appliance (100*e* of FIG. 49), the IoT device (100*f* of FIG. 49), a digital broadcasting terminal, a hologram device, a public safety device, an MTC device, a medicine device, a FinTech device (or a finance device), a security device, a climate/environment device, the AI server/device (400 of FIG. 49), the BSs (200 of FIG. 49), a network node, etc. The wireless device may be mobile or fixed according to a use-case/service.

In FIG. 51, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 51 will be described in detail with reference to the drawings.

Figure 52:
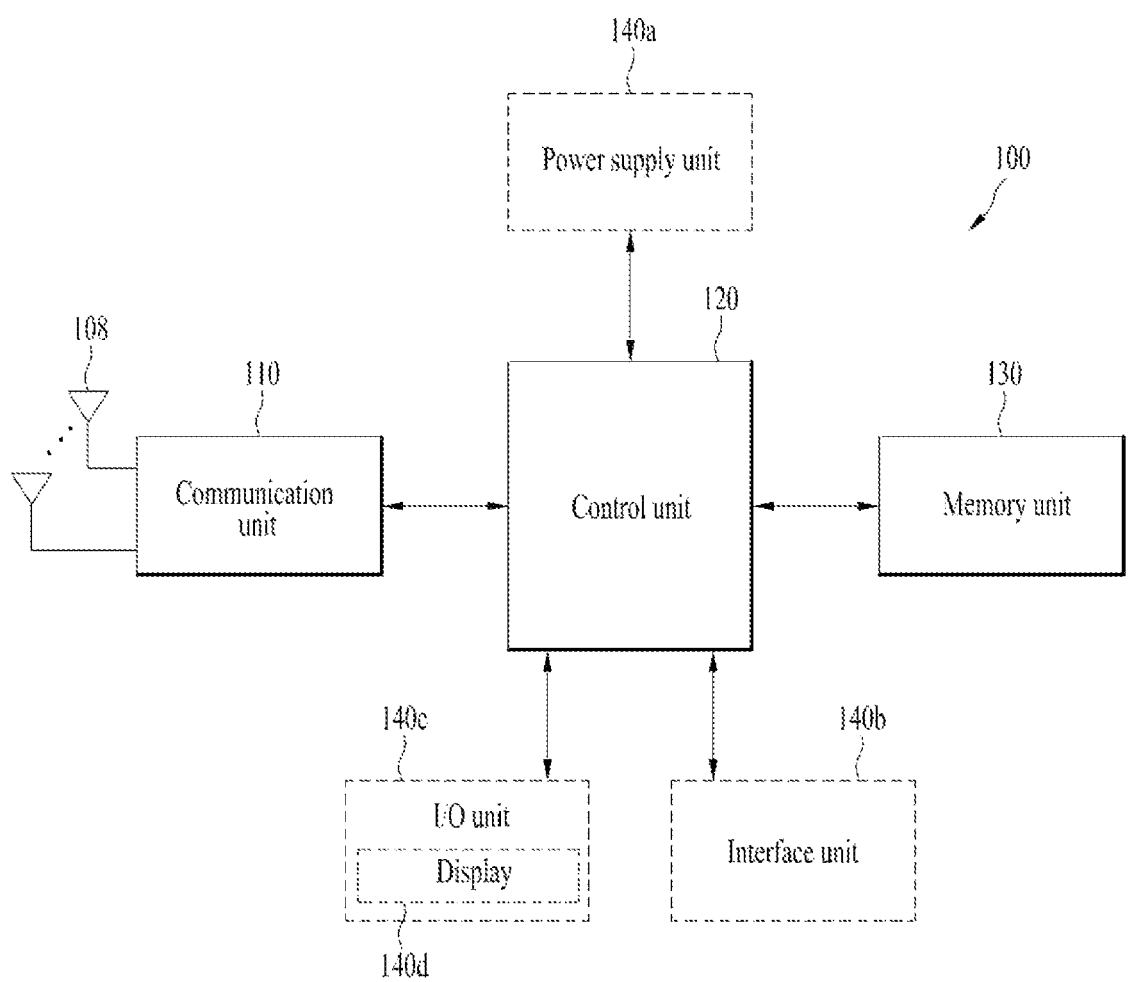

FIG. 52 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 52, a portable device 100 may include an antenna unit 108, a communication unit 110, a control unit 120, a power supply unit 140*a*, an interface unit 140*b*, and an I/O unit 140*c*. The antenna unit 108 may be configured as a part of the communication unit 110. The blocks 110 to 130/140*a* to 140*c* correspond to the blocks 110 to 130/140 of FIG. 51, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140*a* may supply power to the portable device 100, and include a wired/wireless charging circuit and a battery. The interface unit 140*b* may include various ports (e.g., an audio I/O port and a video I/O port) for connectivity to external devices The I/O unit 140*c* may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140*c* may include a camera, a microphone, a user input unit, a display 140*d*, a speaker, and/or a haptic module.

For example, for data communication, the I/O unit 140*c* may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140*c*.

Figure 53:
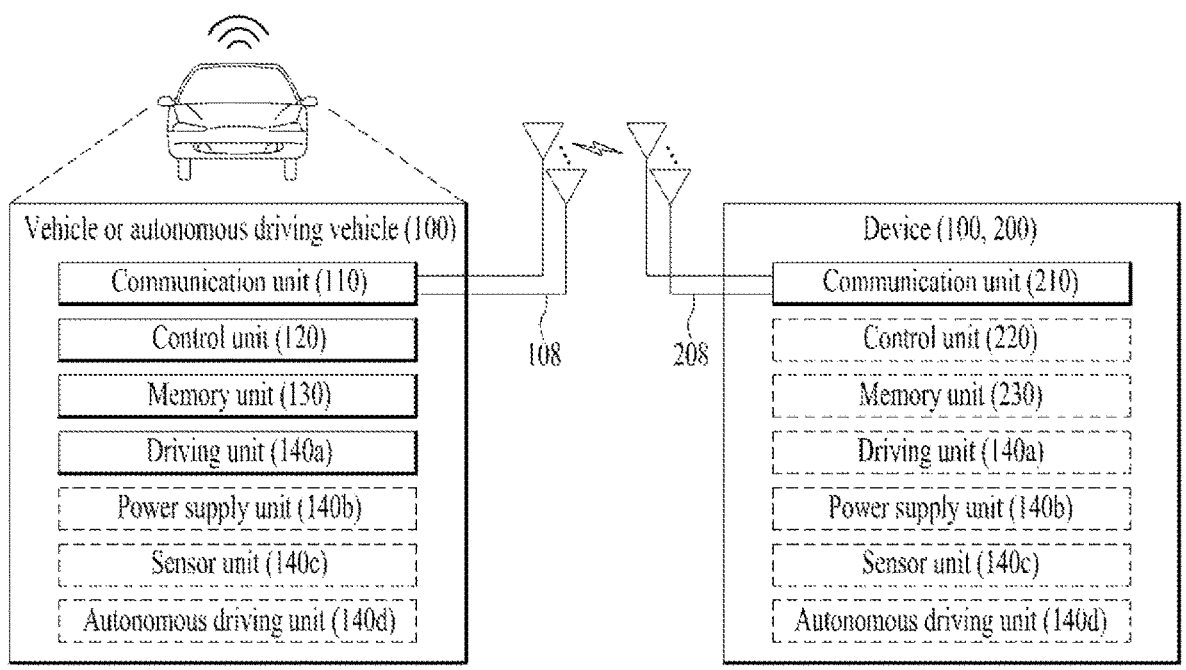

FIG. 53 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 53, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 51, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to travel on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire vehicle state information, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure are mainly described based on a signal transmission and reception relationship between the UE and BS. The signal transmission and reception relationship may be equally/similarly applied to signal transmission and reception between the UE and relay node or signal transmission and reception between the BS and relay node. A specific operation described as performed by the BS may also be performed by an upper node of the BS. That is, it is apparent that various operations performed for communication with the UE may be performed by the BS or other network nodes rather than the BS in a network including a plurality of network nodes including the BS. The term 'base station' may be replaced with 'fixed station', 'Node B', 'eNode B (eNB)', 'gNode B (gNB)', 'access point (AP)', etc. The term 'terminal' may be replaced with 'user equipment (UE)', 'mobile station (MS)', 'mobile subscriber station (MSS)', etc.

The embodiments of the present disclosure may be implemented by various means, for example, hardware, firmware, software, or any combination thereof. For hardware implementation, the embodiments of the present disclosure may be implemented by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

For firmware or software implementation, the embodiments of the present disclosure may be implemented in the form of a module, a procedure, a function, and so on for performing the above-described functions or operations. Software code may be stored in the memory and executed by the processor. The memory is located at the interior or exterior of the processor and may transmit and receive data to and from the processor via various known means.

Those skilled in the art will appreciate that the present disclosure may be embodied in other specific forms than those set forth herein without departing from the spirit and essential characteristics of the present disclosure. The above description is therefore to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

INDUSTRIAL APPLICABILITY

The present disclosure is applicable to wireless communication devices such as a User Equipment (UE) and a Base Station (BS) operating in various wireless communication systems including 3GPP LTE/LTE-A/5G (or New RAT (NR)).

The invention claimed is:

1. A method performed by a user equipment (UE) in a wireless communication system, the method comprising:
   receiving downlink control information (DCI) for scheduling a plurality of transport blocks (TBs); and
   receiving the plurality of TBs based on the received DCI,
   wherein the plurality of TBs are related to a plurality of hybrid automatic repeat request (HARQ) processes,
   wherein a total number of the plurality of HARQ processes is determined based on a position of a first bit having a first value among a plurality of bits in the DCI, and
   wherein a plurality of new data indicator (NDI) values are determined based on second bits after the first bit among the plurality of bits in the DCI.

2. The method of claim 1, wherein the plurality of bits are (Pmax+1) bits, where Pmax denotes a maximum number of HARQ processes capable of being scheduled by the DCI.

3. The method of claim 2,
   wherein among the (Pmax+1) bits, (Pmax−P) bits before the first bit have a second value, where P denotes a number of the second bits.

4. The method of claim 3, wherein the first value is 1, and wherein the second value is 0.

5. The method of claim 3, wherein the first value is 0, and wherein the second value is 1.

6. The method of claim 1, wherein the DCI further includes information about a starting HARQ process identifier (ID) of the plurality of HARQ processes.

7. The method of claim 6, wherein information about the starting HARQ process ID is represented by $\lceil \log_2(Qmax) \rceil$ bits, where Qmax denotes a maximum number of HARQ processes allowed in the wireless communication system and $\lceil \ \rceil$ denotes a ceiling function.

8. The method of claim 7, wherein among the second bits, an a-th bit represents an NDI value for HARQ process ID mod(a+X, Qmax), where X denotes the starting HARQ process ID and mod( ) denotes a modulo function.

9. The method of claim 8, wherein the wireless communication system supports machine type communication (MTC), wherein Pmax is set to 8, where Pmax denotes a maximum number of HARQ processes capable of being scheduled by the DCI, and wherein Qmax is set to 8.

10. The method of claim 8, wherein the wireless communication system supports an unlicensed band, wherein Pmax is set to 4, where Pmax denotes a maximum number of HARQ processes capable of being scheduled by the DCI, and wherein Qmax is set to 16.

11. A user equipment (UE) configured to operate in a wireless communication system, the UE comprising:
    a radio frequency (RF) transceiver; and
    a processor operatively connected to the RF transceiver, wherein the processor is configured to control the RF transceiver to:

receive downlink control information (DCI) for scheduling a plurality of transport blocks (TBs); and
receive the plurality of TBs based on the received DCI,
wherein the plurality of TBs are related to a plurality of hybrid automatic repeat request (HARQ) processes,
wherein a total number of the plurality of HARQ processes is determined based on a position of a first bit having a first value among a plurality of bits in the DCI, and
wherein a plurality of new data indicator (NDI) values are determined based on second bits after the first bit among the plurality of bits in the DCI.

12. A method performed by a base station (BS) in a wireless communication system, the method comprising:
transmitting downlink control information (DCI) for scheduling a plurality of transport blocks (TBs); and
transmitting the plurality of TBs based on the transmitted DCI,
wherein the plurality of TBs are related to a plurality of hybrid automatic repeat request (HARQ) processes,
wherein a total number of the plurality of HARQ processes is indicated based on a position of a first bit having a first value among a plurality of bits in the DCI, and
wherein a plurality of new data indicator (NDI) values are indicated based on second bits after the first bit among the plurality of bits in the DCI.

* * * * *